United States Patent
King et al.

(10) Patent No.: US 6,286,064 B1
(45) Date of Patent: Sep. 4, 2001

(54) REDUCED KEYBOARD AND METHOD FOR SIMULTANEOUS AMBIGUOUS AND UNAMBIGUOUS TEXT INPUT

(75) Inventors: Martin T. King, Vashon, WA (US); Dale L. Grover, Lansing, MI (US); Clifford A. Kushler; Cheryl A. Grunbock, both of Vashon, WA (US)

(73) Assignee: Tegic Communications, Inc., Seattle, WA (US)

( * ) Notice: Subject to any disclaimer, the term of this patent is extended or adjusted under 35 U.S.C. 154(b) by 0 days.

(21) Appl. No.: 09/339,549

(22) Filed: Jun. 24, 1999

Related U.S. Application Data

(63) Continuation of application No. 08/792,969, filed on Jan. 24, 1997, now Pat. No. 5,953,541.

(51) Int. Cl.[7] ........................................... G06F 3/02
(52) U.S. Cl. ........................... 710/67; 710/1; 341/22
(58) Field of Search ........................ 710/1, 67; 341/20, 341/22, 23, 25; 364/419

(56) References Cited

U.S. PATENT DOCUMENTS

| | | | |
|---|---|---|---|
| 4,680,577 | * | 7/1987 | Straayer et al. ............ 340/711 |
| 5,040,113 | * | 8/1991 | Mickunas ................... 364/419 |
| 5,528,235 | * | 6/1996 | Lin et al. .................. 341/22 |
| 5,952,942 | * | 9/1999 | Balakrishnan et al. ....... 341/20 |
| 6,005,498 | * | 12/1999 | Yang et al. ................. 341/23 |

\* cited by examiner

*Primary Examiner*—Thomas Lee
*Assistant Examiner*—Thuan Du
(74) *Attorney, Agent, or Firm*—Christensen O'Connor Johnson Kindness PLLC

(57) ABSTRACT

A reduced keyboard disambiguating system. The keyboard has twelve keys, nine of them labeled with numerous letters and other symbols, and those nine plus one more are labeled each with one of the ten digits. Textual entry keystrokes are ambiguous. The user strikes a delimiting "Select" key at the end of each word, delimiting a keystroke sequence that could match any of many words with the same number of letters. The keystroke sequence is processed with a complete vocabulary, and words which match the sequence of keystrokes are presented to the user in order of decreasing frequency of use. In addition, stems of longer words whose initial letters match the sequence of keystrokes are also presented to the user in order of decreasing frequency of use. The first word in the presented list is automatically selected by the input of the first character in the next word. The letters are assigned to the keys in a non-sequential order which reduces chances of ambiguities. The "Select" key is pressed to select the desired word other than the first word, and spacing between words and punctuation is automatically computed. For words which are not in the vocabulary, a simultaneous unambiguous interpretation of each keystroke is performed to specify each letter of a desired word. The system simultaneously interprets all keystroke sequences as both ambiguous and unambiguous keystrokes. The user selects the desired interpretation. The system also presents to the user the number which is represented by the sequence of keystrokes for possible selection by the user.

32 Claims, 31 Drawing Sheets

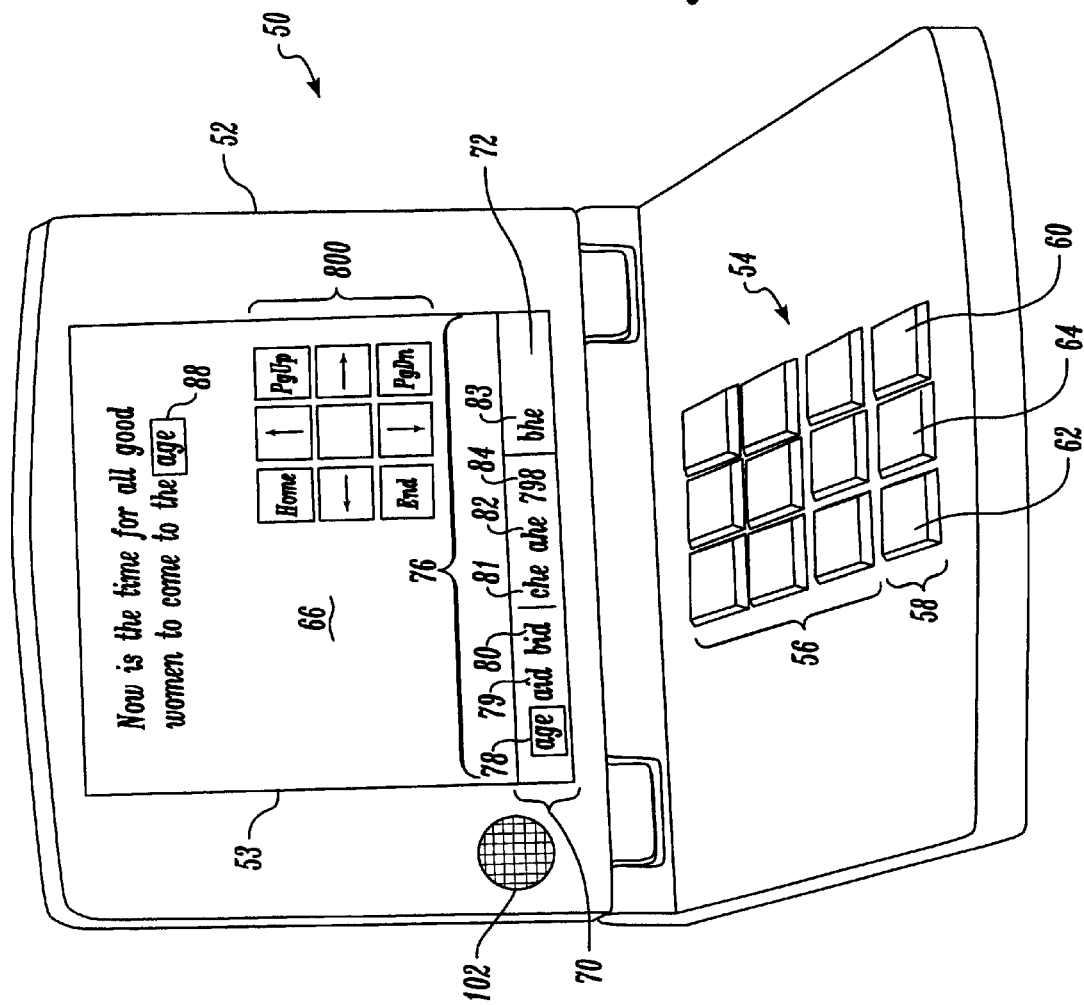

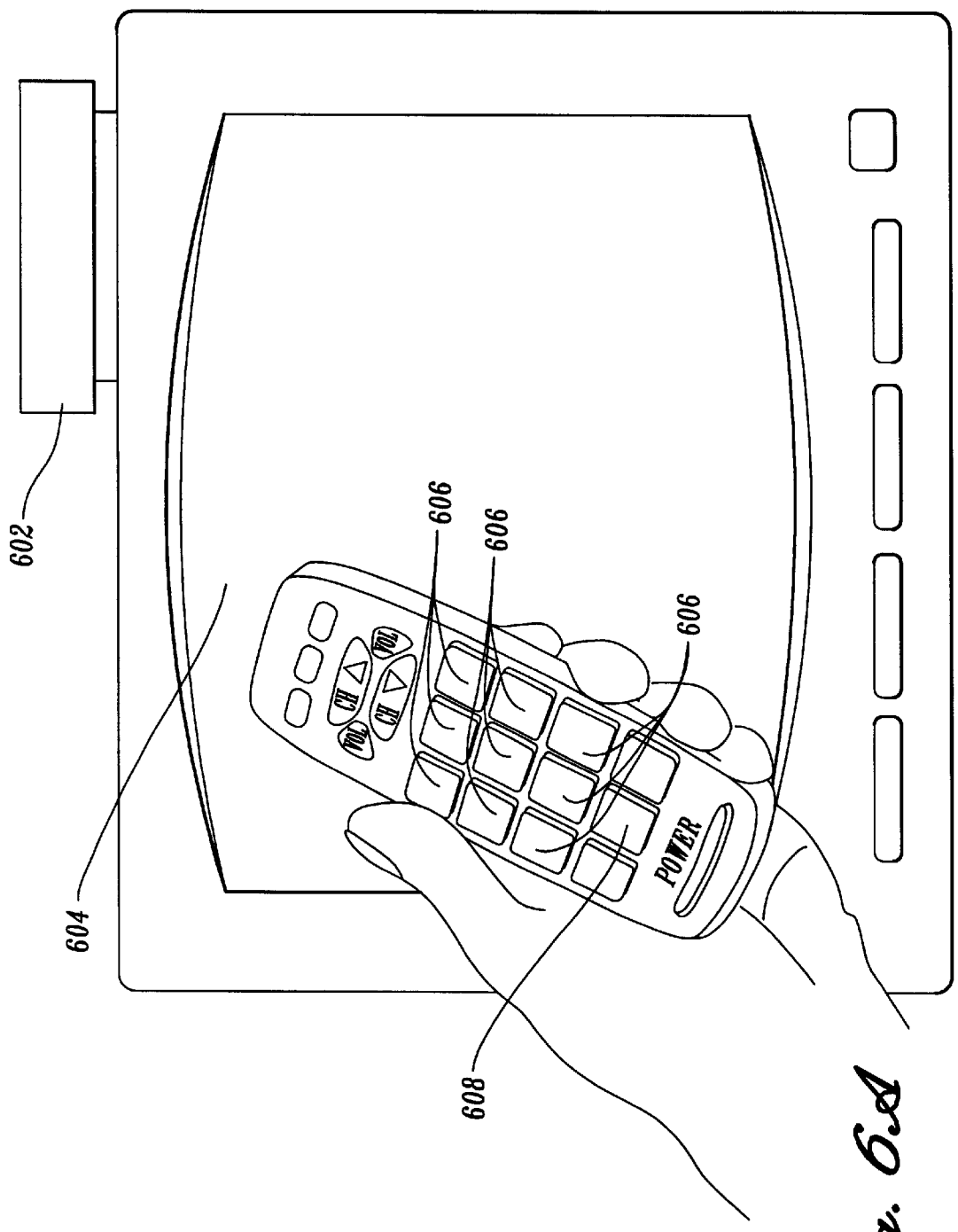

REDUCED KEYBOARD AND METHOD FOR SIMULTANEOUS AMBIGUOUS AND UNAMBIGUOUS TEXT INPUT

RELATED APPLICATIONS

This application is a continuation of application Ser. No. 08/792,969 filed Jan. 24, 1997, now U.S. Pat. No. 5,953,541.

FIELD OF THE INVENTION

The invention relates generally to reduced keyboard systems, and more specifically to reduced keyboard systems using word-level disambiguation to resolve ambiguous keystrokes.

BACKGROUND OF THE INVENTION

For many years, portable computers have been getting smaller and smaller. The principal size-limiting component in the effort to produce a smaller portable computer has been the keyboard. If standard typewriter-size keys are used, the portable computer must be at least as large as the keyboard. Miniature keyboards have been used on portable computers, but the miniature keyboard keys have been found to be too small to be easily or quickly manipulated by a user.

Incorporating a full-size keyboard in a portable computer also hinders true portable use of the computer. Most portable computers cannot be operated without placing the computer on a flat work surface to allow the user to type with both hands. A user cannot easily use a portable computer while standing or moving. In the latest generation of small portable computers, called Personal Digital Assistants (PDAs), companies have attempted to address this problem by incorporating handwriting recognition software in the PDA. A user may directly enter text by writing on a touch-sensitive panel or screen. This handwritten text is then converted by the recognition software into digital data. Unfortunately, in addition to the fact that printing or writing with a pen is in general slower than typing, the accuracy and speed of the handwriting recognition software has to date been less than satisfactory. To make matters worse, today's handheld computing devices which require text input are becoming smaller still. Recent advances in two-way paging, cellular telephones, and other portable wireless technologies has led to a demand for small and portable two-way messaging systems, and especially for systems which can both send and receive electronic mail ("e-mail").

It would therefore be advantageous to develop a keyboard for entry of text into a computer that is both small and operable with one hand while the user is holding the computer with the other hand. Prior development work has considered use of a keyboard that has a reduced number of keys. As suggested by the keypad layout of a touch-tone telephone, many of the reduced keyboards have used a 3-by-4 array of keys. Each key in the array of keys contains multiple characters. There is therefore ambiguity as a user enters a sequence of keys, since each keystroke may indicate one of several letters. Several approaches have been suggested for resolving the ambiguity of the keystroke sequence.

One suggested approach for unambiguously specifying characters entered on a reduced keyboard requires the user to enter two or more keystrokes to specify each letter. The keystrokes may be entered either simultaneously (chording) or in sequence (multiple-stroke specification). Neither chording nor multiple-stroke specification has produced a keyboard having adequate simplicity and efficiency of use. Multiple-stroke specification is inefficient, and chording is complicated to learn and use.

Other suggested approaches for determining the correct character sequence that corresponds to an ambiguous keystroke sequence are summarized in the article "Probabilistic Character Disambiguation for Reduced Keyboards Using Small Text Samples," published in the Journal of the International Society for Augmentative and Alternative Communication by John L. Arnott and Muhammad Y. Javad (hereinafter the "Arnott article"). The Arnott article notes that the majority of disambiguation approaches employ known statistics of character sequences in the relevant language to resolve character ambiguity in a given context. That is, existing disambiguating systems statistically analyze ambiguous keystroke groupings as they are being entered by a user to determine the appropriate interpretation of the keystrokes. The Arnott article also notes that several disambiguating systems have attempted to use word-level disambiguation to decode text from a reduced keyboard. Word-level disambiguation disambiguates entire words by comparing the sequence of received keystrokes with possible matches in a dictionary after the receipt of an unambiguous character signifying the end of the word. The Arnott article discusses many of the disadvantages of word-level disambiguation. For example, word-level disambiguation oftentimes fails to decode a word correctly, because of the limitations in identifying unusual words and the inability to decode words that are not contained in the dictionary. Because of the decoding limitations, word-level disambiguation does not give error-free decoding of unconstrained English text with an efficiency of one keystroke per character. The Arnott article therefore concentrates on character level disambiguation rather than word-level disambiguation, and indicates that character level disambiguation appears to be the most promising disambiguation technique.

One suggested approach based on word-level disambiguation is disclosed in a textbook entitled *Principles of Computer Speech*, authored by I. H. Witten, and published by Academic Press in 1982 (hereinafter the "Witten approach"). Witten discusses a system for reducing ambiguity from text entered using a telephone touch pad. Witten recognizes that for approximately 92% of the words in a 24,500 word dictionary, no ambiguity will arise when comparing the keystroke sequence with the dictionary. When ambiguities do arise, however, Witten notes that they must be resolved interactively by the system presenting the ambiguity to the user and asking the user to make a selection between the number of ambiguous entries. A user must therefore respond to the system's prediction at the end of each word. Such a response slows the efficiency of the system and increases the number of keystrokes required to enter a given segment of text.

Disambiguating an ambiguous keystroke sequence continues to be a challenging problem. As noted in the discussion above, satisfactory solutions that minimize the number of keystrokes required to enter a segment of text have failed to achieve the necessary efficiencies for a reduced, disambiguating keyboard to be acceptable for use in a portable computer. One challenge facing any application of word-level disambiguation is providing sufficient feedback to the user about the keystrokes being input. With an ordinary typewriter or word processor, each keystroke represents a unique character which can be displayed to the user as soon as it is entered. But with word-level disambiguation this is often not possible, since each keystroke represents multiple characters, and any sequence of keystrokes may match multiple words or word stems. This is especially a problem when the user makes a spelling or keystroke error, since the user cannot be certain that an error has occurred until the complete key sequence has been entered and the desired word fails to appear. Moreover, recent publications have taught away from using word-level disambiguation and have focused on character level disambiguating techniques. It would therefore be desirable to develop a disambiguating system that minimizes the ambiguity of entered keystrokes, and also maximizes the efficiency with which the user can resolve any ambiguity which does arise during text entry.

SUMMARY OF THE INVENTION

The present invention provides a reduced keyboard which uses word-level disambiguation to resolve ambiguities in keystrokes. In one embodiment, the system includes a display panel which is touch sensitive, wherein contact with the surface of the display generates input signals to the system corresponding to the location of contact. Alternatively, the keyboard can be constructed with full-size mechanical keys.

In one preferred embodiment, nine symbol and letter keys are grouped in a three by-three-array along with three to six additional special function keys. A plurality of letters and symbols are assigned to some of the keys, so that keystrokes on these keys (hereinafter the "data keys") are ambiguous. A user may enter a keystroke sequence wherein each keystroke corresponds to the entry of one letter of a word. Because individual keystrokes are ambiguous, the keystroke sequence can potentially match more than one word with the same number of letters. The keystroke sequence is processed by vocabulary modules which match the sequence to corresponding stored words or other interpretations. Words that match the sequence of keystrokes are presented to the user in a selection list on the display as each keystroke is received.

In accordance with one aspect of the invention, the keystroke sequence can represent both letters and digits. The keystroke sequence is simultaneously interpreted as a number and as one or more words. The alternative interpretations of the keystroke sequence can also be provided to the user in the selection list.

In accordance with another aspect of the invention, the word interpretations are presented in order of decreasing frequency of use, with the most commonly used words presented first. Items in the selection list selected by pressing the Select key one or more times. Keystrokes can be "undone" by pressing a BackSpace key.

In accordance with yet another aspect of the invention, the user presses a Select key to delimit an entered keystroke sequence. After receiving the select key, the disambiguating system selects the most frequently used word and adds the word to the sentence being constructed. The select key also serves to generate a space following the selected word, i.e., the reduced keyboard disambiguating system automatically inserts the appropriate spacing between words.

In accordance with another aspect of the invention, the select key is also used to select less commonly used words from the selection list presented to the user. If the word presented to the user at the top of the selection list is not the desired word, the user presses the Select key again to advance from the most frequently used word to the second most frequently used word, and again to advance to the third most frequently used word, and so on. This embodiment of the reduced keyboard disambiguating system has no dedicated "execute" or "accept" key to act on an entry once it has been selected. Once the desired word is selected by the user, it is added to the sentence being composed upon receipt of the next symbol or character keystroke.

In accordance with still another aspect of the invention, the user may select a desired word or other interpretation from the selection list simply by touching it on the screen. When a word is selected in this fashion prior to activation of the Select key, the selected word is placed at the insertion point in the output document without adding a space. Alternatively, touching the screen anywhere other than on the displayed keyboard or on the selection list has the effect of accepting the current word or symbol in the selection list. The selection list also includes a scrolling control button to manually scroll additional less commonly used items onto the display screen for selection.

In accordance with yet another aspect of the invention, the user may select a previously generated word in the output text area by double-tapping the word. The system then re-establishes the selection list in the same state as when the selected word was generated. Alternatively, the text display caret, or editing cursor, may be re-positioned by a single tap in the text area. Tapping the selection list area when it is empty results in the system identifying the word object closest to the caret position, and re-establishing the selection list for the word. The Select key can then be activated to again move forward through the selection list, replacing the previously generated word with other items from the selection list. The user may also replace the double-tapped word simply by touching a different desired word in the selection list. In yet another embodiment, after single or double-tapping a word and re-establishing the selection list, repeated single taps on the word are interpreted as activation's of the Select key and replace the word with the next word in the list.

In accordance with yet another aspect of the invention, multiple interpretations of the keystroke sequence are provided to the user in the selection list. The keystroke sequence may be interpreted as forming one or more words, and these corresponding words are displayed in the selection list. Simultaneously, the keystroke sequence may be interpreted as a number, and this number is also displayed as one of the items in the selection list. Additionally, a keystroke sequence can be interpreted as a word entered using an unambiguous spelling method, as the stem of an incomplete word, and as a system command. These multiple interpretations are simultaneously presented to the user upon receipt of each keystroke entered by the user. The user may select from the alternate interpretations by pressing the Select key a number of times, or by directly touching the desired interpretation in the selection list presented on a touchscreen.

In accordance with still another aspect of the invention, a method to enter new words that are not contained in the system's vocabulary is provided, using a multiple-stroke specification method. In this method, a sequence of keystrokes is interpreted as unambiguously specifying a specific string of alphabetic characters by requiring multiple presses on a key to identify which of the symbols on that key is intended. A symbol may be unambiguously specified by pressing the key a number of times equal to the order of appearance of that symbol on the key. For example, a data key might contain three letters in a horizontal row, followed by a single digit. The first letter in the row would be specified by a single keypress, the second letter by two keypresses, the third letter by three keypresses, and the digit by four keypresses. The multiple-stroke interpretation of each sequence of keystrokes is therefore also performed by the reduced keyboard disambiguating system and automatically presented to the user in the selection list.

In accordance with yet another aspect of the present invention, the system provides visual feedback to the user about the multiple-stroke interpretation of the keystroke sequence being entered. This is accomplished by highlighting or otherwise visually indicating which of the symbols on the key being pressed has been selected if the key sequence is interpreting as unambiguous multiple-stroke input.

In accordance with yet another aspect of the present invention, the letters on each keytop are ordered from left to right in order of decreasing frequency, so that the most frequently occurring letter is in the leftmost position. The invention, by virtue of the ordering of letters on each key according to letter frequency, requires fewer keystrokes for unambiguous multiple stroke data entry than when this data entry is performed on a standard touch-tone keypad.

In accordance with yet another aspect of the invention, when two successive letters in a word appear on the same key, a pause in the keystroke sequence is used to distinguish the multiple stroke input of the two letters. The magnitude of the delay required to separate and distinguish multiple letter inputs on the same key is set by the user in a system menu. The system can provide the user either an auditory or a visual indication that the time-out delay has expired.

In yet another aspect of the invention, the system captures timing data concerning the timing of the keystrokes, and the time between successive keystrokes on the same key. When the user selects and accepts the multiple-stroke interpretation of a key sequence for output, the recorded time intervals are used to update a calculated running average time interval. At the user's option, the system can then use the calculated value to dynamically update the minimum delay period. In one embodiment, for example, the minimum time-out delay period is set to 1.5 times the calculated average time interval.

In accordance with still another aspect of the invention, a method to enter words not contained in the vocabulary is provided, using a direct-pointing method. Each key on the touch screen is divided into regions, each region containing a symbol. The user touches each key precisely, specifically touching directly on the region where the desired symbol appears. When a key is touched, the symbol that will be selected through such a direct-pointing method is highlighted. Once a key is touched, the pen stylus or fingertip can slide across the surface of the key until the desired symbol on the key is highlighted. When the pen stylus or fingertip is lifted from the touchscreen surface, the selected symbol is added to the end of the current unambiguous spelling object, and the highlighting is removed from both the selected symbol and the selected key. Preferably, the direct-pointing method is only one of the multiple interpretations simultaneously offered to the user for selection.

In accordance with yet another aspect of the invention, unambiguous keys are grouped into sets of adjacent keys, with each group representing a larger key which is possibly ambiguous by virtue of including more than one underlying key. The result is two keyboards, comprised of an ambiguous keyboard overlaid on an unambiguous keyboard, on which each keystroke may be simultaneously interpreted as a keystroke on one of the overlaid keys, and as an unambiguous keystroke on one of the underlying keys. In an alternate embodiment, a special key may be provided to toggle between a keyboard layout based on a set of ambiguous data keys, and an alternate keyboard which consists of a larger number of unambiguous data keys, each of which is proportionately smaller and contains only a single letter.

In accordance with still another aspect of the invention, the user touches the key containing the desired letter or symbol and indicates the symbol by a short dragging motion in the plane of the screen. All of the symbols on a key have an associated stroke directions. For example, on a key containing three symbols, the leftmost symbol could be indicated by touching the key and sliding to the left, the rightmost symbol could be indicated by touching the key and sliding right, and the center symbol, possibly the most frequently used symbol, could be indicated by touching and releasing the key with no sideways motion. When the pen stylus or fingertip is lifted from the touchscreen surface, the selected symbol is added to the end of the current unambiguous spelling object.

In accordance with yet another aspect of the invention, words that are entered by the user using a preferred unambiguous spelling method are displayed in a dedicated and distinct location in the selection list, preferably at the right end of the list, visually separated from other items in the list. Displaying words generated by an unambiguous spelling method interpretation of the keystroke sequence at the far right minimizes distractions that the word's presence might otherwise cause when the user is not intending to use the unambiguous spelling method confirms that the intended word is being typed.

In accordance with yet another aspect of the invention, words that are not in a vocabulary module that are either entered by the user using an unambiguous spelling method or that are encountered in a text item being edited are automatically added to a vocabulary module. The added words can then be typed using the standard method of only one keystroke per letter.

In accordance with still another aspect of the invention, the keys used for the disambiguating system may be assigned to a unique, easily recognized gesture which can be performed on a touch-sensitive surface with either a stylus or a fingertip. Each gesture or stroke is then equivalent to pressing a key. Using gestures in this manner may reduce the space required to implement the system as compared to the use of individual keys. This technique may be combined with stroke-based character recognition systems currently offered on some handheld devices.

In accordance with still another aspect of the invention, words are stored in a vocabulary module using a tree data structure. Words corresponding to a particular keystroke sequence are constructed using the set of words and word stems associated with the immediately preceding keystroke sequence (i.e., the particular keystroke sequence without the last keystroke). Constructing words in this manner reduces the storage space of the vocabulary module, since word stems are stored only once, at the top of the tree structure, and are shared by all words constructed from them. The tree structure also greatly reduces processing requirements, since no searching is required to locate stored objects. The words and word stems stored in the tree data structure may contain frequency or other ranking information which indicates which item is to be displayed first to the user, thus further reducing processing requirements.

In accordance with yet another aspect of the invention, letters may be assigned to the keys in a non-sequential order. Rather than assigning the letters from "a" to "z," the letters may be grouped onto the keys in a manner that reduces the frequency of ambiguities during word entry. In particular, the letters can be assigned on the keys to take into account the frequency of use of each word in the disambiguating system's vocabulary modules. That is, the letters are grouped to reduce the ambiguities between the most commonly entered words. The grouping of the letters on the keys is therefore optimized with respect to one or more preferred vocabulary modules that include information regarding the frequency of common usage.

In accordance with still another aspect of the invention, it may be advantageous to use a keyboard on which letters are assigned to the keys more or less sequentially from "a" to "z." A method to correctly determine from the context of the input which word of one or more ambiguous words is likely to be the desired word is used, to output the most likely word to the user first in the selection list.

In accordance with still another aspect of the invention, the disambiguating keyboard system can be used to edit and revise existing documents. For example, on a small hand-held two-way pager it can be used to reply to received e-mail, where the reply is composed of the original message plus additional text added by the user. When the system opens an existing document it automatically scans and parses the text objects in the document, and places these objects in a temporary dictionary which makes each object immediately available in the system's vocabulary, i.e., available for one keystroke per letter (ambiguous) spelling. If any of these temporary vocabulary objects is used (i.e., spelled by the user and selected for output to the current document), and the word is still present in the current document at the time the document is closed, then the word is moved from the Temporary Vocabulary to a permanent Custom Vocabulary storage where it remains available to the user after the source document has been closed. In contrast, items in the Temporary Vocabulary which are not spelled by the user while editing are removed from memory and are not available after the document is closed.

The combined effects of the non-sequential and optimized assignment of letters to keys, the delimiting of words using a Select key, the presentation of the most commonly occurring word as the first word in the selection list, the inclusion of multiple interpretations in the selection list, the automatic addition of a selected word to a sentence by the first keystroke of the following word, and the automatic addition of spaces produces a surprising result: for approximately 99% of entered words, the same number of keystrokes is required to enter a word with the reduced key disambiguating system as for word entry with a conventional keyboard. When ambiguities are reduced and the words are presented in frequency of use order, the desired word is most often the first word presented and is frequently the only word presented. The user can then proceed to enter the next word with no more than the usual number of keystrokes. High speed entry of text is therefore achieved using a keyboard having a small number of full-size keys.

The reduced keyboard disambiguation system disclosed herein reduces the size of the computer or other device that incorporates the system. The reduced number of keys allows a device to be constructed to be held by the user in one hand, while being operated with the other hand. The disclosed system is particularly advantageous for use with PDAs, two-way pagers, or other small electronic devices that benefit from accurate, high-speed text entry. The system can provide both efficiency and simplicity when implemented on a touchscreen based device.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawing wherein:

FIG. 4B a perspective view of an alternate embodiment of a reduced keyboard disambiguating system;

FIGS. 5A–5K are schematic views of the preferred embodiment of the reduced keyboard disambiguating system during representative use;

FIG. 6A is a schematic view of a television remote control including a reduced keyboard disambiguating system of the present invention;

DETAILED DESCRIPTION OF THE PREFERRED EMBODIMENT

I. System Construction and Basic Operation

Figure 1A:
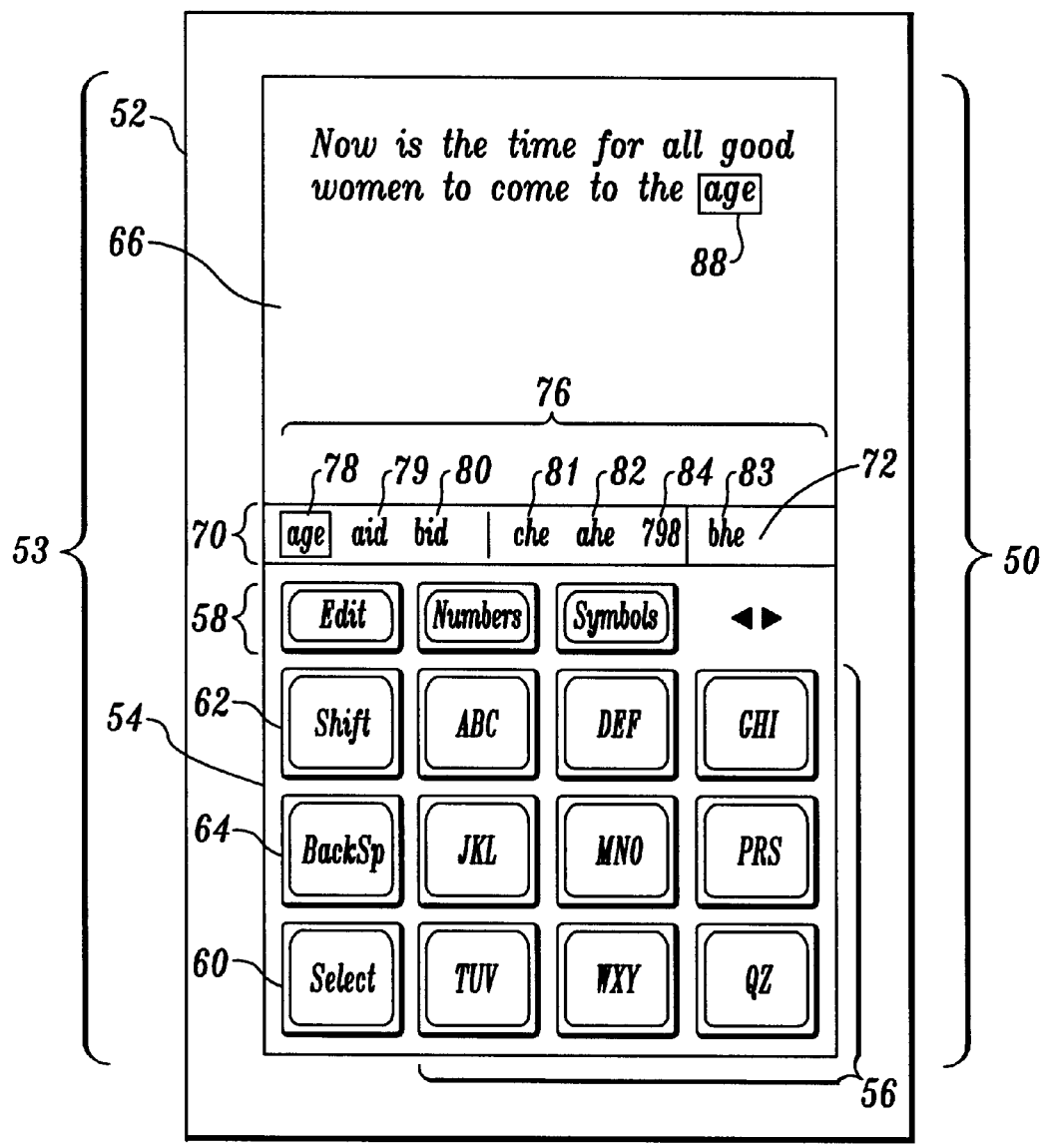
FIG. 1A is a schematic view of a preferred embodiment of a portable computer incorporating a reduced keyboard disambiguating system of the present invention.

With reference to FIG. 1A a reduced keyboard disambiguating system 50 formed in accordance with the present invention is depicted incorporated in a palmtop portable computer 52. Portable computer 52 contains a reduced keyboard 54 implemented on a touchscreen display 53. For purposes of this application, the term "keyboard" is defined broadly to include any input device having defined areas including a touch screen having defined areas for keys, discrete mechanical keys, membrane keys, etc. Keyboard 54 has a reduced number of data entry keys from a standard QWERTY keyboard. In the preferred embodiment, the keyboard contains twelve standard full-sized keys arranged in four columns and three rows and an additional row of smaller, less frequently used special-purpose keys 58 that appear at the top of keyboard 54. More specifically, the preferred keyboard contains nine data keys 56 arranged in a 3-by-3 array, and a left-hand column of three system keys 58, including a select key 60, a shift key 62, and a Back-Space key 64.

Figure 1B:
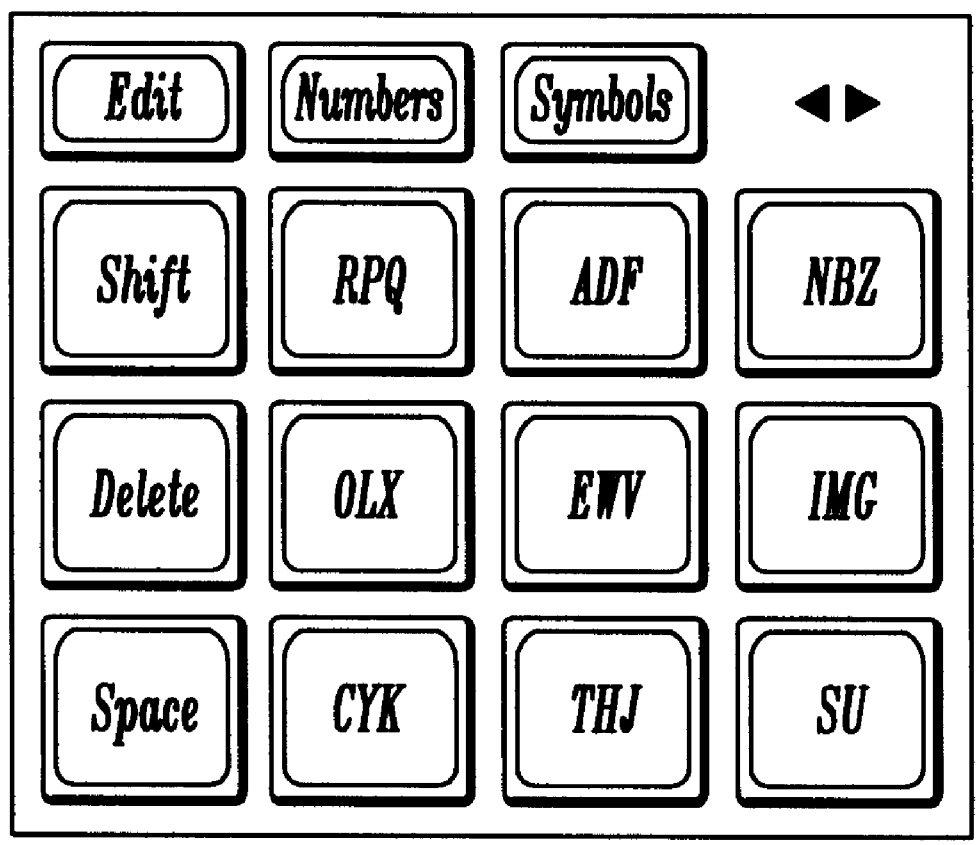
FIGS. 1B–1E are schematic views of alternate embodiments of the reduced keyboard in various modes of system operation.
Figure 1C:
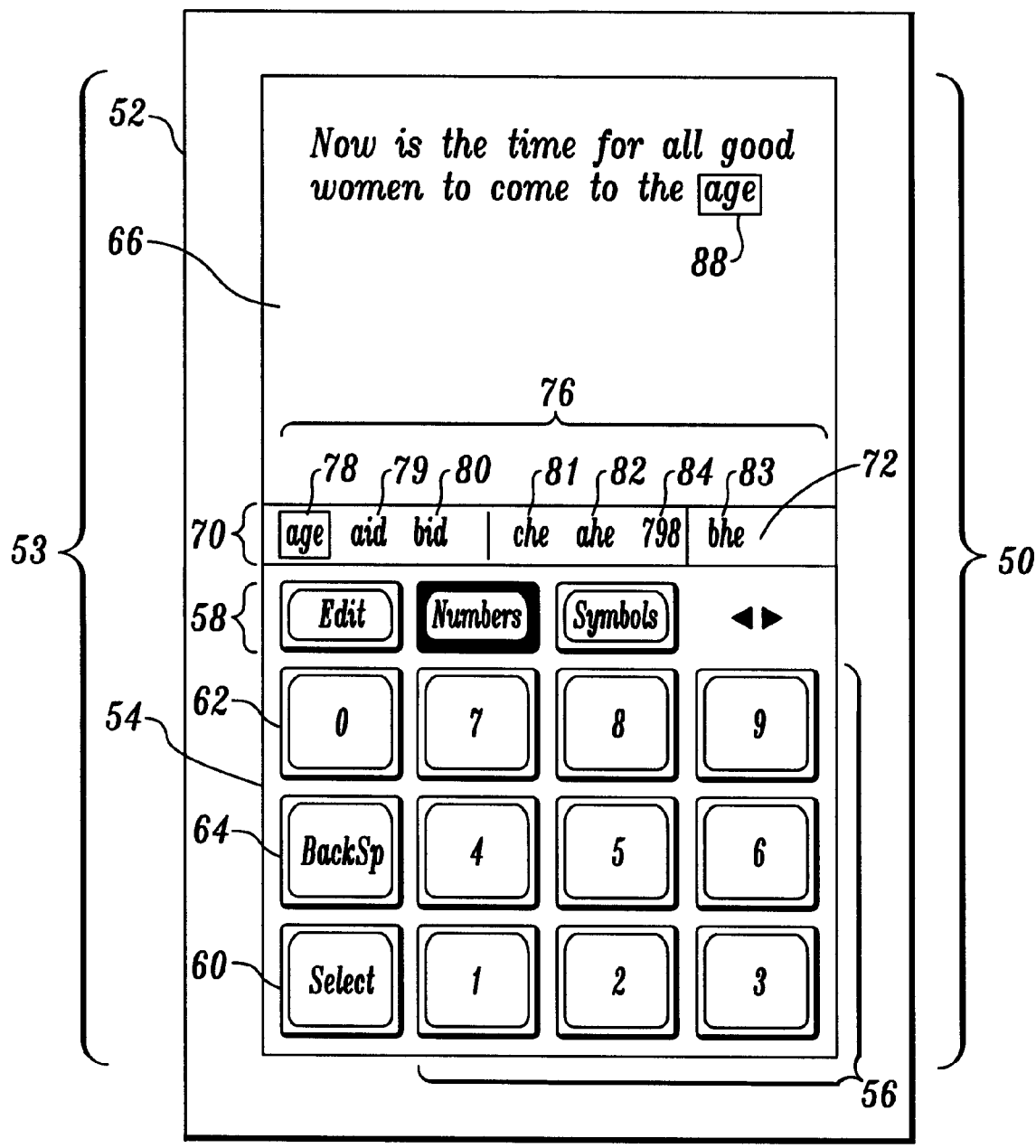
Figure 1D:
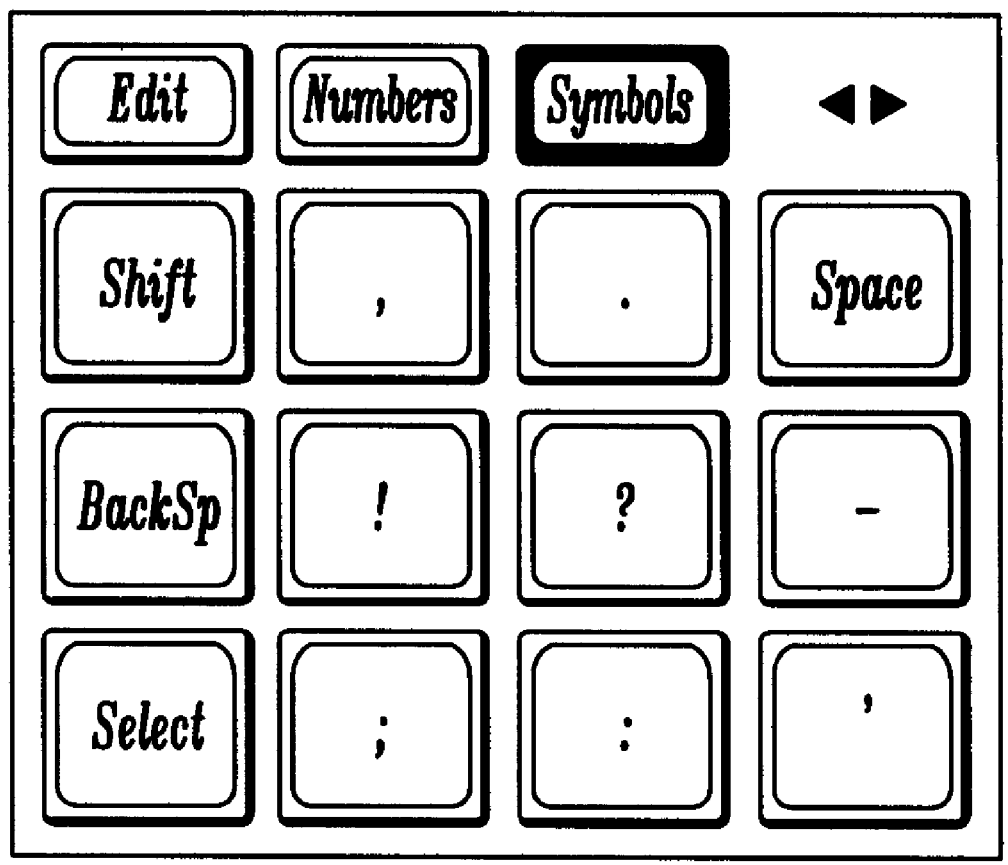
Figure 1E:
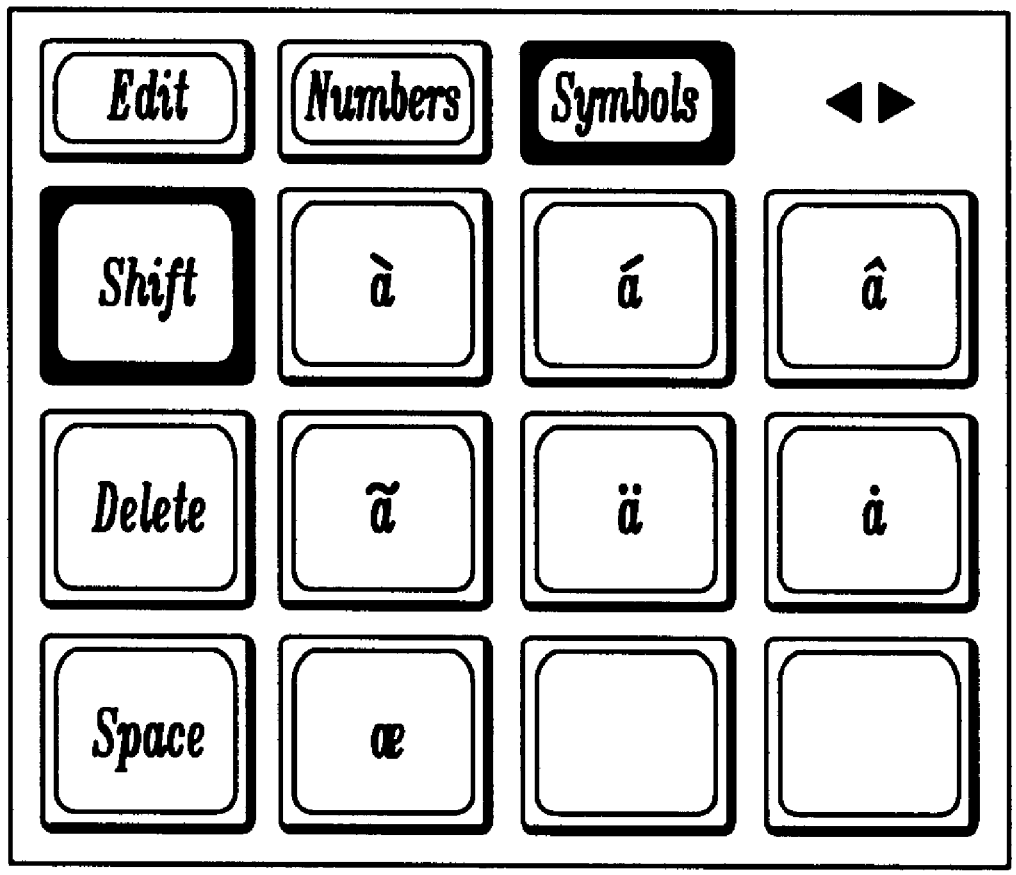

A preferred arrangement of the letters on each key in the keyboard 54 is depicted in FIG. 1A. FIG. 1B shows an alternate optimized arrangement of the letters on each key in the keyboard 54 in which the letters have been arranged on the keys to minimize the total frequency of occurrence of words that do not appear first in the selection list. FIG. 1C shows a preferred arrangement of the numeric digits associated with each key in the keyboard 54. FIG. 1D shows a preferred arrangement of some of the punctuation characters associated with each key in the keyboard 54 for the English language. FIG. 1E shows a preferred arrangement of the various special forms of the base character 'a' as an example of the manner in which diacritic marks are associated with each key in the keyboard 54.

Data is input into the disambiguation system via keystrokes on the reduced keyboard 54. As a user enters a keystroke sequence using the keyboard, text is displayed on the computer display 53. Two regions are defined on the display to display information to the user. An upper text region 66 displays the text entered by the user and serves as a buffer for text input and editing. A selection list region 70, located below the text region, provides a list of words and other interpretations corresponding to the keystroke sequence entered by a user. At the right-hand end of the selection list region 70, a special region 72 is designated for displaying the unambiguous spelling interpretation of the current keystroke sequence. As will be described in additional detail below, the selection list region 70 aids the user in resolving the ambiguity in the entered keystrokes.

Figure 2:
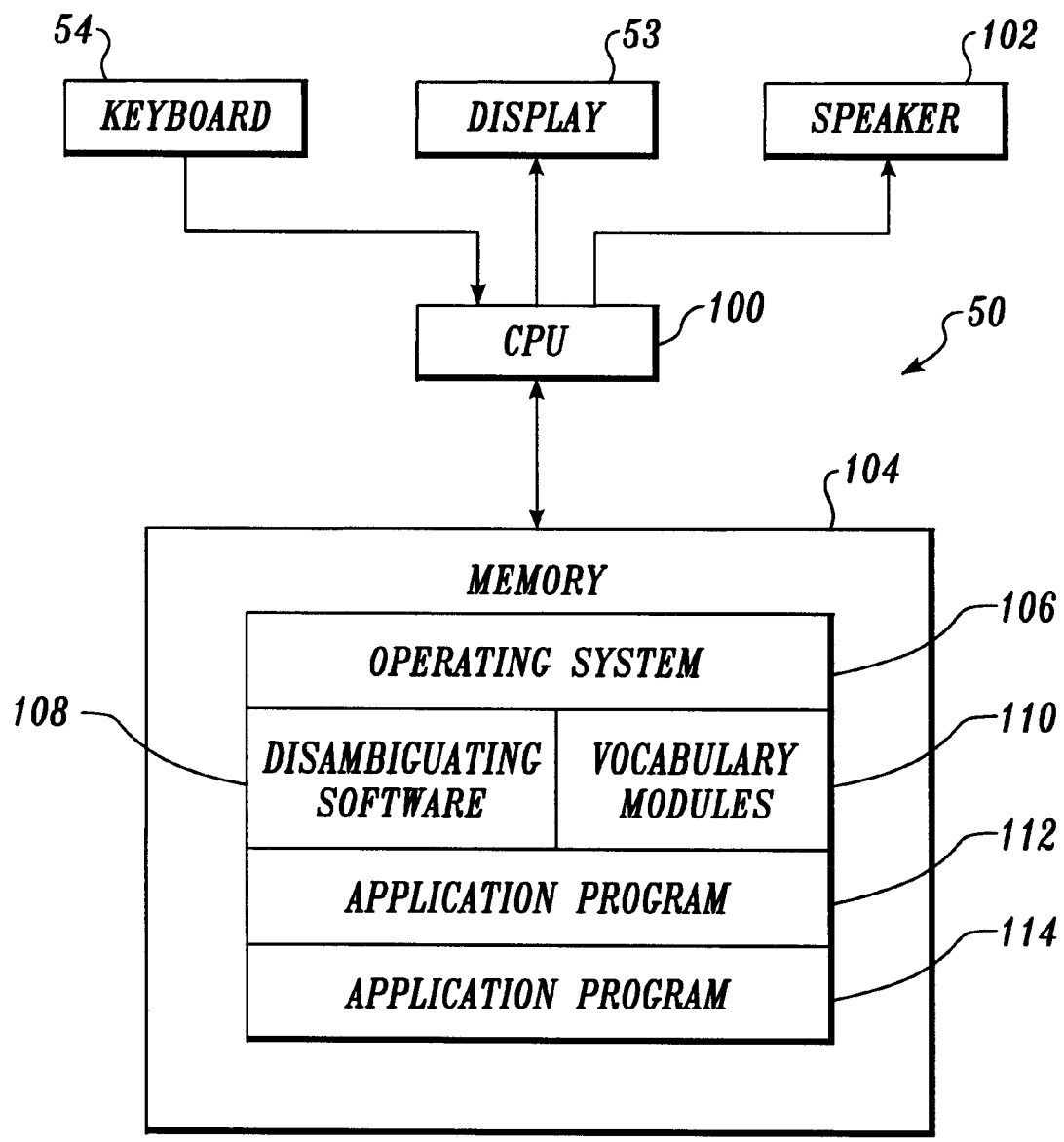
FIG. 2 is a hardware block diagram of the reduced keyboard disambiguating system of FIG. 1.

A block diagram of the reduced keyboard disambiguating system hardware is provided in FIG. 2. The keyboard 54 and the display 53 are coupled to a processor 100 through appropriate interfacing circuitry. A speaker 102 is also coupled to the processor. The processor 100 receives input from the keyboard, and manages all output to the display and speaker. Processor 100 is coupled to a memory 104. The memory includes a combination of temporary storage media, such as random access memory (RAM), and permanent storage media, such as read-only memory (ROM), floppy disks, hard disks, or CD-ROMs. Memory 104 contains all software routines to govern system operation. Preferably, the memory contains an operating system 106, disambiguating software 108, and associated vocabulary modules 110 that are discussed in additional detail below. Optionally, the memory may contain one or more application programs 112, 114. Examples of application programs include word processors, software dictionaries, and foreign language translators. Speech synthesis software may also be provided as an application program, allowing the reduced keyboard disambiguating system to function as a communication aid.

Returning to FIG. 1A, the reduced keyboard disambiguating system 50 allows a user to quickly enter text or other data using only a single hand. Data is entered using the data keys 56. Each of the data keys has multiple meanings, represented on the top of the key by multiple letters, numbers, and other symbols. (For the purposes of this disclosure, each data key will be identified by the symbols in the center row of the data key, e.g., "ABC" to identify the upper left data key.) Since individual keys have multiple meanings, keystroke sequences are ambiguous as to their meaning. As the user enters data, the various keystroke interpretations are therefore displayed in multiple regions on the display to aid the user in resolving any ambiguity. A selection list 76 of possible interpretations of the entered keystrokes is provided to the user in the selection list region 70. The first entry 78 in the selection list is selected as a default interpretation and displayed in the text region 66 at an insertion point 88. In the preferred embodiment, this entry is displayed with a solid-line box drawn around it both in the selection list 76 and at the insertion point 88. The formatting establishes a visual relationship between the insertion point object and the selection list, and signifies that this object is implicitly selected by virtue of being the most frequently occurring object in the current selection list.

The selection list 76 of the possible interpretations of the entered keystrokes may be ordered in a number of ways. In a normal mode of operation, the keystrokes are initially interpreted as the entry of letters to spell a word (hereinafter the "word interpretation"). Entries 78, 79, and 80 in the selection list are therefore words that correspond to the entered keystroke sequence, with the entries ordered so that the most common word corresponding to the keystroke sequence is listed first. For example, as shown in FIG. 1A, a keystroke sequence ABC, GHI, and DEF has been entered by a user. As keys are entered, a vocabulary module look-up is simultaneously performed to locate words that have matching keystroke sequences. The words identified from the vocabulary module are displayed to the user in the selection list 76. The words are sorted according to frequency of use, with the most commonly used word listed first. Using the example keystroke sequence, the words "age," "aid" and "bid" were identified from the vocabulary module as being the most probable words corresponding to the keystroke sequence. Of the three identified words, "age" is more frequently used than "aid" or "bid," so it is listed first in the selection list. The first word is also taken as the default interpretation and provisionally posted as text at the insertion point 88. Prior to pressing the Select key 60, this first word taken as the default interpretation is posted at the insertion point 88 and in the selection list 76 using identical formatting. For example, as in FIG. 1A, the word appears as text within a box drawn with solid lines that is just large enough to contain the word.

In the preferred embodiment, following entry of the keystroke sequence corresponding to the desired word, the user presses the Select key 60. Pressing the Select key redisplays the first entry in the selection list 76 with a box around it drawn with dotted lines, and also redisplays the first entry at the insertion point 88 with an identically formatted box drawn around it. Conceptually, the change from a solid-line box to a dotted-line box indicates that the text is closer to having been accepted into the text being generated, having been explicitly selected by virtue of the user pressing the Select key. If the first entry in the selection list is the desired interpretation of the keystroke sequence, the user continues to enter the next word using the data keys 56. The disambiguating system interprets the start of the next word as an affirmation that the currently selected entry (in this case, the first entry in the selection list) is the desired entry. The default word therefore remains at the insertion point as the choice of the user, the surrounding box disappears completely and the word is redisplayed in normal text without special formatting.

If the first entry in the selection list is not the desired interpretation of the keystroke sequence, the user may step through the items in the selection list by repeatedly pressing the Select key 60. For each press of the Select key, the next entry in the selection list is boxed with dotted lines, and a copy of the entry provisionally copied to the insertion point (replacing the previously provisionally posted word) and boxed with dotted lines. Provisionally posting the next entry to the text region allows the user to maintain their attention on the text region without having to refer to the selection list.

At the user's option, the system can also be configured such that, upon receipt of the first press of the Select key, the word provisionally posted at the insertion point can expand (vertically or horizontally) to display a copy of the current selection list. The user may select the maximum number of words to be displayed in this copy of the selection list. Alternatively, the user may elect to have the selection list always displayed at the insertion point, even prior to the first activation of the Select key.

If the second entry in the selection list is the desired word, the user proceeds to enter the next word after two presses of the Select key and the disambiguating system automatically posts the second entry to the text region as normal text. If the second entry is not the desired word, the user may examine the selection list and press the Select key a desired number of times to select the desired entry before proceeding to enter the next word. When the end of the selection list is reached, additional presses of the Select key causes the selection list to scroll and new entries to be added to the end of the selection list. Those entries at the top of the selection list are removed from the list displayed to the user. The entry selected by multiple presses of the Select key is automatically posted to the text region when the user presses any data key 56 to continue to enter text. Alternatively, following entry of the keystroke sequence corresponding to the desired word, the user may select the desired word from the selection list simply by touching it. When a word is selected in this fashion prior to any activation of the Select key, the selected word is immediately output at the insertion point without adding a space, and the selection list is cleared. The user may then press the Select key to generate a space that is immediately output to the text area at the insertion point 88.

In the majority of text entry, keystroke sequences are intended by the user as letters forming a word. It will be appreciated, however, that the multiple characters and symbols associated with each key allow the individual keystrokes and keystroke sequences to have several interpretations. In the preferred reduced keyboard disambiguating system, various different interpretations are automatically determined and displayed to the user at the same time as the keystroke sequence is interpreted and displayed to the user as a list of words.

For example, the keystroke sequence is interpreted in terms of the word stems corresponding to possible valid sequences of letters that a user may be entering (hereinafter the "stem interpretation"). Unlike word interpretations, word stems are incomplete words. By indicating the possible interpretations of the last keystrokes, the word stems allow the user to easily confirm that the correct keystrokes have been entered, or to resume typing when his or her attention has been diverted in the middle of the word. As shown in FIG. 1A, the keystroke sequence ABC GHI DEF has been interpreted as forming the valid stems "che" (leading to the words "check", "cheer", etc.) and "ahe" (leading to the words "ahead", "ahem", etc.). The stem interpretations are therefore provided as entries 81 and 82 in the selection list. Preferably, the stem interpretations are sorted according to the composite frequency of the set of all possible words that can be generated from each stem by additional keystrokes on the data keys. The maximum number and the minimum composite frequency of such entries to be displayed may be selected by the user, so that some stem interpretations may not be displayed. In the current example, the stems "bif" (leading to the word "bifocals"), "cid" (leading to the word "cider"), and "bie" leading to the word "biennial") are not shown. When listing a stem interpretation in the selection list, the stem is omitted if a stem interpretation duplicates a word that is shown in the selection list. When the stem is omitted, however, the word corresponding to the omitted stem may be marked with a symbol to show that there are also longer words which have this word as their stem. Stem interpretations provide feedback to the user by confirming that the correct keystrokes have been entered to lead to the entry of a desired word.

In the preferred embodiment, each sequence of keystrokes on the data keys 56 is also simultaneously interpreted as unambiguously specifying a string of alphabetic characters using the direct-pointing specification method. The data keys 56 contain up to three letters that are arranged in a row on the top of each key. Each letter is located in a different region on the key. For each keystroke on one of the data keys 56, the direct-pointing specification method interprets each keystroke as unambiguously specifying the particular letter closest to the exact point in the touchscreen key where the stylus or fingertip was lifted from the key. It is advantageous to visual display to the user which letter is selected. This can be done by highlighting the region in which the selected key is located. In addition, the user can slide his finger over the key until the proper region is highlighted, thus ensuring that the corrected letter is selected. Upon lifting his finger, the highlighted letter or region is selected. The example shown in FIG. 1A is based on the assumption that each key was tapped near its center, resulting in the direct-pointing interpretation "bhe" (the character string formed by the characters in the centers of the three keys ABC GHI DEF) being displayed as entry 83 in region 72 of the selection list region 70.

Preferably, the keystroke sequence is also interpreted as a string of numerical digits (hereinafter the "numeric interpretation"). Data keys 56 contain characters representing numerical digits. One of the interpretations provided in the selection list is therefore the numerical digits that correspond to the keystroke sequence. For example, entry 84 is the numeric interpretation ("798") of the keystroke sequence ABC, GHI, DEF.

As noted above, in the normal mode of operation the entries in the selection list 76 corresponding to words are presented first in the list. In other circumstances, it may be desirable to have other keystroke sequence interpretations presented first in the list. For example, in situations where a series of numbers are to be entered, it would be desirable to have the numeric interpretation of the keystroke sequence presented first. The reduced keyboard disambiguating system therefore allows a user to select between other modes of operation by accessing a system menu. In a numeric mode of operation, the first interpretation provided in the selection list is the number corresponding to the keystroke sequence. Each mode of operation changes the ordering of the selection list displayed to the user. Alternatively, by pressing the Numbers key, an explicit Numeric mode may be entered in which each keystroke on the data keys 56 is defined as unambiguously and uniquely specifying a single numeric digit. As shown in FIG. 1C, the faces of the data keys 56 and Shift key 62 in the touchscreen keyboard 54 of FIG. 1A are changed by the system to reflect the different key interpretations in this mode. In this explicit Numeric mode, each keystroke results in the corresponding numeric digit being immediately output to the text area at insertion point 88. Furthermore, in this explicit Numeric mode, each keystroke on the shift key 62 generates the digit "0" so that all ten decimal digits are simultaneously available. Furthermore, whenever the system is in a mode such as this explicit Numeric mode in which a keystroke on one of the data keys

56 results in the selection of an unambiguous character which is to be output to the text area, any object in the selection list which is implicitly or explicitly selected at the time of the keystroke is first output to the text area at the insertion point 88.

Figure 3A:
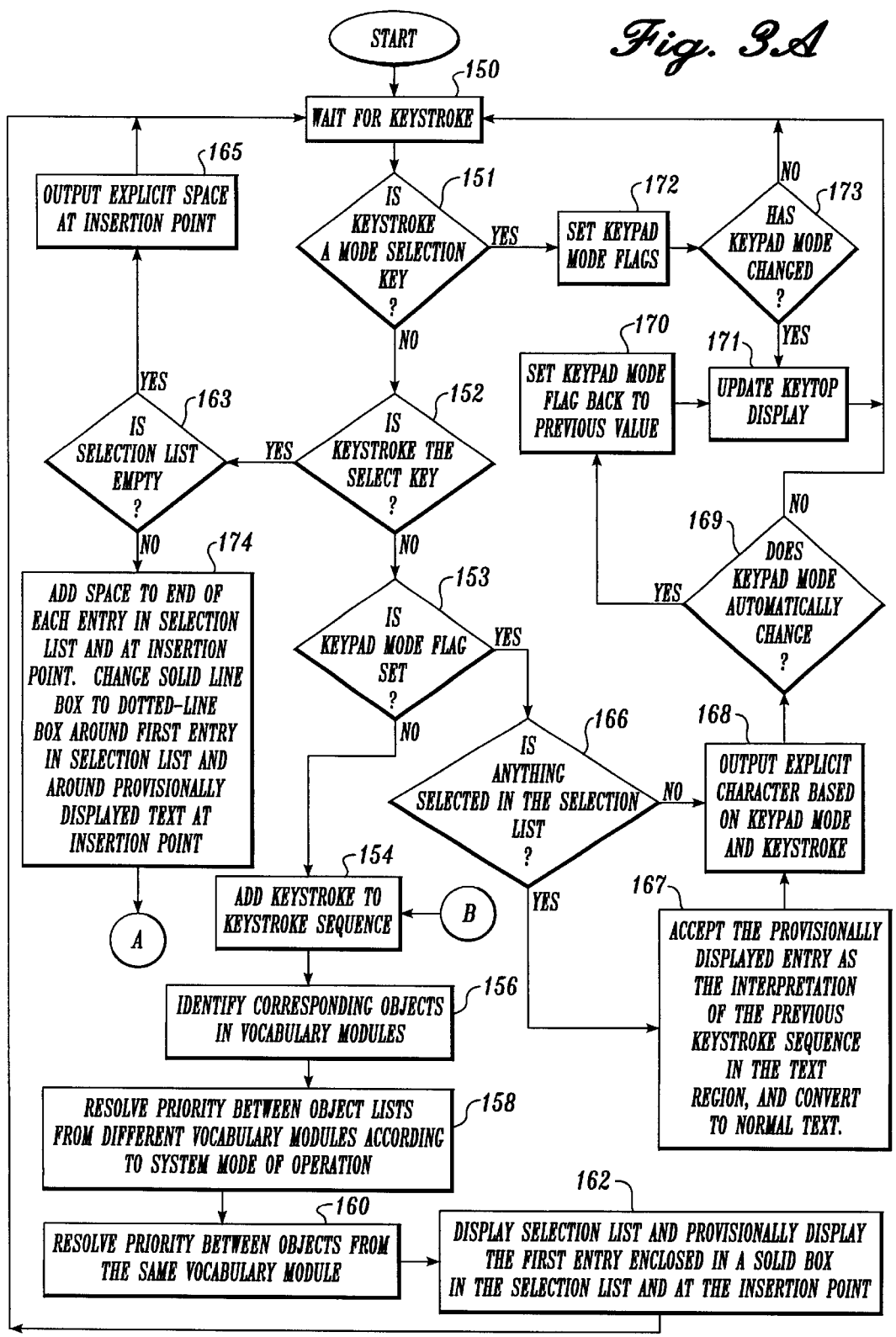
FIGS. 3A and 3B collectively depict a flow chart of a preferred embodiment ambiguating software for a reduced keyboard disambiguating system.
Figure 3B:
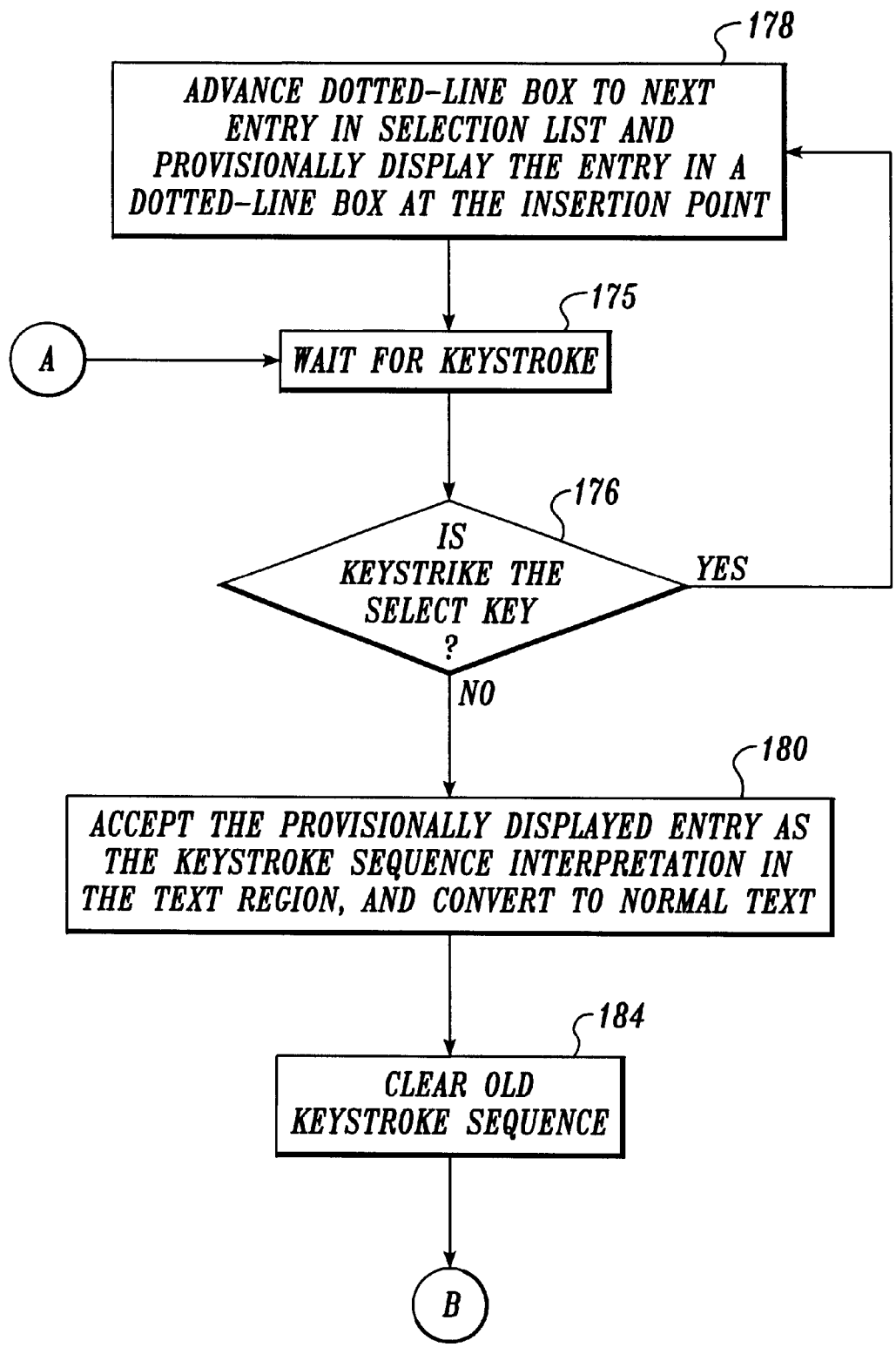

The operation of the reduced keyboard disambiguating system is governed by the disambiguation software 108. FIG. 3 is a flow chart of a main routine of the disambiguation software that generates a selection list to aid the user in disambiguating ambiguous keystroke sequences. At a block 150, the system waits to receive a keystroke from the keyboard 54. At a decision block 151, a test is made to determine if the received keystroke is a mode selection key. If so, at a block 172 the system sets a flag to indicate the current system mode. At a decision block 173, a test is made to determine if the system mode has changed. If so, at a block 171 the keytops are redrawn as needed to reflect the current system mode. If block 151 determines the keystroke is not a mode selection key, then at a decision block 152, a test is made to determine if the received keystroke is the Select key. If the keystroke is not the Select key, then at decision block 153, a test is made to determine if the system is in a special explicit character mode such as the explicit Numeric mode. If so, at decision block 166 a test is performed to determine if any provisionally selected item is present in the selection list. If so, at a block 167 the item is accepted and is output as normal text. Then, at a block 168, the explicit character corresponding to the keystroke is output to the text area. Then, at decision block 169, a test is made to determine if the system mode should be automatically changed, as in the case of Symbols mode. If so, execution proceeds to block 170 and the system mode is returned to the previously active mode, otherwise execution returns to block 150.

If at block 153 no explicit character mode is active, at a block 154 the keystroke is added to a stored keystroke sequence. At a block 156, objects corresponding to the keystroke sequence are identified from the vocabulary modules in the system. Vocabulary modules are libraries of objects that are associated with keystroke sequences. An object is any piece of stored data that is to be retrieved based on the received keystroke sequence. For example, objects within the vocabulary modules may include numbers, letters, words, stems, phrases, or system functions and macros. Each of these objects is briefly described in the table below:

| Object | Corresponding data |
|---|---|
| Numbers | A number, each digit of which corresponds to a single keystroke, e.g., the two-digit sequence "42". |
| Letters | A letter or sequence of letters corresponding to pairs of keystrokes, e.g., the three letter sequence "str". Each pair of keystrokes is used to disambiguate using the two-stroke specification method of inputting individual letters. |
| Word | A word corresponding to single or multiple keystrokes, e.g., the four letter word "done". |
| Stem | A sequence of letters representing a valid portion of a longer sequence of letters forming a word, e.g., "albe" as a stem of the word "albeit". |
| Phrase | A user-defined or system-defined phrase corresponding to single or multiple keystrokes, e.g., "To Whom it May Concern:". |
| System Macro | A word and associated code describing a system or user-defined function, e.g., "<clear>" to clear the current text region. In addition to the descriptive word, in the vocabulary module the system macro object is associated |

-continued

| Object | Corresponding data |
|---|---|
|  | with the executable code necessary for performing the specified function. |

While the preferred vocabulary objects are discussed above, it will be appreciated that other objects may be contemplated. For example, a graphic object may be associated with a stored graphic image, or a speech object may be associated with a stored segment of speech. A spelling object may also be envisioned that would link the keystroke sequence of commonly misspelled words and typing errors with the correct spelling of the word. For example, words that include the letter sequence "ie" or "ei" will appear in the list of words even if the keystrokes for these letters are accidentally reversed from their proper sequence. To simplify processing, each vocabulary module preferably contains similar objects. It will be appreciated, however, that various objects may be mixed within a vocabulary module.

Figure 9A:
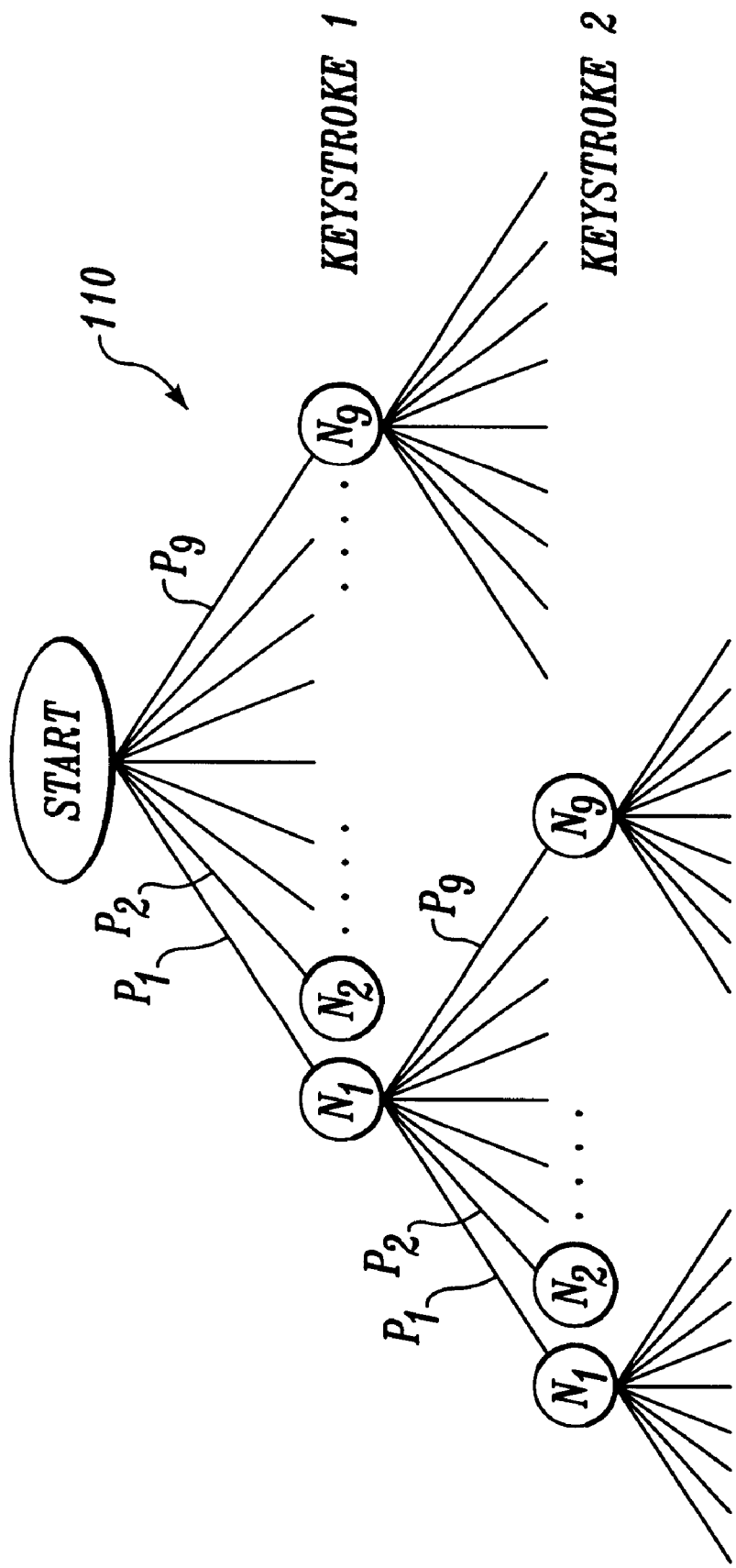
FIGS. 9A–9C are diagrams depicting the construction of a preferred vocabulary module and associated object lists for the reduced keyboard disambiguating system.

A representative diagram of a word object vocabulary module 110 is depicted in FIG. 9A. A tree data structure is used to organize the objects in a vocabulary module based on a corresponding keystroke sequence. As shown in FIG. 9A, each node N1, N2, . . . N9 in the vocabulary module tree represents a particular keystroke sequence. The nodes in the tree are connected by paths P1, P2, . . . P9. Since there are nine ambiguous data keys in the preferred embodiment of the disambiguating system, each parent node in the vocabulary module tree may be connected with nine children nodes. Nodes connected by paths indicate valid keystroke sequences, while the lack of a path from a node indicates an invalid keystroke sequence, i.e., one which does not correspond to any stored word.

The vocabulary module tree is traversed based on a received keystroke sequence. For example, pressing the first data key from the start block traverses path P1 to node N1. Pressing the ninth data key after pressing the first data key traverses path P9 to node N9. As will be described in greater detail below, each node is associated with a number of objects corresponding to the keystroke sequence. As each node is reached, an object list is generated of the objects corresponding to the keystroke sequence. The object list from each vocabulary module is used by the main routine of the disambiguating system to generate a selection list 76.

Figure 9B:
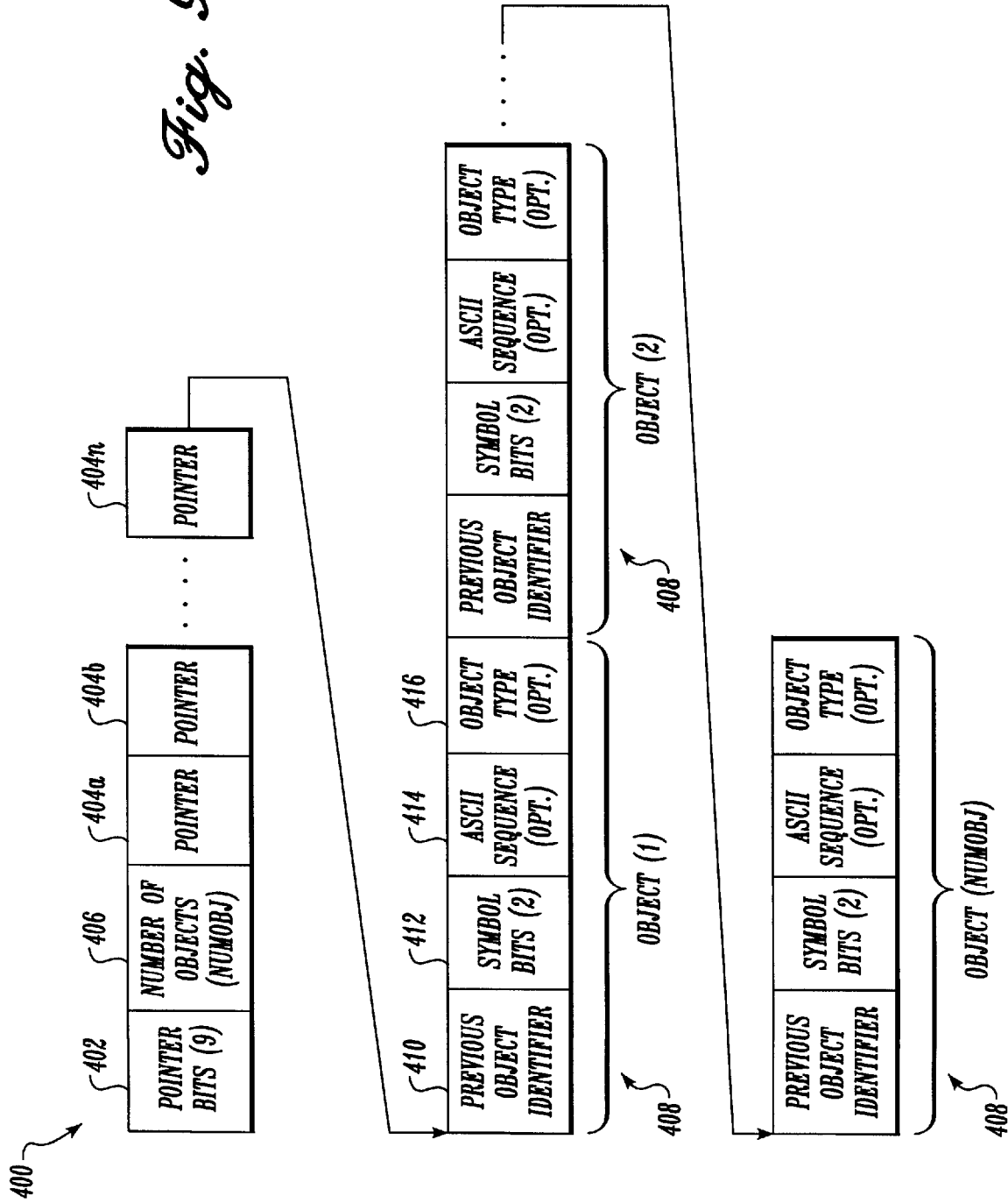

FIG. 9B is a block diagram of a preferred data structure 400 associated with each node. The data structure contains information that links each parent node to children nodes in the vocabulary module tree. The data structure also contains information to identify the objects associated with the particular keystroke sequence represented by the node.

The first field in the node data structure 400 is a pointer bits field 402 that indicates the number and identity of children nodes that are connected to the parent node. Since there are nine data keys, only nine children nodes may be connected to any parent node. In the preferred embodiment, nine pointer bits are therefore provided in the pointer bits field to indicate the presence or absence of child nodes. Each pointer bit is associated with a pointer field 404a, 404b, . . . 404n that contains a pointer to the respective child node data structure in the vocabulary module. Since a child node is only present if the keystroke associated with the child node is a valid continuation of the keystroke sequence associated with the parent node, the number of pointer fields varies for each node. For example, pointer bits field 402 may indicate that only six of the possible nine keystrokes lead to a valid child node. Because there are only six valid paths, only six pointer fields 404a, 404b, . . . 404f are included in the data structure for the parent node. The pointer bits field 402 is used to ascertain the identity of the pointer fields contained within the node data structure. If a keystroke does not lead to a valid child node, the associated pointer field may be omitted from the node data structure in order to conserve the amount of memory space required to store the vocabulary module.

Associated with each node are a number of objects that correspond to the keystroke sequence represented by the node. For each node, a number of objects field 406 is provided to indicate the number of objects (NUMOBJ) associated with the node. Since each node is associated with one and only one keystroke sequence, the number of objects associated with any given node is a constant. Each of the objects is associated by an object packet 408 contained in the node data structure. The number of objects field 406 specifies the number of object packets 408 that are present in the node data structure.

Figure 9C:
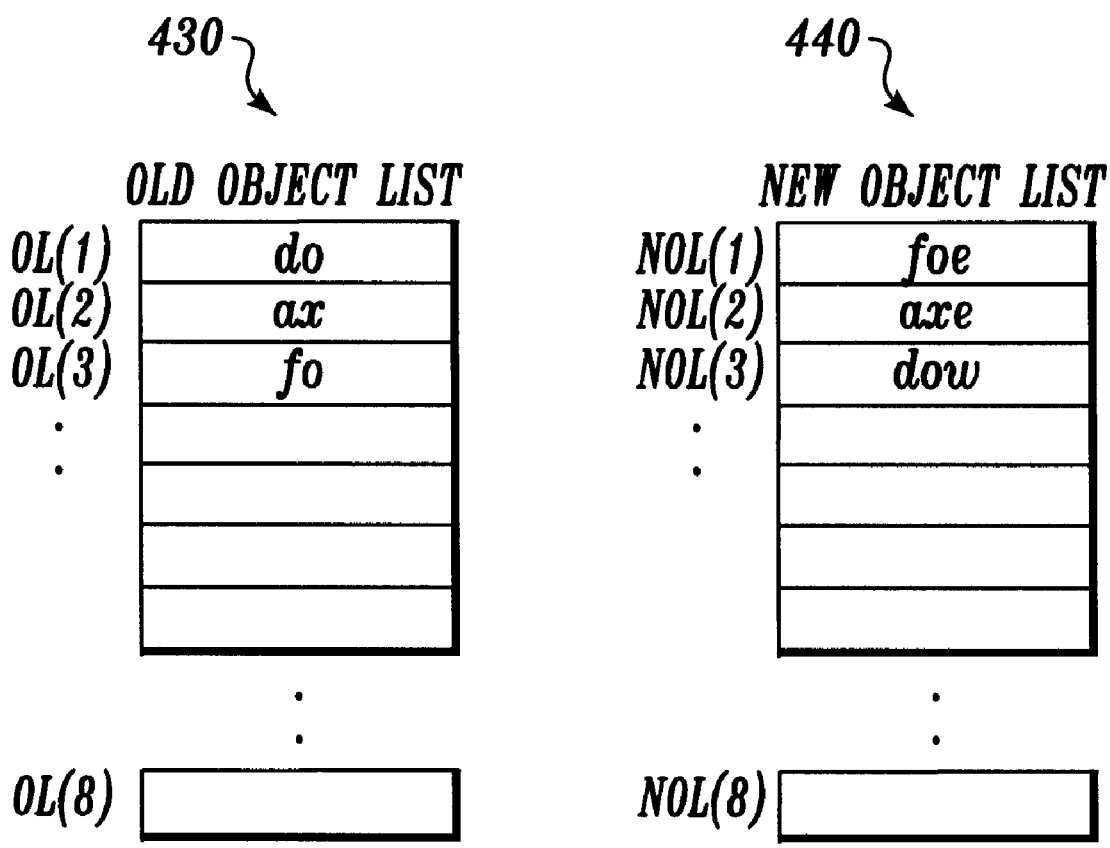

Each object packet 408 describes one of the objects corresponding to the keystroke sequence represented by each node. Describing an object requires maintaining two object lists. FIG. 9C depicts representative object lists created for a parent and a child in a vocabulary module tree. Object list 430 is an object list containing objects OL(1) –OL(8) associated with a node representing two keystrokes. Object list 440 is an object list containing objects NOL(1) –NOL(8) associated with a node representing three keystrokes. Each object list contains a list of all objects that are associated with each node. Object list 430 is associated with a parent node representing the keystroke sequence ADF OLX from the optimized keyboard of FIG. 1B. Object list 440 is associated with a child node representing the keystroke sequence ADF OLX EWV. Although a maximum of eight entries are depicted as capable of being stored in each object list, it will be appreciated that the size of the object list may be varied to account for the maximum number of objects associated with each node.

Each object associated with a child node is constructed by adding a character sequence onto an object that was constructed for the parent node. The object packet 408 therefore contains a previous object identifier field 410 that identifies from a parent node object list an object that is used to construct the child node object. For example, with reference to FIG. 9C, the third object "fo" in the old object list 430 is used to construct the first object "foe" in the new object list 440. The previous object identifier field 410 therefore provides a link to the entries in the old object list to identify the old object used to construct the new object.

The object packet 408 contains a two-bit symbol field 412 to indicate the symbol to add to the identified object in order to construct the new object. In the preferred embodiment, each ambiguous key contains a maximum of three letters. The symbol field bits at each node therefore specify the letter from final key in the node's key sequence which will be used to construct the new object. The letter is specified using the following binary code: "00" corresponds to the first letter on the key, "01" corresponds to the second letter on the key, and "10" corresponds to the third letter on the key. For example, with reference to FIG. 9C, the first object "FOE" in the new object list 440 is constructed by using the third object "FO" in the old object list 430 and adding an additional keystroke to specify the E. In the optimized keyboard arrangement of FIG. 1B, "E" is the first letter on the EWV key, therefore the symbol field corresponding to the object "FOE" is set to "00" to indicate the first letter on the key. Encoding the objects in this manner makes use of the known key sequence associated with each node and the known association of letters to keys to greatly reduce the amount of storage space required for each vocabulary module.

The vocabulary encoding technique also allows access to vocabulary module entries without searching. On receipt of each new keystroke the system follows a single pointer to the appropriate child node and then constructs the new object list. Also, rather than having to store every object in the vocabulary module, a new object is defined using the two-bit code to add onto an old interpretation. The disclosed storage method requires, however, maintaining an object list from a parent node in the vocabulary module tree in order to construct an object list of the child node.

Symbol field 412 may also be set to the value "11". When set to the value "11", the symbol field indicates the presence of an ASCII sequence field 414 immediately following the symbol field. The ASCII sequence field is used to store strings of characters that are to be appended to the identified object. For example, the ASCII sequence field may store the string "rward" to be added to the third object "fo" from the old object list to form the word "forward". In this manner, the length of an entered keystroke sequence does not necessarily directly correspond to the length of an associated object. The ASCII sequence field allows a vocabulary object to be identified by an arbitrary key sequence, i.e., stored at an arbitrary location within the vocabulary module tree.

The capability of storing objects with an arbitrary keystroke sequence is used to speed system processing of abbreviations and contractions. Abbreviations and contractions can be identified by a keystroke sequence that corresponds to their pure alphabetic content, ignoring punctuation. The result is that abbreviations and contractions are easily accessed by the user without entering punctuation, resulting in a significant savings in keystrokes. For example, the user can enter the keystroke sequence for "didn't" without typing an apostrophe between the "n" and the "t". The word in the vocabulary module that corresponds to the keystroke sequence "didnt" contains an ASCII sequence field with an apostrophe between the "n" and the "t". The disambiguating system will therefore automatically display to the user the correct word "didn't", without requiring the user to enter the punctuation mark. The disambiguating system uses the same technique to properly display foreign words having unique characters (such as "Ü", which may be entered as a "U"). Capitalization may be handled in a similar manner. Words that should always be used in all capital letters, with an initial capital letter, or with a capital letter in the middle may be associated with keystroke sequences which omit keystrokes indicating capitals, eliminating the need for the user to enter such capitalization. An object type field 416 may also be included in each object packet 408 to specify additional information about the object being constructed. The object type field may contain a code to specify whether the generated object is a word, a word stem, or any other object. The object type field therefore allows different types of objects to be mixed within a given vocabulary module. Moreover, the object type field may also include information regarding the part of speech of the word, information about how the object is capitalized, or information needed to construct various inflections and endings. A reduced keyboard disambiguating system using a vocabulary module having the part of speech information may use the additional information to implement syntactical analysis to improve the disambiguation process. The object type field may also contain a unique code to allow transmission of text in a compressed form. The unique code would be transmitted to a remote terminal instead of transmitting the entered keystroke sequence or the associated disambiguated characters.

One of the key features of the preferred vocabulary module tree data structure is that the objects associated with each node are stored in the node data structure 400 according to their frequency of use. That is, the first object packet 408 has a higher frequency of use than the second object packet in the node data structure, which has a higher frequency of use than the third object packet. In this manner, the objects are automatically placed in the object list so that they are sorted according to decreasing frequency of use. For purposes of this description, frequency of use of a word object refers to the likelihood of using a given word within a representative corpus of use, which is proportional to the number of times that each word occurs in the corpus. In the case of word stem objects, frequency of use is determined by summing the frequencies of all words which share the stem.

Storing frequency of use or other rank information at each node avoids the need to determine and sort on the rank of each object when the system is in use. This has important implications in the word object vocabulary, since the stored objects may include shared stems common to a very large number of longer words. Determining the relative rank of these stems dynamically would require traversing the entire tree of children nodes and accumulate information about each stem, a difficult task for a small computer to perform quickly. Determining this information in advance and storing it in the vocabulary data reduces processing overhead. Moreover, when the frequency of use or rank is represented implicitly by the ordering of objects 408 in the node, no additional storage space is required for this information.

While preferably the objects are stored within the node data structure 400 in order according to their frequency of use, it will be appreciated that a frequency of use field could also be associated with each object packet. The frequency of use field would contain a representative number that corresponds with the frequency of use of the associated object. The frequency of use between different objects would be determined by comparing the frequency of use field of each object. The advantage of using the latter construction that associates a frequency of use field with each object packet is that the frequency of use field could be changed by the disambiguating system. For example, the system could change a frequency of use field to reflect the frequency with which a user used certain objects within the vocabulary module during representative text entry.

Figure 10:
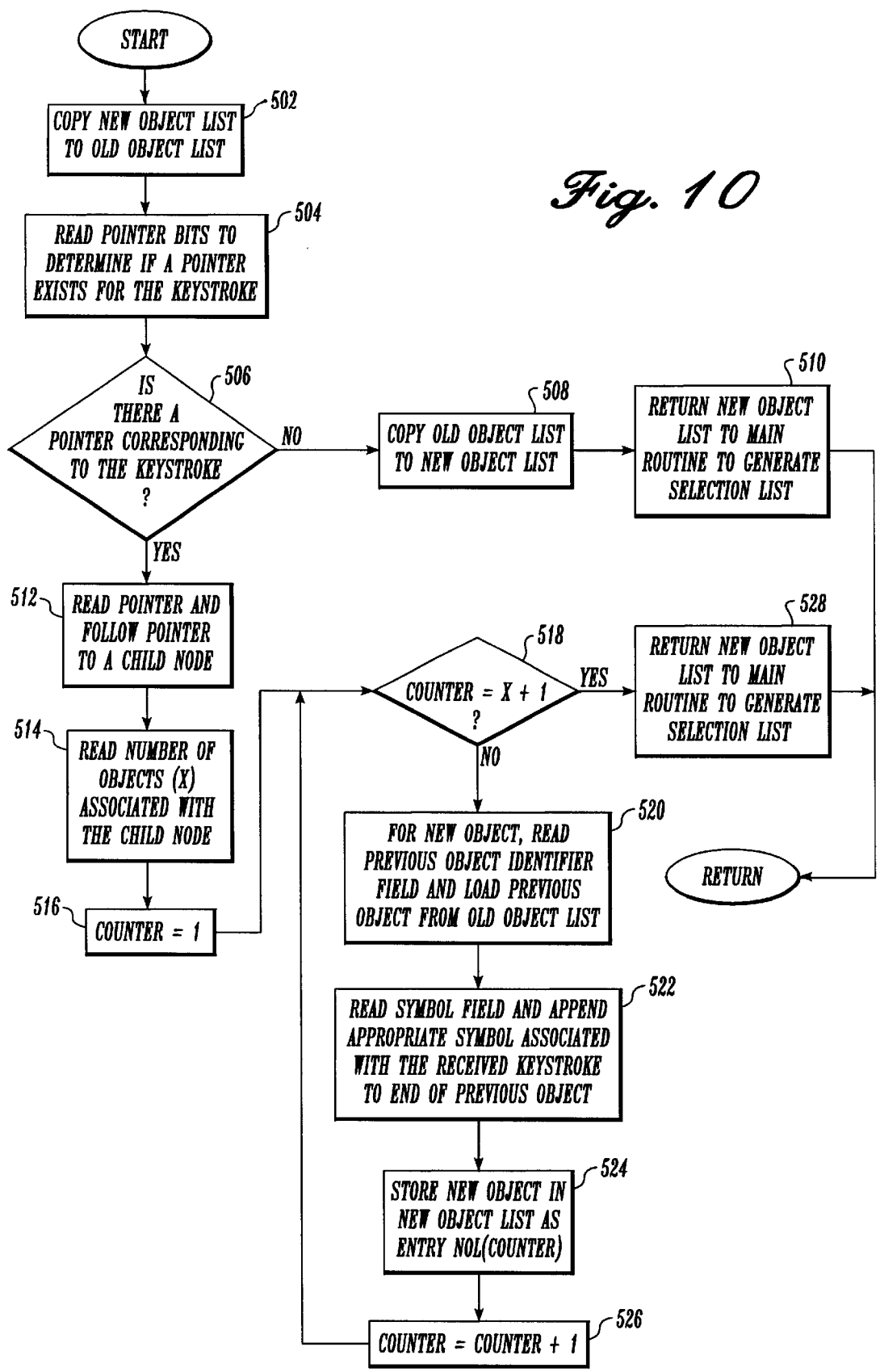
FIG. 10 is a flow chart of a subroutine for identifying objects contained in the vocabulary module.

Returning to FIG. 3, at block 156 those objects that correspond to the received keystroke sequence are identified in each vocabulary module. FIG. 10 is a flow chart of a subroutine 500 for analyzing the received keystroke sequence to identify corresponding objects in a particular vocabulary module. The subroutine 500 constructs an object list for a node representing a particular keystroke sequence. As noted above, to construct a new object list the disambiguating system starts with a copy of the old object list. At a block 502, the object list from the prior node is therefore stored so that it may be used to construct the new object list.

In the main routine shown in FIG. 3, a keystroke was detected by the system at block 150. The receipt of a new keystroke causes a downward traversal in the vocabulary module tree, if a valid path exists to a child corresponding to the keystroke. At a block 504 in FIG. 10, the pointer bits field of the parent node data structure is therefore examined to determine if a pointer corresponds to the received keystroke. At a decision block 506, a test is made of the pointer bits field to determine if a pointer field 404a, 404b, . . . 404n exists that corresponds to the entered keystroke. If no pointer field corresponds to the keystroke, at a block 508 the old object list is copied to the new object list. At a block 510, the object list is returned to the main routine to generate the selection list. Since the received keystroke is part of an invalid keystroke sequence that does not correspond to any object within the vocabulary module, the keystroke is ignored and the current object list is returned to the main routine as being the object list from the vocabulary module. The branch of the subroutine 500 that comprises blocks 508 and 510 therefore ignores any invalid keystroke sequences and returns the object list generated at the parent node for possible inclusion in the selection list generated by the disambiguating system.

If a pointer exists corresponding to the received keystroke at decision block 506, the subroutine proceeds to a block 512 where the pointer is followed to the child node representing the keystroke. When the child node is identified, a new object list corresponding to the node must be constructed. At a block 514, on identifying the child node, the number of objects associated with the node are determined from the number of objects field 406 in the child node data structure.

After determining the number of objects to be generated at the child node, the subroutine enters the loop comprised of blocks 516 through 526 to reconstruct the object list associated with the child node. At a block 516, a counter is initially set to one. At a block 518, a test is made to determine if the counter has exceeded the number of objects associated with the node. If the counter has not exceeded the number of objects associated with the node, at a block 520 the previous object identifier field 410 is examined and the corresponding object loaded from the old object list. At a block 522, the symbol field 412 is examined and the appropriate symbol associated with the received keystroke appended to the end of the identified object. It will be appreciated that an additional ASCII sequence may also be appended to the identified object at block 522 if the symbol field indicates the presence of an ASCII sequence field 414 in the node data structure. At a block 524, the combined object and symbol are stored as a new object in the new object list. After storing the new object in the object list, at a block 526 the counter is incremented by one. The subroutine then loops to decision block 518 to determine whether all of the objects associated with the node have been constructed.

If the test at decision block 518 indicates that all of the objects have been constructed for the node, the subroutine proceeds to a block 528 where the new object list is returned to the main routine in order to generate the selection list. It will be appreciated that the subroutine 500 for generating the object list associated with each node is performed for each keystroke received from the user. No "searching" of the vocabulary modules is performed as the user enters a new keystroke sequence, since each keystroke merely advances the subroutine one additional level within the vocabulary module tree. Since a search is not performed for each keystroke, the vocabulary module returns the list of objects associated with each node in a minimal period of time.

It will be appreciated that the relationship between vocabulary module objects and keystroke sequences is an implementation detail of the vocabulary module. If only a limited number of objects (i.e., fewer than a predetermined number) are associated with a particular node, additional nodes may be traversed to identify objects having a keystroke sequence starting with the entered keystroke sequence. The objects are identified by traversing downward in the vocabulary module tree along valid paths until the objects are identified. The objects are then placed in the selection list before all the keystrokes corresponding to the objects are entered. The objects are included in addition to the objects that are directly associated with the input keystroke sequence. Displaying objects associated with longer keystroke sequences in the selection list (hereinafter referred to as the "look-ahead" feature) allows the user to optionally select the objects immediately, without having to complete the remaining keystrokes to specify the object. The look-ahead feature is enabled when the number of objects identified in the vocabulary modules fails to fill the selection list region 70 on the display.

Returning to FIG. 3, at blocks 158–162 the objects found by looking up the keystroke sequence in the vocabulary modules are prioritized and displayed to the user in the selection list 76. To determine the sequence of objects displayed in the selection list, priorities are established between each vocabulary module and also between the returned objects from each vocabulary module.

To prioritize the object lists identified from the various vocabulary modules, at block 158 the mode of operation of the reduced keyboard disambiguating system is examined. As discussed above, in a normal mode of operation the word interpretations are displayed first in the selection list. The object list from a word vocabulary module would therefore be assigned a higher priority than the object list from the other vocabulary modules. Conversely, if the disambiguating system is in the numeric mode of operation, the numeric interpretations would be assigned a higher priority than the other vocabulary modules. The mode of the disambiguating system therefore dictates the priority between vocabulary module object lists. It will be appreciated that in certain modes, the object lists from vocabulary modules may be omitted from the selection list entirely.

Object lists generated from vocabulary modules may contain only a single entry, or they may contain multiple entries. At block 160, the priority between the objects from the same vocabulary module is therefore resolved if the object list contains multiple entries. The objects that match a particular keystroke sequence that are looked-up in a given vocabulary module are also given a priority that determines their relative presentation with respect to each other. As noted above, preferably the default presentation order is by decreasing frequency of use in a representative corpus of usage. The priority data associated with each object is therefore used to order the objects in the selection list. Since the selection list region 70 is limited in the number of entries that may be displayed, objects that fall below a predetermined minimum frequency of use may be omitted from the initial display of the selection list. The omitted objects may be later added to the selection list when the user scrolls beyond the end of the displayed list. The selection list is scrolled automatically so that the currently selected object is always visible. The user may also use dedicated scroll buttons to manually scroll additional objects into view, in which case the currently selected object may scroll out of view. Alternatively, all objects in the selection list may be displayed simultaneously in a "drop-down" list at the user's request.

Many of the properties associated with the presentation of the objects looked-up in a vocabulary module are user-programmable by accessing appropriate system menus. For example, the user can specify the order of individual objects or classes of objects in the selection list region. The user may also set the priority level that determines the priority between vocabulary modules and between the objects identified from each vocabulary module. In this manner, the number of entries presented to the user in the selection list region may be kept to a minimum. Additional entries in the selection list region may always be scrolled into view by repeated presses of the Select key.

After the priorities between the objects have been resolved, at a block 162 a selection list is constructed from the identified objects and presented to the user. As a default interpretation of the ambiguous keystroke sequence entered by the user, the first entry in the selection list is provisionally posted and highlighted at the insertion point 88 in the text region 66. The disambiguating software routine then returns to block 150 to wait for the next keystroke.

If the detected keystroke is the Select key, the "yes" branch is taken from decision block 152 to decision block 163, where a test determines if the current selection list is empty. If so, at a block 165 an explicit space is generated and immediately output to the text area, after which execution returns to block 150. If at decision block 163 the selection is not empty, the "no" branch is taken to a block 174. At a block 174, a space is added to the end of each text item in the selection list, and the solid-line box around the first entry in the selection list (and also at the insertion point where it has been provisionally posted) is changed to a dotted-line box. At a block 175, the system then waits to detect the next keystroke entered by the user. At a decision block 176, a test is made to determine if the next keystroke is the Select key. If the next keystroke is the Select key, at a block 178 a dotted-line box is placed around the next entry in the selection list and the entry is provisionally displayed at the insertion point with a dotted-line box around the entry. The routine then returns to block 174 to detect the next keystroke entered by the user. It will be appreciated that the loop formed by blocks 175–178 allows the user to select various interpretations of the entered ambiguous keystroke sequence having a lesser frequency of use by depressing the Select key multiple times.

If the next keystroke is not the Select key, from decision block 176 the routine continues to a block 180 where the provisionally displayed entry is selected as the keystroke sequence interpretation and is converted to normal text formatting in the text region. At a block 184, the old keystroke sequence is cleared from the system memory, since the receipt of an ambiguous keystroke following the Select key indicates to the system the start of a new ambiguous sequence. The newly received keystroke is then used to start the new keystroke sequence at block 154. Because the word interpretation having the highest frequency of use is presented as the default choice, the main routine of the disambiguation software allows a user to continuously enter text with a minimum number of instances where additional activation's of the Select key are required.

II. Advanced System Features

1. Visual and Auditory Feedback

In FIG. 1A, information about the state of the reduced keyboard disambiguating system 50 is provided to the user using various types of visual and auditory feedback. Entries in the selection list 76 may be presented in different colors depending on the interpretation of the keystroke sequence. For example, the word interpretation may be one color, the unambiguous spelling interpretation another color, and the numeric interpretation a third color. A user may therefore easily scan the selection list for the desired interpretation.

When the system is implemented on a touchscreen, at the user's option the normal on-screen keypad display may be replaced by a simple line drawing of a grid pattern corresponding to the positions of the keys. This pattern may be overlaid on top of other displayed information such as the text area 53 in FIG. 1A. This may be an advantage in systems with very limited screen sizes, since the user will in most cases quickly memorize which letters are assigned to which keys, and will not require the actual display of the keytops. A grid pattern may be drawn with thin lines that clearly indicate the key locations without significantly obscuring the underlying displayed information.

Audible tones indicate the state of selection list 76 and provide feedback about keystrokes to allow system information to be conveyed independently of any visual feedback provided in the selection list. Distinct tones indicate when the selection list is empty, when it contains a single unique word, and when it contains multiple ambiguous words. Another tone indicates when the second or third entry in the selection list has a frequency of use above a preset threshold, or when the difference in frequency between the first and second word falls below a selected threshold. This tone is generated as soon as the Select key is pressed, or, at the user's option, only on receipt of the first keystroke of the following word. In the situation where the user has already started to type the following word, a special key combination (e.g. Shift-Select) is designated so that the user can "re-select" the previous key sequence, where each activation of the designated key combination re-interprets the preceding key sequence as if an additional activation of the Select key had occurred prior to starting to type the following word. This allows the user to choose the correct word for the previous key sequence, without having to delete or re-type the word that has already been started. Still other tones distinguish the type of item being selected in the selection list as the Select key is pressed. Separate tones are therefore used to distinguish words, numbers, proper nouns, phrases, system macros, etc. Distinct tones can also be assigned to each key to allow identification of mistakes in keystrokes. Finally, a unique tone is heard when the user presses a key that is unavailable for a word as described above.

The system also provides visual feedback to the user about the multiple-stroke interpretation of the keystroke sequence being entered. This is accomplished by highlighting or otherwise visually indicating which of the symbols on the key being pressed has been selected if the key sequence is interpreted as unambiguous multiple-stroke input. Thus, as a single key is pressed one, two, or three times in succession (where the time interval between successive keypresses is less than the minimum time-out delay period), the first, second, third symbol represented by that key are indicated in turn. After the expiration of the minimum time-out delay period, or upon receipt of a keystroke on a different key, the currently indicated symbol is accepted as the next symbol of the multiple-stroke interpretation of the current keystroke sequence, and the visual indication of the symbol is removed from the key.

2. Punctuating, Capitalizing, Spacing, and Executing

When entering text, the reduced keyboard disambiguating system 54 allows punctuation to be entered using several techniques. All punctuation marks and symbols, including those that are used less often, are accessible from a system menu that is displayed in "Symbols Mode." As in the example page shown in FIG. 1D, this menu consists of a set of pages of punctuation characters where each page contains nine characters, each of which is associated with one of the data keys 56.

A special key (the Symbols key) or keystroke combination is designated which places the system into a "Symbols Mode." This method is especially effective in a touchscreen based implementation of the system, but may also be used in a system using a physical keypad. When a physical keypad is used, upon activation of the Symbols key or keystroke combination, a three by three menu grid appears on the screen containing the nine most common punctuation characters. Each location in the menu grid is mapped to the corresponding data key 56. In a touchscreen implementation, the tops of the data keys are simply redrawn to display the corresponding punctuation characters. Repeated activation's of either the Symbols key or the Select key advance through menus of other progressively less common punctuation characters, nine at a time. Advancing past the last page of Symbols takes the system out of Symbols mode (returning the system to whatever mode was previously active), and the punctuation menus disappear. Each punctuation character appears on the location of a menu screen that corresponds to the position of the data key to which that punctuation character is mapped.

When explicitly typing a word that requires typing a character with a special diacritic mark (umlaut, etc.), the base character (e.g. 'u') is first typed, then a special key (the "Diacritics" key) or key combination (e.g. Shift-Symbols key) is typed. A three by three menu is then displayed with all of the possible variant forms of the base character. FIG. 1E shows an example of a Diacritics page for the base character 'a'. Each of the various forms of any character (e.g. accent grave, accent acute, umlaut, etc.) always appears in the same location of the three by three matrix for each base character to which it can be applied. Thus, for example, the umlaut form of any character might always appear the upper right location of the three by three menu. Selecting the location displaying the desired form of the base character with the appropriate diacritic results in the previously generated base character already present in the explicit typing object being replaced with the form with the desired diacritic. Many common words contain a diacritic or a punctuation mark such as a hyphen or an apostrophe. As discussed above in the description of the vocabulary modules, when typing a word already in a dictionary that includes punctuation or diacritics, the key location corresponding to the punctuation or diacritic (e.g. the upper right hand data key for an umlaut) may be included or omitted when actually typing the key sequence intended to generate the word. All techniques for entering punctuation are simultaneously enabled during system operation.

Choosing a character from Symbols mode generates an explicit and unambiguous character. Generating such a character has the effect of implicitly accepting the current provisionally accepted text for output at the insertion point. Thus, even if the Select key has not yet been activated, the first word in the selection list is implicitly accepted and is output without appending a following space. This allows the user to easily generate a word and immediately follow it with a character such as a comma, period, or hyphen. The situation will occasionally arise when user wants to use the second or later word in the selection list without a following space. Another, probably less common situation, is where the user may want to concatenate two different words to form a new word. Four alternative strategies are available to address these situations.

The first alternative is to provide two separate and distinct unambiguous keys, one of which is labeled as a "Select Only" key. The Select Only key in this embodiment functions only to choose alternate words from the selection list, and does not result in a space being appended to any word thus selected. The second separate and distinct unambiguous key may, at the user's option, be labeled as a "Space" key which functions only to generate an immediate, explicit, and unambiguous space character at the insertion point 88.

Alternatively, the second unambiguous key may be labeled as a "Select" key, and functions exactly as the Select key described previously. This approach may be advantageous for languages such as German, where a large number of words are formed by simply concatenating other existing words. A "Select Only" key simplifies the process of concatenating arbitrary words from the selection list, particularly in an implementation that does not utilize a touchscreen and thus does not support the ability to choose words directly from the selection list on the screen.

The second alternative is to enable the use of "smart" punctuation where certain punctuation characters (e.g. comma, period, exclamation point, question mark, hyphen, apostrophe, colon, semi-colon, right parentheses, right bracket, and percent) will automatically delete a preceding space. With certain punctuation (such as the hyphen), there may be situations where the user would want to preserve the space and would need to generate an additional space that would be deleted by the "smart" punctuation. Other punctuation (such as a quotation mark), keeps track of the current context with a flag indicating whether the current quotation mark being generated is the first or second of a pair, since there is a need to distinguish between an opening (which does not delete the preceding space) and a closing quotation mark (which does delete the preceding space). In some languages, special forms of "smart" punctuation are included in entries in the standard word vocabulary module. For example, in French many words such as "me," "le," "de," etc. change their final letter to an apostrophe and are not followed by a space when the following word starts with a vowel. These forms (m', l', d' etc.) are included in the standard word vocabulary module under the two-keystroke sequence corresponding in each case to the first letter of the word followed by a keystroke on the data key corresponding to the position of the apostrophe in Symbols mode. Then, even when these word objects are selected by virtue of an activation of the Select key, they are output to the text area without a following space.

A third alternative allows the use of a particular modifying mode selection (e.g. Shift) that can be combined with a following Select key (or sequence of selects) so that Select in this case does not generate a following space. This mode shift would occur prior to hitting one or more selects, and would apply to whatever word is ultimately selected (including words selected by backing through the list with BackSpace after more than one Select). The mode is cleared when the first following Select is deleted, or when the next word or explicit character is started. Alternatively, the system may be configured so that the modifying mode selection (e.g. Shift) may be hit and modifies only the immediately following Select.

The fourth alternative allows the user to configure the system in a way that modifies the way in which BackSpace operates when activation's of Select are being deleted. This alternate mode of operation is structured in a consistent and simple model: The first Select of any uninterrupted sequence of Selects appends a Space to the current word and changes it to a provisionally accepted state if it is not already in that state. Subsequent Selects move forward through the selection list, where each selected word has a space appended. The first BackSpace following one or more Selects deletes the space appended to the currently selected word, but does not change which word is currently selected. Subsequent BackSpaces move backward through the selection list, where each selected word does not have an appended space, and is still in the provisionally accepted state. When the last of the Selects is deleted (i.e. the selection focus returns to the first word in the list), the first word in the list is taken out of the provisionally accepted state (its condition prior to hitting the first Select, where it is simply the most likely match for the current key sequence) SO that additional typing of characters results in generating a longer word, not a new word. The only task not accommodated by this strategy is concatenating words to the first word in the selection list. This can be accommodated by an alternate mode of operation that introduces an additional state at the end of the BackSpace sequence where the first word is provisionally accepted and has no space appended. This approach requires an extra BackSpace when "undoing" a sequence of Selects.

When the first letter of the word is capitalized, the words in the selection list 76 are optionally ordered to show proper nouns listed first in the list of interpretations. The words are sorted according to frequency of use, with the most commonly used proper nouns listed first. The frequency of occurrence of the proper nouns may be pre-stored in a vocabulary module, programmed by the user via a system menu, or adaptively calculated as the user continues to use the system as discussed below. The display of proper nouns first in the selection list is disabled or a warning is sounded when the capitalized word is the first word in a sentence.

When the selection list is empty (for example, when the user taps a touchscreen to simply reposition the text cursor without selecting a word to be brought into the selection list), activating the Select key generates an unambiguous and explicit space character at the insertion point.

3. Editing

Figure 4A:
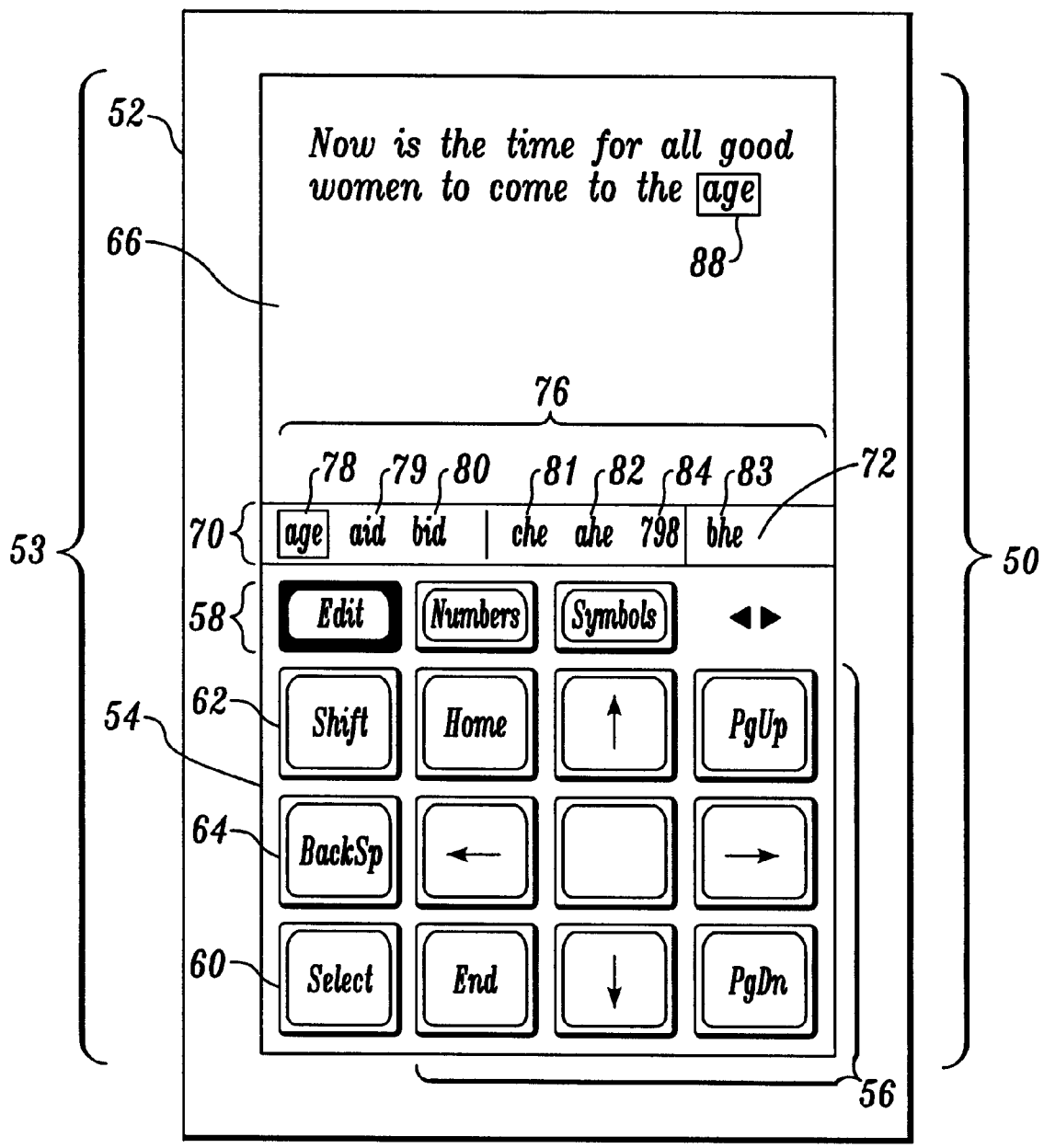
FIG. 4A is a schematic view of the preferred embodiment of an editing mode of the reduced keyboard disambiguating system.

A user of the reduced keyboard disambiguating system 50 may enter an editing mode via a special key (the Edit key) or keystroke combination. On entering the editing mode, in a touchscreen implementation, the keytops of the on-screen keypad are redrawn to show their re-mapped functions. FIG. 4A depicts the display 53 of a touchscreen based system while in editing mode. FIG. 4B depicts a system that utilizes a mechanical keypad, in which a key map 800 indicating the re-mapped data key functions is displayed to the user in the text region 66. Each box in the key map indicates the editing command that will result if the corresponding data key is pressed.

Editing is performed on a word-by-word basis. Once in the edit mode, the user selects a word to edit by moving a cursor 802 to highlight the word or by touching the desired word. The user selects a word to edit by using the data keys corresponding to the cursor movement arrows to move a word or a line at a time through the text displayed in the text region. Selecting a word in the text region recreates the same selection list 76 that was presented to the user at the time the edited word was added to the text region 66. To recreate the original selection list, the most efficient key sequence that would produce a given word is reconstructed from the word itself. The keystroke sequence is then interpreted using the vocabulary modules to reconstruct the environment (i.e., the contents of the selection list) from which the original word was selected.

Once a word is selected and the selection list redisplayed, the user has several different options for editing the word. One option allows the user to select a different word from the displayed selection list by appropriately pressing the Select key. Multiple presses of the Select key move down the selection list, in the same manner in which the edited word was originally selected. Pressing the BackSpace key moves up the interpretation list. The boxed word from the selection list is automatically added to the text region when the user leaves the editing mode. After any word is selected in editing mode, additional text typed is inserted after the word at the point being edited in the text region.

Editing of a particular word is completed by selection of an appropriate word from the selection list. When the editing of a word is complete, the user can use the cursor movement arrow keys to move through the text string displayed in the text region and select a different word for editing. When editing of the text is complete, the user exits the editing mode using the "exit" key.

At the user's option, a mode of operation may be enabled that modifies the operation of the BackSpace key when deleting characters from the text display. When this special delete mode is enabled, and the user deletes a space or punctuation character immediately to the right of a preceding word, the system automatically re-establishes the selection list in the same state as when the preceding word was initially generated. The Select key can then be activated to again move forward through the selection list, replacing the previously generated word with other items from the selection list. Likewise, the BackSpace key can be used to move backward through the list to select earlier items. Once the user has moved backward to the first item in the selection list, repeated activation's of the BackSpace key delete keystrokes from the end of the word. Similarly, at this point the alphabetic data keys may be activated to add keystrokes to the item and create a longer word.

At the user's option, a special "disambiguation check" editing mode of operation may be selected in which all of the words in the output text area are tested to determine for each word whether one or more of the following criteria applied to the output word at the time it was typed: (1) the word appeared as the first entry in the selection list; (2) the next most frequently occurring word that appeared in the selection list has a frequency of occurrence that exceeds a selected threshold; (3) the next most frequently occurring word that appeared in the selection list has a frequency of occurrence that differs from that of the output word by less than a selected threshold. The user may choose in a configuration menu which of the criteria must be satisfied, and to what values the thresholds will be set. When the "disambiguation check" editing mode of operation is entered, all words in the output text area that meet the currently selected criteria are re-displayed in a special manner such as highlighted or specially colored text. The user can then touch any such specially formatted word to replace it with the next most frequently occurring word that appeared in the selection list at the time the word was output. A special function key may also be provided that automatically advances to the next occurrence of a specially formatted word.

4. Shortcuts

The reduced keyboard disambiguating system 50 incorporates several shortcuts that speed entry of text into the system. One shortcut causes the entry of an unambiguous symbol or an unambiguous function to delimit a current ambiguous sequence, if there is one, and automatically select and accept the first entry in the selection list 76. For example, a user that enters the ambiguous sequence ABC ABC MNO, followed by an explicit (e.g., from Symbols Mode) apostrophe ('), will have the system automatically select and post to the text region the word "can", since "can" is the first (i.e. most likely) interpretation of the key sequence ABC ABC MNO. When a keystroke sequence is automatically interpreted in this manner, no space is generated following the selected interpretation. The user may therefore continue to enter the word by adding additional characters. This shortcut is typically used when punctuation marks are used in a keystroke sequence.

In addition to operating in different modes of operation wherein the selection list 76 is ordered to present particular keystroke interpretations as the first entry in the list, the reduced keyboard disambiguating system 50 also may enter (via a system menu, specially defined key, or keystroke combination) a number of dedicated modes wherein only one interpretation is made for each key and no entries are displayed in the selection list. For example, in a dedicated numeric mode, each keystroke corresponds to the entry of a number. In a dedicated cursor movement mode, each of the outside circle of data keys corresponds to a cursor movement direction to allow a user to manipulate a cursor in an application program. Those skilled in the art will recognize that other dedicated operating modes may also be envisioned, such as a mouse emulation or touch-tone phone emulation. When operating in the dedicated modes, text or commands are directly implemented since there is no ambiguity in the entered keystrokes.

5. Custom Vocabularies and Adaptive Frequency of Use

Among the vocabulary modules 110 contained in the reduced keyboard disambiguating system 50 is a custom vocabulary module. Words entered using the unambiguous spelling methods are automatically stored by the disambiguating system in a temporary vocabulary module. The words stored in the temporary vocabulary module will thereafter be automatically displayed in the selection list when the user enters the shorter sequence of single (ambiguous) keys for these words. When the user finishes editing the current text object being generated (e.g. closes a word processing document or accepts a text field entry), all of the words in the temporary dictionary that are still present in the document are added to the "permanent" custom vocabulary module. This prevents words that are simply misspelled (and subsequently deleted from the document or text field) from being inappropriately added to the custom vocabulary module.

In addition to adding words to the custom vocabulary module during normal text entry, words may also be added to a user's custom vocabulary module from a variety of other sources. For example, documents may be downloaded into the disambiguating system and parsed to identify proper nouns or other words that are not contained in the vocabulary modules present in the disambiguating system. After parsing, the newly identified words are added to the temporary vocabulary module. Such words are immediately available to be typed using the normal one keystroke per letter typing method. Any of the words that are thus typed by the user in the course of editing the document are then marked as "used" in the temporary vocabulary module. When the user finishes editing the document, only those words in the temporary dictionary that are marked as "used" and are still present in the document are added to the "permanent" custom vocabulary module. This avoids overburdening the custom vocabulary module with words that are not actually required by the user.

Custom vocabulary modules may also be uploaded or downloaded to other disambiguating systems or to a mass storage medium. A user may therefore merge their present custom vocabularies with other vocabularies created by another user.

The words in the selection list 76 identified from the standard vocabulary modules are preferably always presented to the user in the same order, according to decreasing frequency of use, so that the user can commit to memory the keystrokes necessary to enter a desired word.

III. Representative System Operation

Figure 5A:
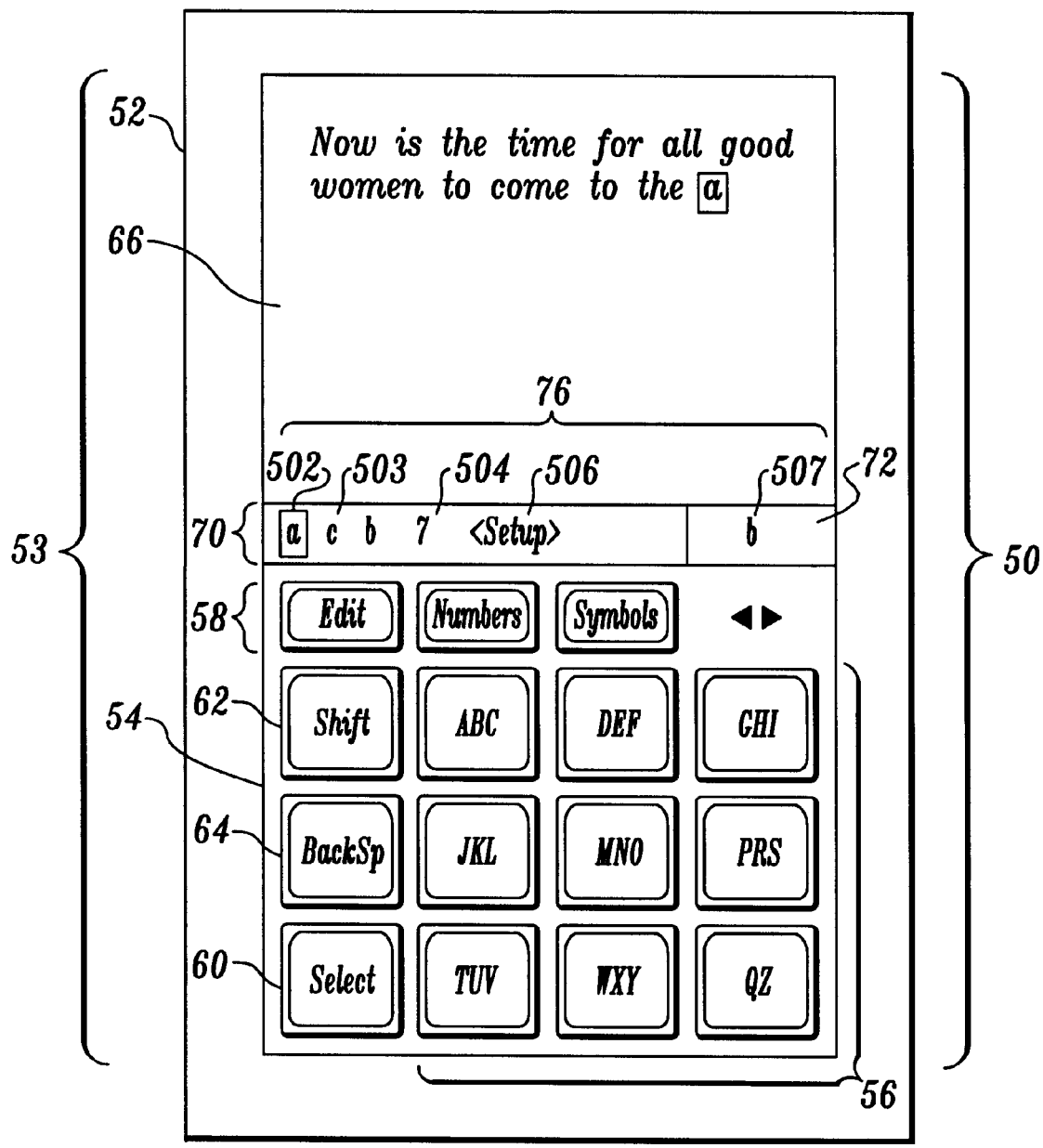

FIGS. 5A through 5K depict the display 53 of the portable computer 52 during a representative use of the reduced keyboard disambiguating system. After turning on the power of the portable computer, the text region 66 and selection list region 70 are empty. In FIG. 5A, the user has typed the phrase "Now is the time for all good women to come to the" and has then touched the ABC key approximately in the center of the key. The word vocabulary module has interpreted the ABC key as the word "a" 502 and placed the interpretation in the selection list 76. The stem vocabulary module has interpreted the ABC key as the stems "C" and "B" 503, and placed the interpretations in the selection list. The numeric vocabulary module has interpreted the keystroke as the number "7" 504. The system command vocabulary module has matched the keystroke sequence with the system command, "<Setup>" 506, and added the system command to the selection list. The unambiguous spelling method has interpreted the keystroke using the direct-pointing specification method, and has placed the interpretation "b" 507 in the unambiguous spelling display region 72 of the selection list region 70. The first entry in the selection list has been drawn with a solid-line box around it (indicating that it is the implicitly selected object), and this entry has also been provisionally posted in the text region at insertion point 88 with a solid-line box drawn around it.

Figure 5B:
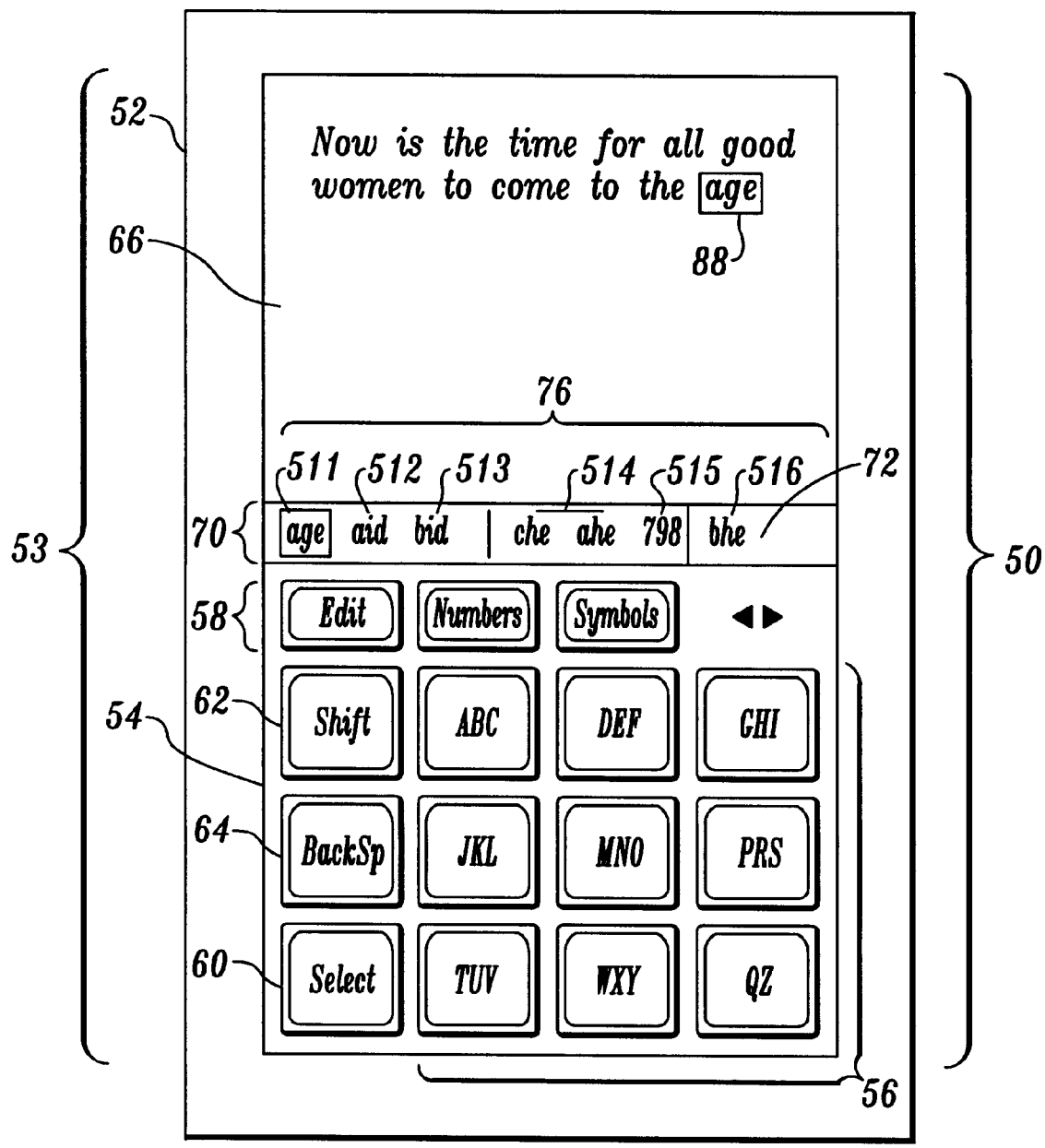

In FIG. 5B the user has subsequently the GHI key, followed by the DEF key, touching both keys approximately in the center. The word vocabulary module has interpreted the ABC GHI DEF keystroke sequence as the words "age" 511, "aid" 512, and "bid" 513, and placed these interpretations in the selection list 76. The stem vocabulary module has interpreted the keystroke sequence as the stems "che" and "ahe" 514, and placed the interpretations in the selection list. The numeric vocabulary module has interpreted the keystroke sequence as the number "798" 515. The unambiguous spelling method has interpreted the keystroke using the direct-pointing specification method, and has placed the interpretation "bhe" 516 in the unambiguous spelling display region 72. The first entry in the selection list "age" 511 has been drawn with a solid-line box around it, and has also been provisionally posted at insertion point 88 with a solid-line box drawn around it. For simplicity of illustration, the remaining FIGS. 5C–5K will illustrate the system operation in which the numeric and system command interpretations have been turned off.

Figure 5C:
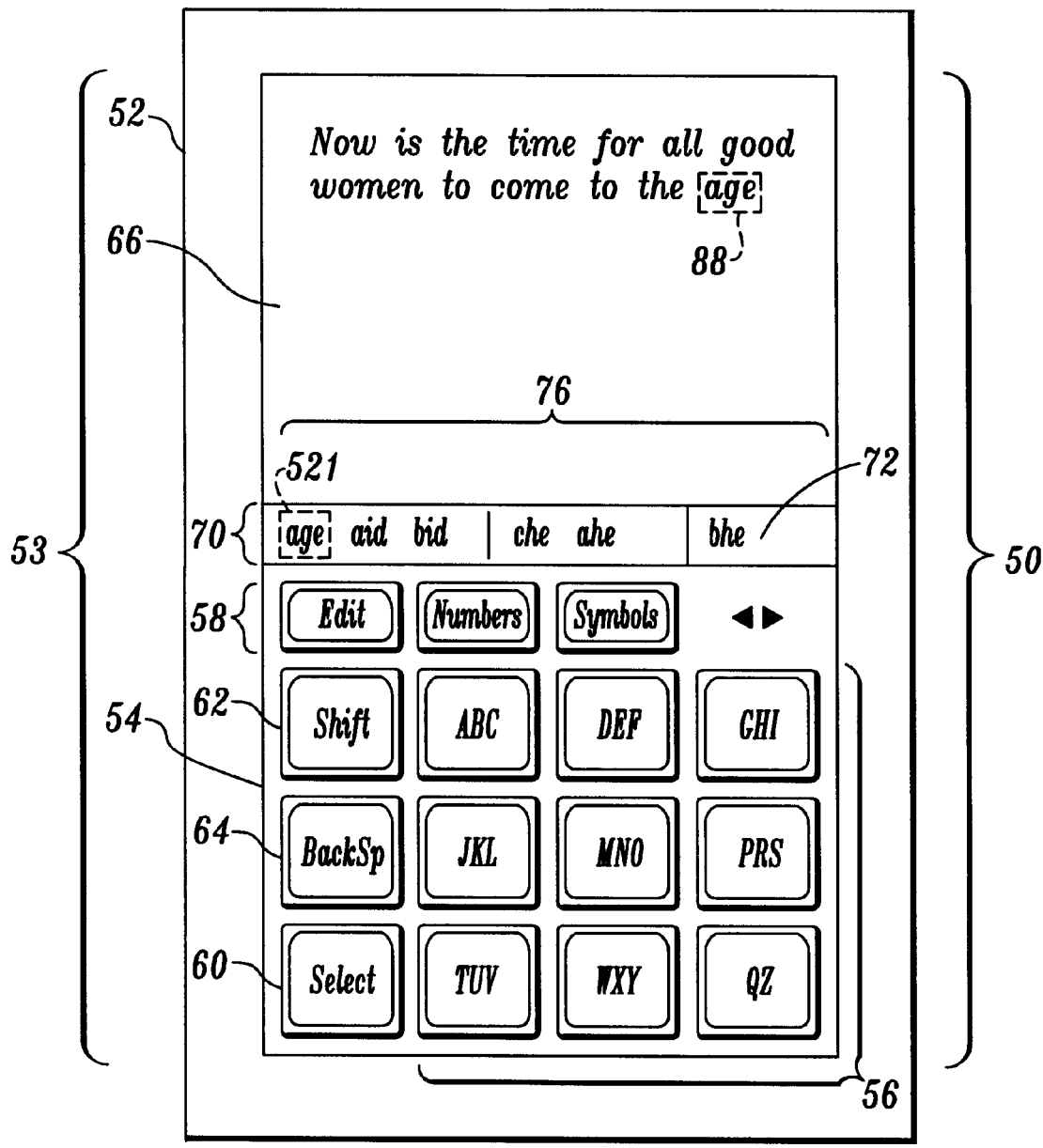

In FIG. 5C the user has pressed the Select key 60, explicitly selecting the first entry in the selection list "age" 521, and appending a space to each entry in the selection list. The boxes around the word "age" both in the selection list and where it had been provisionally posted at the insertion point 88 become dotted-line boxes, rather than solid, to indicate that the interpretation has been explicitly selected and will be accepted as output text if the user continues to enter text with an ambiguous keystroke.

Figure 5D:
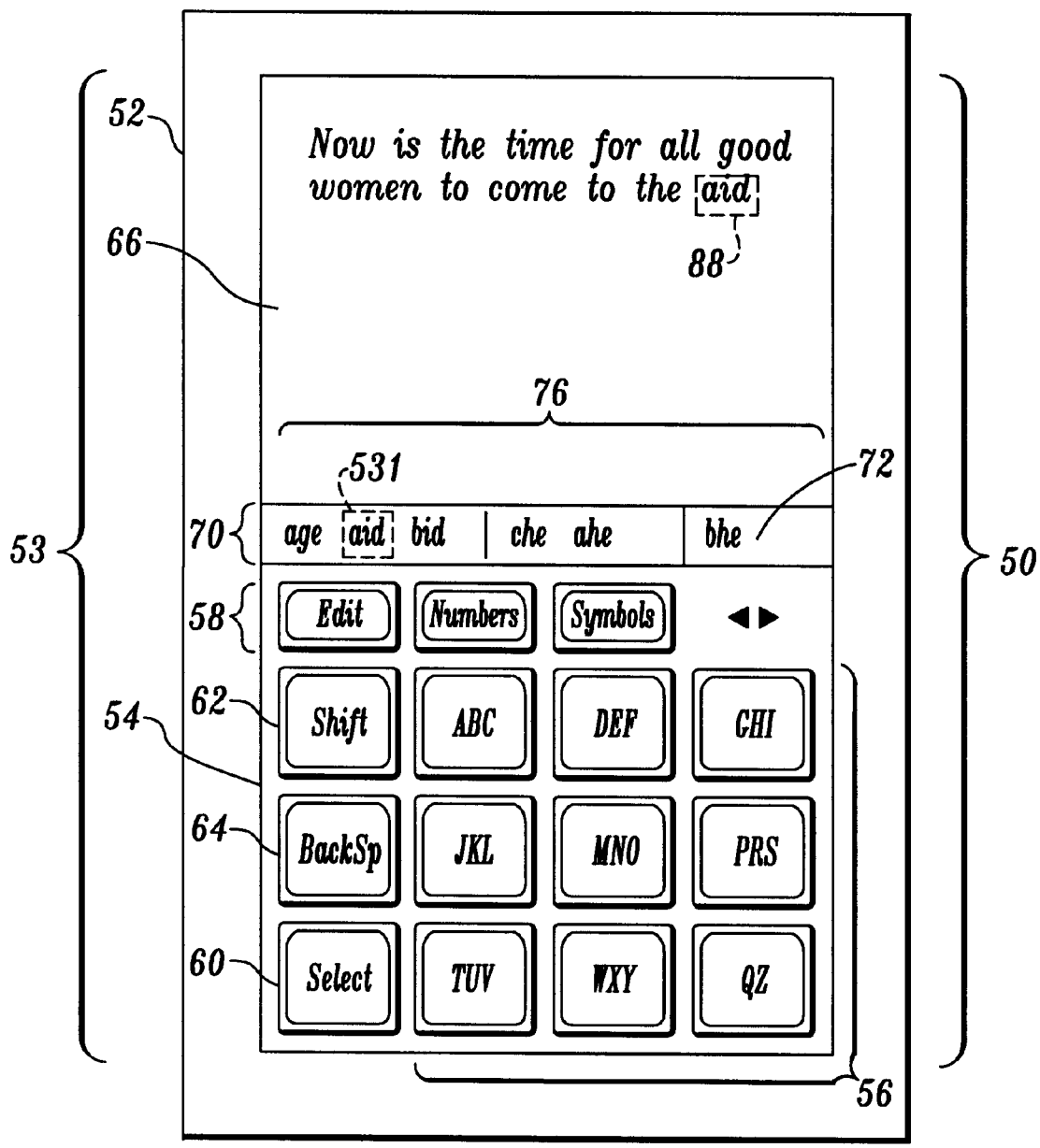

In FIG. 5D the user has pressed the Select key 60 one additional time, boxing the desired word "aid" 531 in the selection list. The word "aid" replaces the word "age" that previously had been provisionally posted at the insertion point 88.

Figure 5E:
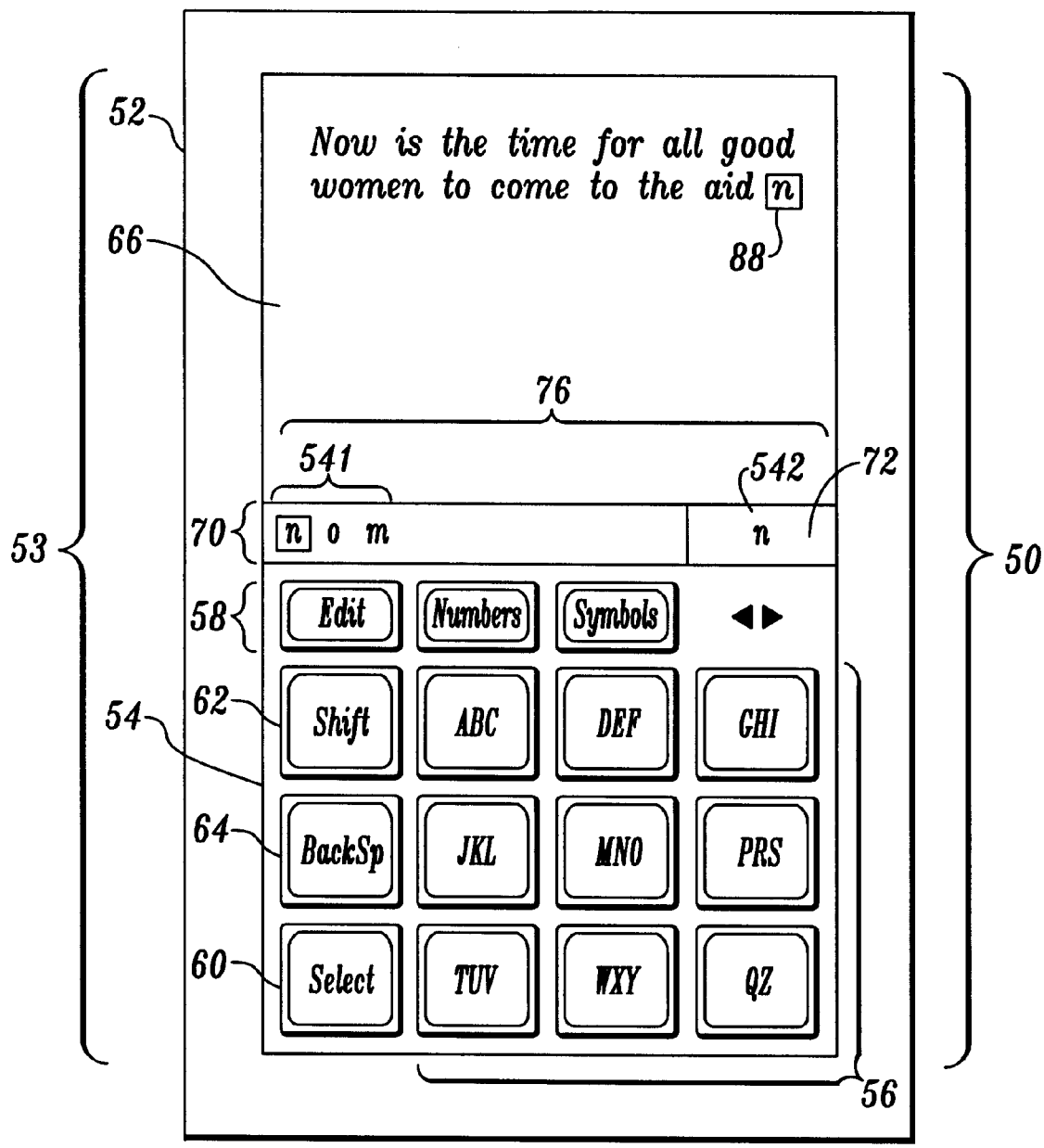

In FIG. 5E the user has pressed the MNO key to begin spelling the following intended word "of." The word "aid" that had been provisionally posted at the insertion point 88 has been accepted for output into the text area, and appears normally with no special boxing or formatting. The stem vocabulary module has interpreted the MNO key as the stems "n", "o", and "m" 541, and placed these interpretations in the selection list. The unambiguous direct-pointing specification method has placed the interpretation "n" 542 in the unambiguous spelling display region 72. The implicitly selected first entry in the selection list has been drawn with a solid-line box around it, both in the selection list and where it has been provisionally posted at the insertion point 88.

Figure 5F:
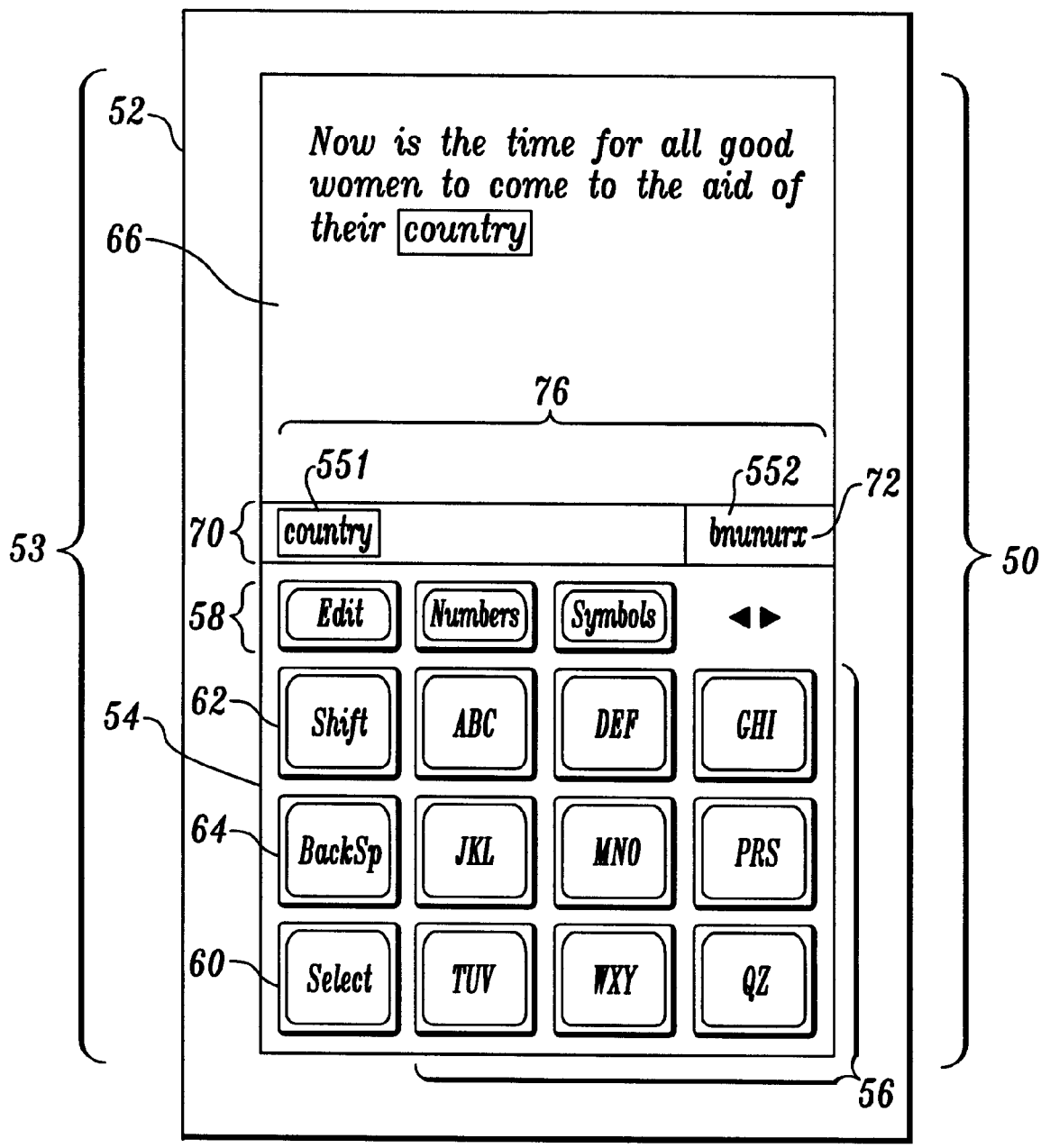

In FIG. 5F, the user has just pressed the WXY key to complete the sequence of keys required to type the word "country" 551, which is the implicitly selected first entry in the selection list and has been drawn with a solid-line box around it, both in the selection list and where it has been provisionally posted at the insertion point 88. Each key in the sequence has been touched approximately in the center, so the unambiguous direct-pointing specification method has placed the interpretation "bnunurx" 552 in the unambiguous spelling display region 72.

Figure 5G:
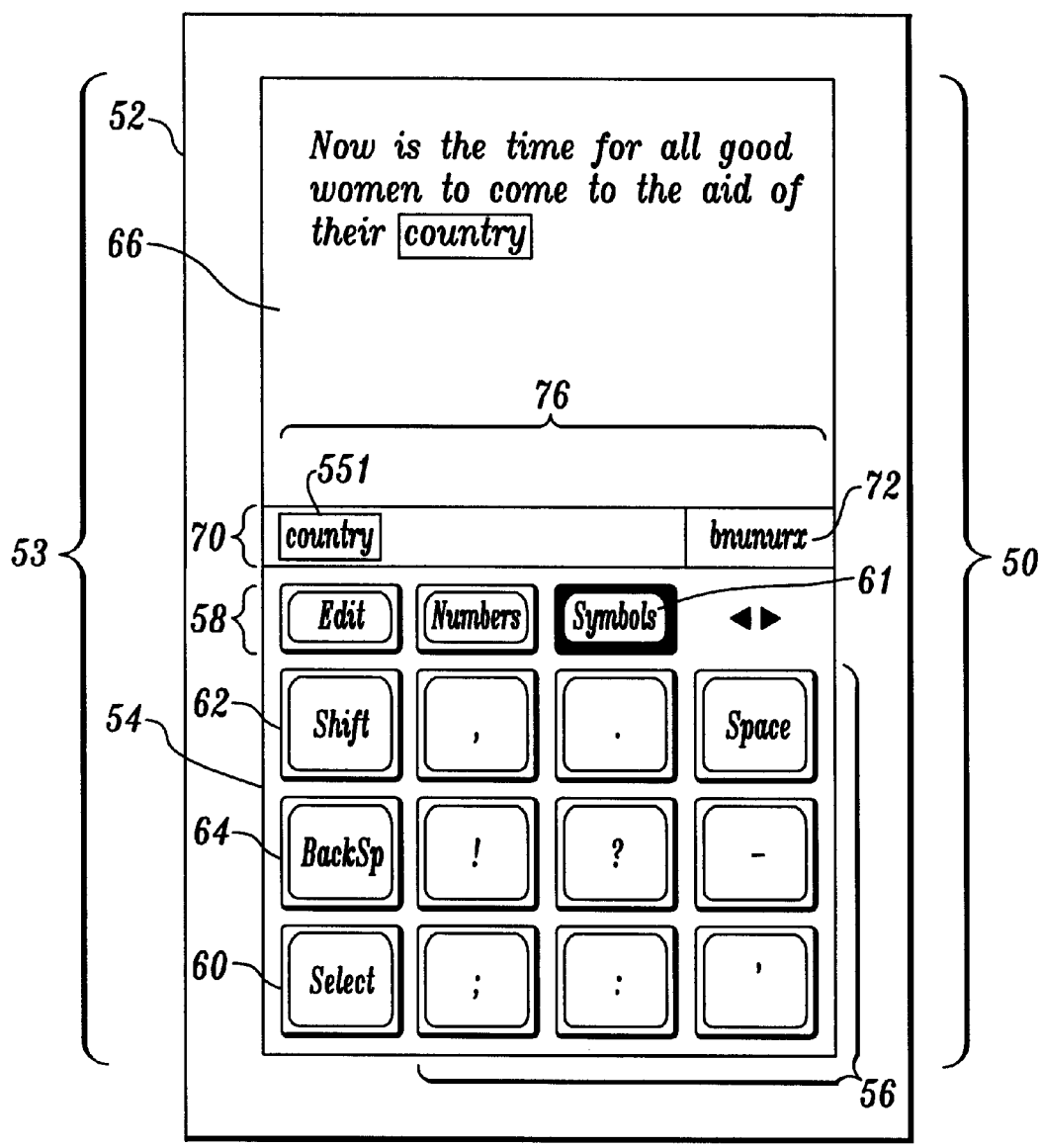
Figure 5H:
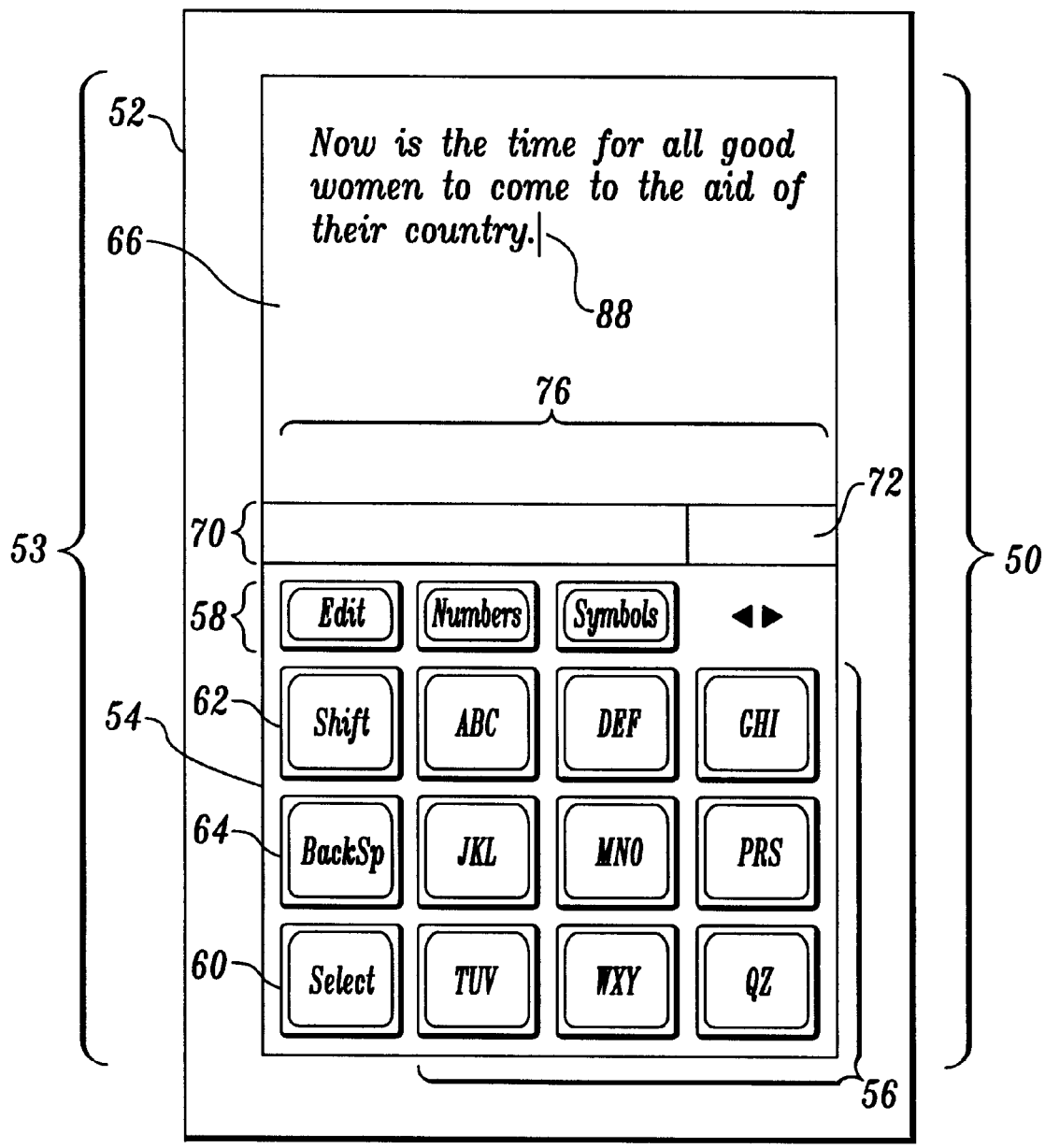

In FIG. 5G, the user has subsequently pressed the Symbols key 61, placing the system in Symbols Mode. The keytops of the data keys 56 have been redrawn to display the most common punctuation characters with which each key is associated. In FIG. 5H, the user has pressed the top center data key 56 on which a period had been displayed in Symbols Mode. As a result, an explicit period '.' punctuation character was selected for immediate output to the text area at the insertion point 88, following the previous implicitly selected word "country" which was accepted for output into the text area, and appears normally with no special boxing or formatting. At this point, the selection list is empty, since all ambiguous keystrokes have been resolved. A standard text editing caret appears at the insertion point 88, immediately to the right of the period that follows the word "country".

In FIG. 5I, the user has pressed the Select key 60. Since the selection list 76 was empty at the time the Select key 60 was pressed, this results in generating an explicit space which is immediately output at the insertion point 88, and appears to the right of the period and to the left of the standard text editing caret.

Figure 5J:
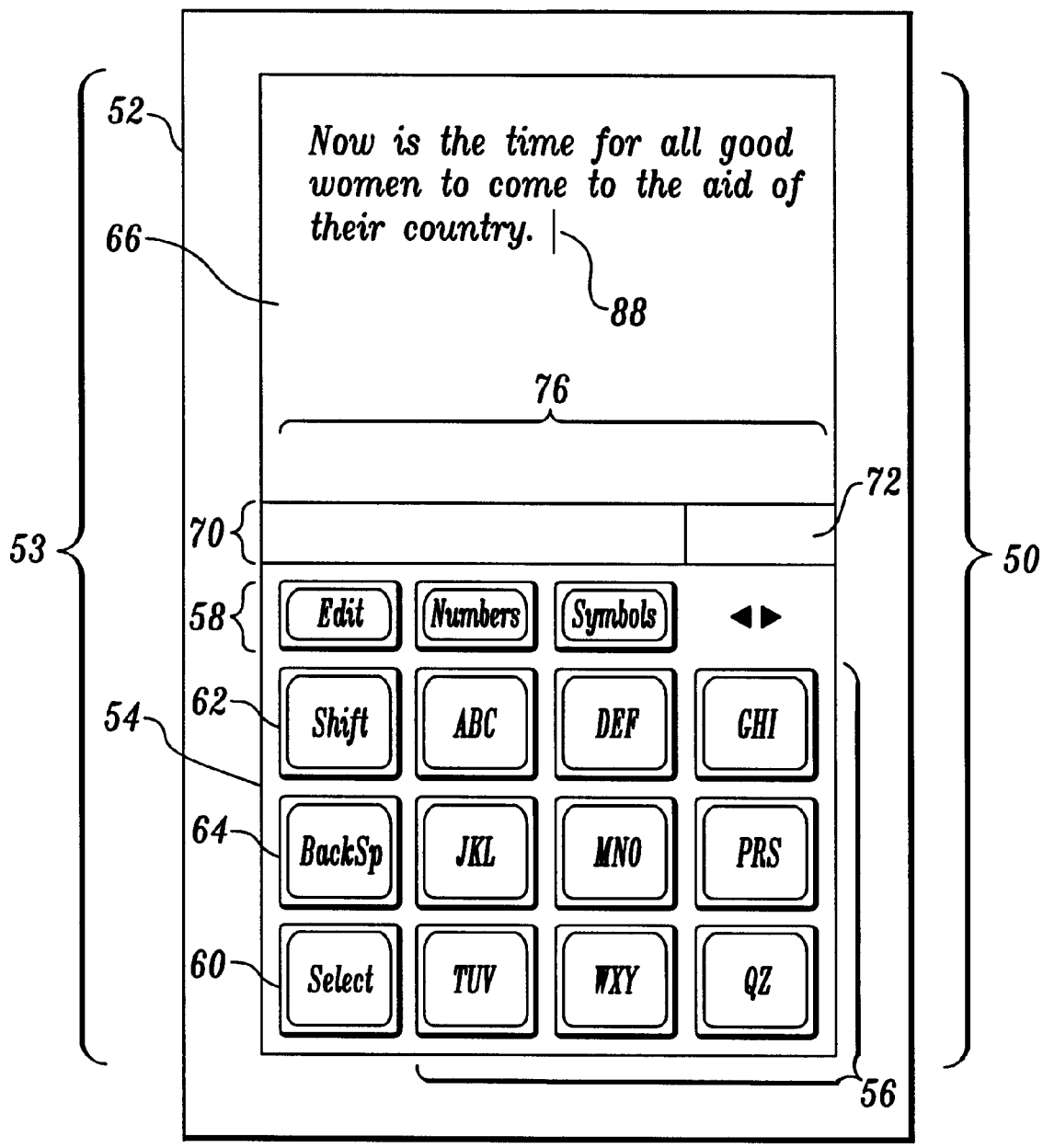
Figure 5J:
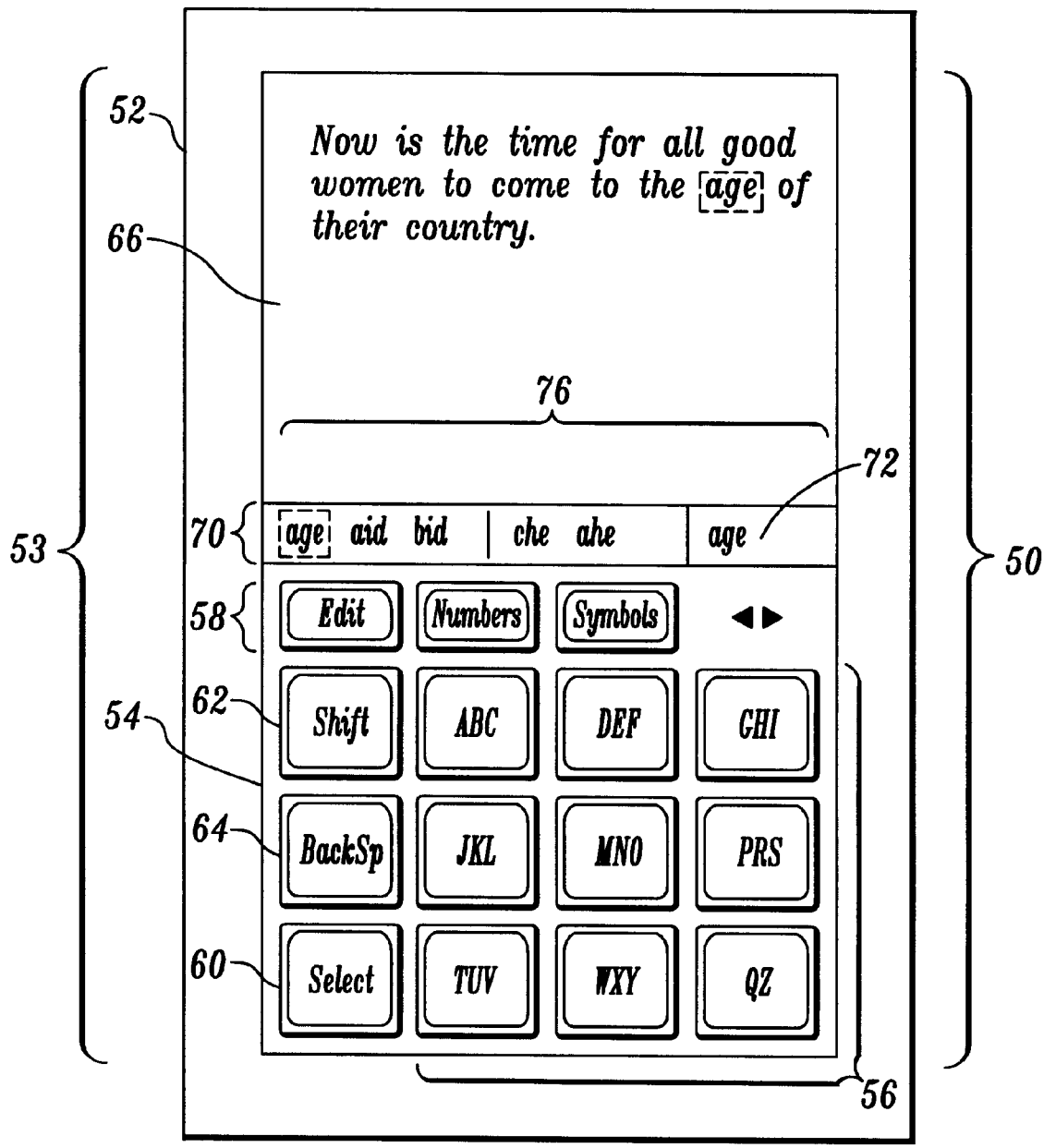

FIG. 5J shows the result of the exact same keystroke sequence described in 5A–5I, with the exception that the additional activation of the Select key 60 described in regard to FIG. 5D did not occur. As a result, the word "aid" shown in 5I has been left in the text output as the word "age". In FIG. 5J, the user has noticed that the intended word "aid" does not appear, and has selected the word "age" for editing by double-tapping it. Since the word "age" has been explicitly selected, it appears in a dotted-line box both in the selection list and in the text area. The selection list has been restored to the state in which it would appear immediately following the ambiguous keystrokes ABC GHI DEF required to generate the selected word "aid". The unambiguous direct-pointing specification method has assumed that each keystroke took place on the region of the specific letters forming the word "age", so the same word also appears in the unambiguous spelling display region 72.

Figure 5K:
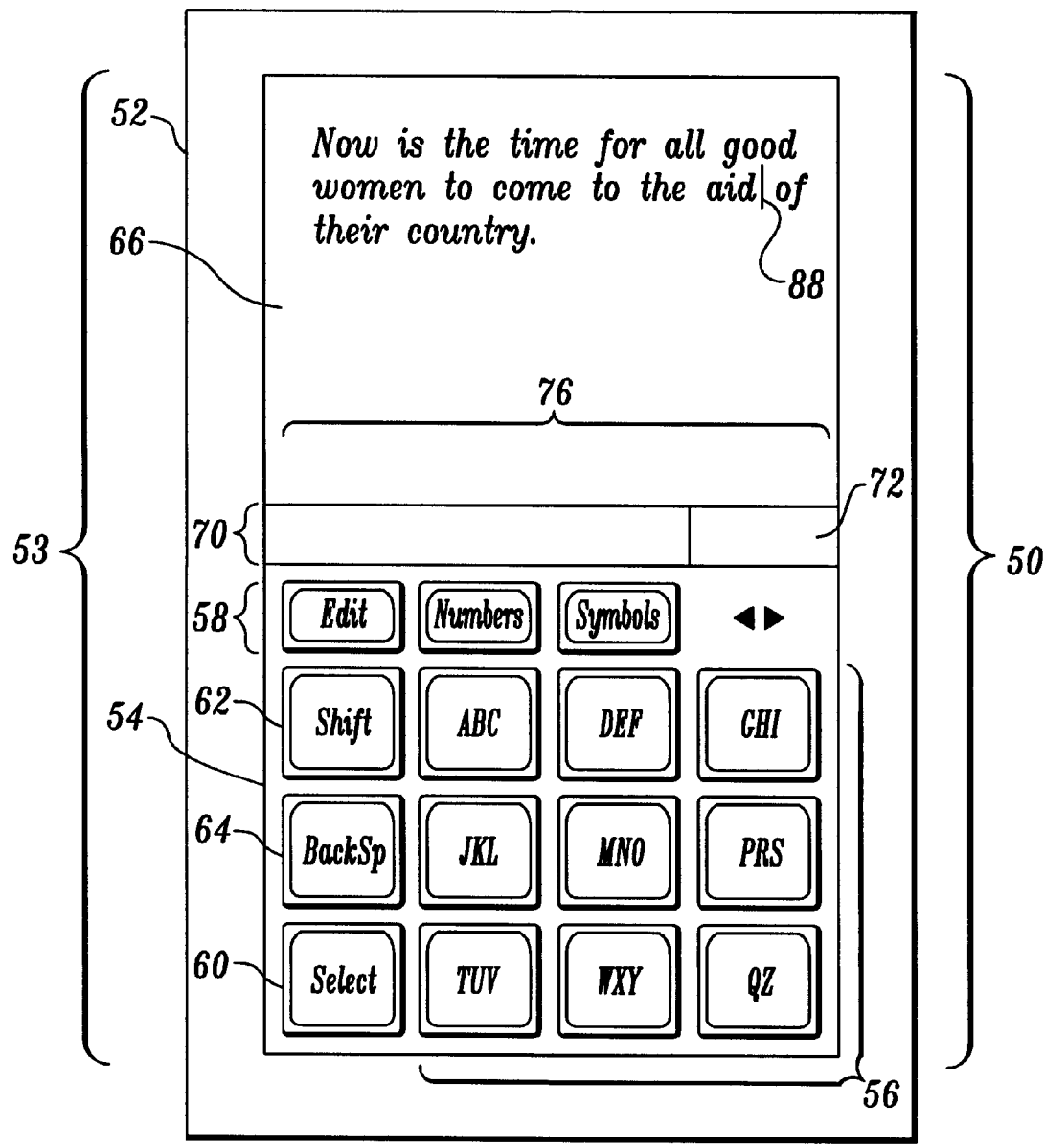

FIG. 5K shows the result of the user tapping the word "aid" which appears in the selection list in FIG. 5J. The boxed word "age" in the text output area is immediately replaced with the selected word "aid", which is displayed as normal text in the output area with no special boxing or formatting. At this point, the selection list is empty, since all ambiguous keystrokes have been resolved. A standard text editing caret appears at the insertion point 88, immediately to the right of the newly inserted word "aid".

IV. Alternate Applications and Embodiments

In some cases, it may be advantageous to use a keyboard on which letters are assigned to the keys more or less sequentially from "a" to "z" such as on current telephone keypads. In such cases, letters are not grouped on the keyboard in such a way as to minimize the possibility of ambiguities. As a result, the number of ambiguities increases during use. In accordance with the invention, in such cases it is advantageous to use a method to correctly determine from the context of the input which word of one or more ambiguous words is likely to be the desired word. The most likely desired word is then output to the user first in the selection list.

A surprising result is obtained when appropriate techniques are applied to the reduce the frequency of ambiguities in a such a system. The increasing ambiguities resulting in such a system is primarily the result of a small number of relatively common words that fail to appear as the first choice in the selection list because they correspond to the same key sequence as another, even more frequently occurring word. In many cases, the ambiguous pairs of words are dissimilar in their syntactic usage (e.g., for English, "am" and "an"; "me" and "of"). The ambiguity in these word pairs can often be resolved by examining the parts of speech and other attributes of the words which precede and follow the ambiguous entry. The correct word can then be placed first in the selection list (when the ambiguity is resolved by the preceding context), automatically corrected in the output text, or called to the user's attention for correction.

The following examples illustrate a method of the invention for the English language, using the keyboard layout shown in FIG. 1A. The words "me" and "of" are typed with the same keystroke sequence and thus constitute an ambiguous pair. In general usage, the word "of" will appear approximately 11 times more frequently than "me." However, "me" is the most frequently occurring word that fails to appear as the first choice in the selection list when using a touch-tone keypad layout. In the majority of cases where the word "me" appears, it is preceded by a preposition (e.g. "to", "with", "from", etc.), whereas "of" is seldom preceded by a preposition. Thus, every time the key sequence corresponding to "me" and "of" immediately follows a preposition, the word "me" can be placed first in the selection list, while in all other circumstances the word "of" will appear first in the list.

Similarly, "am" and "an" correspond to the same key sequence. The majority of occurrences of the word "am" will either be preceded or followed by the word "I." Thus the occurrence of the word "I" preceding the key sequence for "am" and "an" should result in "am" being placed first in the selection list, and "I" following the key sequence should result in the previously generated word "an" being automatically changed to "am." In each case, rules are applied to resolve the ambiguity between two particular words, both of which are known in advance. In the disambiguating system of the invention, the use of a few specific rules to a few known "problem" word pairs or groups greatly reduce the occurrence of ambiguities.

The approach of the invention can be effective in reducing ambiguity even when applied to a small number of the most frequently occurring words resulting in ambiguities. The following list sets forth how eight of the most commonly used ambiguous pairs can be resolved. Each rule provides a set of simple tests to indicate when the less frequently occurring word should be "selected" to appear first in the selection list or to replace the more frequently occurring word in text that has already been generated:

1. Select "me" over "of" when: the preceding word is a preposition.
2. Select "if" over "he" when: the preceding word is a verb other than a form of "to be" or a modal; or when the following word is neither a verb, an adverb, a conjunction, nor a preposition.
3. Select "then" over "them" when: the preceding word is a determiner; or when the preceding non-space character is a punctuation character; or when the preceding word is neither a transitive verb, a conjunction, nor a preposition.
4. Select "these" over "there" when: the following word is a noun or an adjective.
5. Select "go" over "in" when: the preceding or following word is the word "to".
6. Select "night" over "might" when: the preceding word is an article an adjective, or a preposition.
7. Select "am" over "an" when: the preceding word is the word "I", or the word "I" followed by one or more adverbs; or when the following word is the word "I".
8. Select "mr" and "ms" over "or" when: the Shift key has been pressed to capitalize the first letter of the word.

Figure 11:
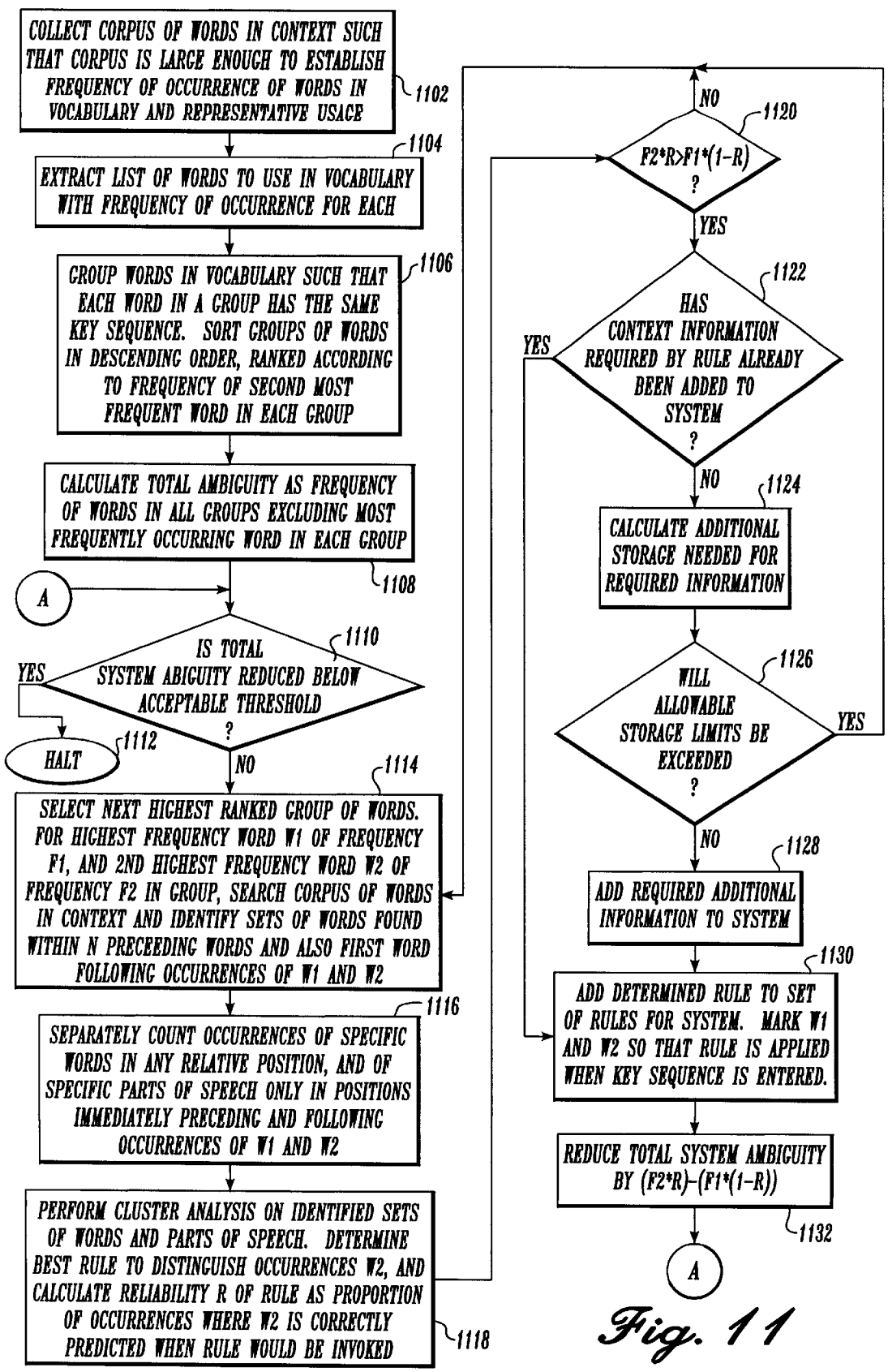
FIG. 11 is a flow chart of a preferred method for identifying rules to reduce ambiguity.

Ambiguity can be further reduced by applying rules to larger sets of words. The set of conditions used to distinguish word pairs need only be expanded as needed to resolve ambiguity in the target set of word pairs. This approach does not require significant amounts of either storage or processing power because only a limited number of words and a small number of conditions need be considered. FIG. 11 shows a flowchart of a method to determine what information should be included in the system to reduce the frequency of ambiguities without an unacceptable increase in the processing or storage requirements for the resulting system.

The method starts at a block 1102, where a large corpus of words in the context of their actual usage is collected. This corpus should be large enough to establish an average relative frequency of occurrence of each word to be included in the system's vocabulary. At a block 1104, the desired list of words for the vocabulary is extracted from the corpus, along with the frequency of occurrence for each, where the frequency is expressed as a number such as the average number of occurrences per million words. At a block 1106, vocabulary words are assigned to groups Gn where each group includes the words spelled by a unique key sequence. The words in a given group are therefore ambiguous when spelled on the reduced keyboard. These groups are sorted and ranked in descending order according to the frequency of the second most frequent word in each group. At a block 1108, the total ambiguity of the system is calculated the sum of the frequencies of all words in all groups excluding the most frequent word in each group. Then, at a decision block 1110, the current total ambiguity of the system is compared to a desired maximum value. When the ambiguity has been reduced below the desired threshold, the procedure halts at block 1112. Otherwise, at a block 1114, the next highest ranking group Gn is selected. For the highest frequency word W1 of frequency F1 and the second highest frequency word W2 of frequency F2, the corpus of words in context is searched. For each occurrence of W1, and for each occurrence of W2, the preceding N words, where N may be 3 for example, and the immediately following word, are identified and recorded. For each word W1 and W2, and for each relative position, the occurrences of specific words are counted. For the immediately preceding and following locations, the occurrence of each part of speech is counted.

At a block 1118, a clustering analysis is reformed on the identified sets of words and parts of speech to identify the best rule to distinguish occurrences of W2 from occurrences of W1 in the corpus of usage. The reliability R of the rule is a fraction between 0 and 1 representing the proportion of cases where the correct word is selected when the rule is applied to all instances of W1 and W2 in the corpus. At a decision block 1120, it is determined whether inclusion of the rule would result in an overall decrease in the total system ambiguity. If not, the process returns to block 1114 to consider the next highest ranked group of words. Otherwise, at a block 1122, the process determines whether the information required for the rule has already been added to the system. If not, at a block 1124, the additional storage required to add the new information is calculated (for example, the storage required to add tags or pointers to specific words, or label all words of a particular part of speech), and at a decision block 1126, if the additional storage required exceeds the previously determined maximum allowed, the process returns to block 1114 to consider the next highest ranked group of words.

Otherwise, the required additional information is added to the system (or was already present in the system), and at a block 1130 the determined rule is added to set of rules for the system, and W1 and W2 are marked so that the rule will be applied when the corresponding key sequence is entered. Then, at a block 1132, the total system ambiguity is adjusted to account for the improvement brought by the rule. The process returns to decision block 1110 to determine if the process should halt. Additional refinements may be added such as a process to first record all potential rules, including the resulting improvement in ambiguity and information required, then to analyze the set of rules and rank the rules with respect to the amount of improvement gained for a given cost of additional storage.

This approach can also be used when words are always placed in the selection list in the same relative order. If the user begins typing the next word without having selected the determined word, the system can generate a signal to call the user's attention to the fact that there is a significant likelihood that the desired word may not have been selected. This may be preferable for users who prefer a system with a fixed and predictable behavior (i.e. words always appear in the selection list in the same order). In this situation, even when the user has already started to type the following word, a special key combination (e.g. Control-Select) is designated so that the user can "re-select" the previous word, choosing the correct word of the ambiguous pair, without having to delete or re-type the word that the user has already started typing.

While the preferred embodiment of the invention has been illustrated and described, it will be appreciated that various changes can be made therein without departing from the spirit and scope of the invention. For example, those skilled in the art will appreciate that the keyboard 54 of the reduced keyboard disambiguating system may have as few as three or as many as twenty data keys. The disambiguation technique disclosed herein is equally applicable to keyboards of different sizes.

It will also be appreciated that the reduced keyboard disambiguating system of the present invention may be used in conjunction with other devices requiring text input. For example, a disambiguating system of the present invention is depicted in FIG. 6 as incorporated in a remote control 600 for a television. This system may be required for text programming on a standard television or may further be used to control an interface device such as a "set-top box" which is able to access computer resources such as the Internet. The television remote control sends signals indicating keystrokes to a receiving and processing unit 602 connected to or contained within a television 604. Text entry is performed in the manner described above using a reduced set of data keys 606 located on the upper surface of the remote control. An unambiguous Select key 608 is included on the keyboard to delimit entered keystroke sequences and select different interpretations from the selection list displayed on the television screen. Incorporating a keyboard directly on the remote control is particularly advantageous in that a user does not have to utilize a separate full-size keyboard when operating the television-based Internet access interface.

Figure 6B:
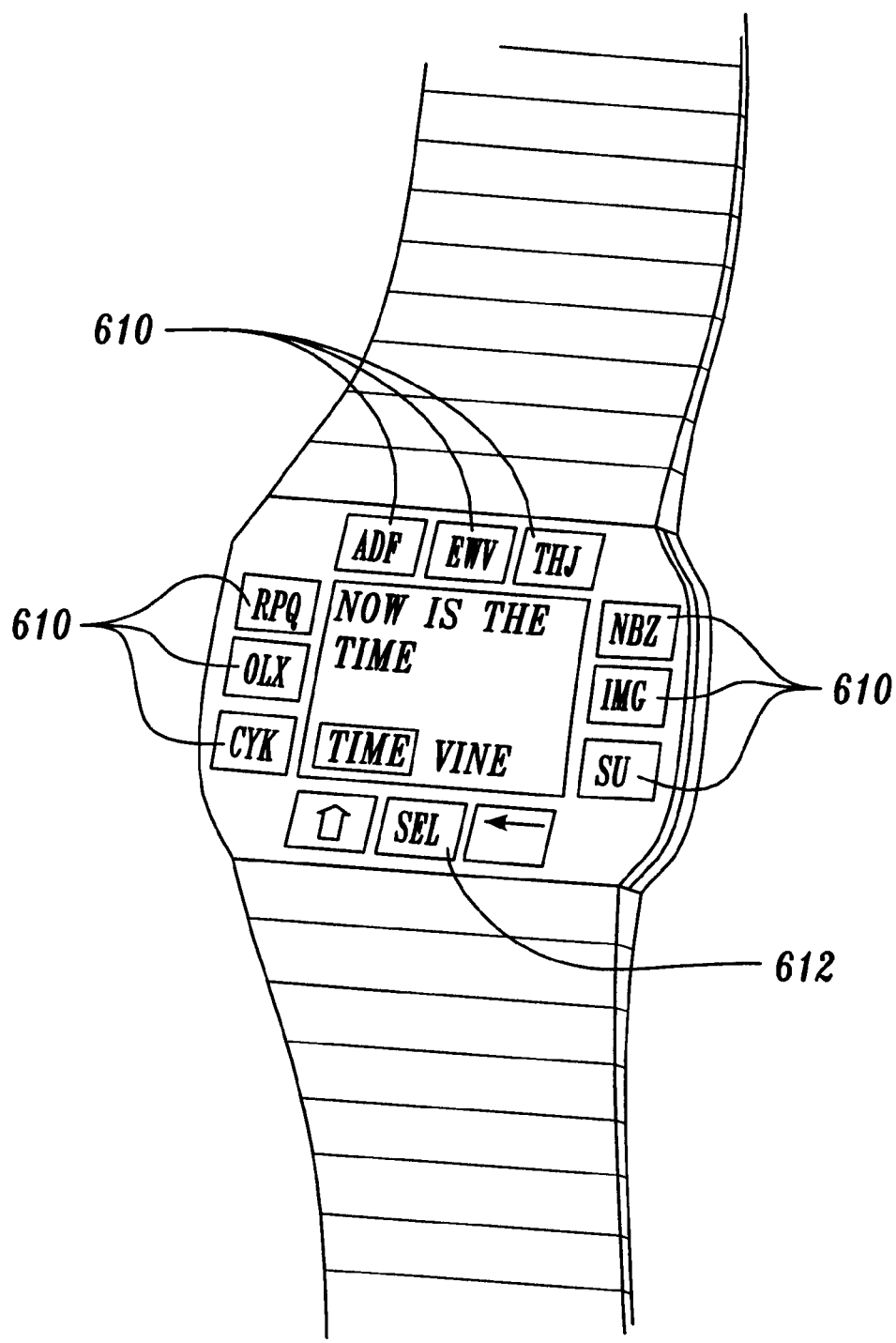
FIG. 6B is a schematic view of a wrist-watch having a reduced keyboard disambiguating system of the present invention.

FIG. 6B depicts a wrist-watch that utilizes the reduced keyboard disambiguating system of the present invention. Text entry is performed in the manner described above using a reduced set of data keys 610 located, for example, on the outer circumference of the face of the watch. Alternatively, the watch face may be implemented as a control disk that moves laterally in distinct directions corresponding to the various keys. An unambiguous Select key 612 is included on the watch to delimit entered keystroke sequences and select different interpretations sequentially displayed at the insertion point on the display screen.

Figure 7:
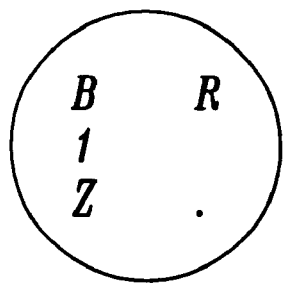
FIG. 7 is a diagram of an eight-key reduced keyboard layout for individuals with disabilities.
Figure 7:
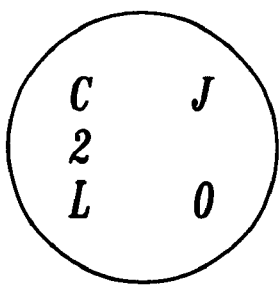
Figure 7:
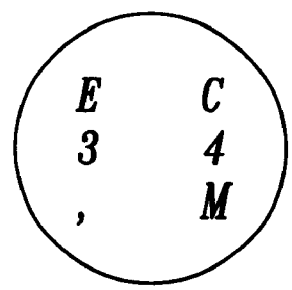
Figure 7:
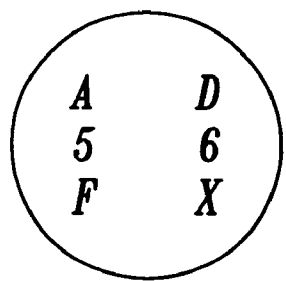
Figure 7:
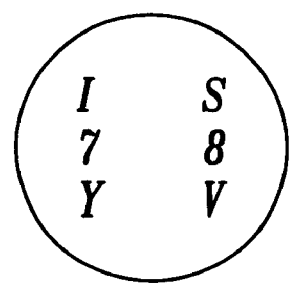
Figure 7:
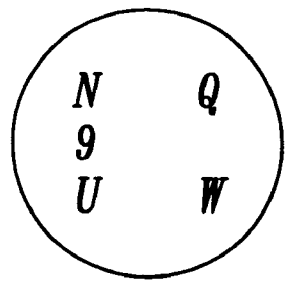
Figure 7:
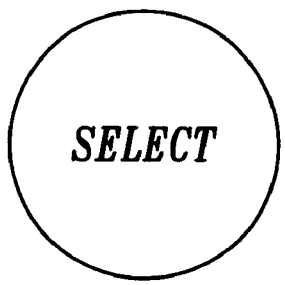
Figure 7:
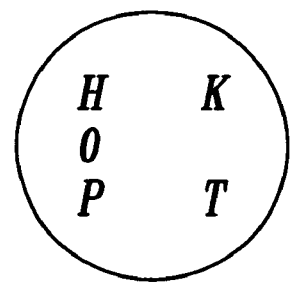

It will also be appreciated that the reduced keyboard disambiguating system of the present invention is an especially effective technique for text input based on movement of the eye as detected by an eye-tracking device. Such an input system is particularly suited for use by people with hand control disabilities. As the number of visual targets that must be discriminated increases, the required resolution for the eye-tracking system increases correspondingly, resulting in systems that tend to be less robust and more expensive. By decreasing the number of data keys required by the system from 27 or more to as few as 8 keys, the reliability of the system can be greatly enhanced even when an eye-tracking device with lower resolution is used. A suitable eight-key layout is shown in FIG. 7. Seven keys are used to enter letters or numbers, and one key is used as the "Select" key. The eight keys are organized in a circle with each key corresponding to one of eight directions. When organized in a circle, each key may be easily selected by a movement of the eye in one of the eight compass directions as detected by an eye-tracking device. Previous text input systems based on eye-tracking have generally relied on an approach which requires two eye fixations (i.e. two key selections) for each letter of text generated. A system based on the reduced keyboard disambiguating system of the present invention, requiring only one eye fixation for each letter of text generated, offers advantages over such an approach. An alternate embodiment of a portable reduced keyboard disambiguating system 50 is shown in FIG. 4B. The keyboard is constructed with full-size mechanical keys 54, which are distinct from the display 53 of the system. The full-size mechanical keys allow the user to type more rapidly by using three separate fingers to type on the three columns of data keys 56, taking advantage of the improved tactile feedback provided by mechanical keys. The reduced keyboard contains twelve keys 54 arranged in the preferred layout described above.

Variations can also be made in the construction and operation of each of the above embodiments. Those skilled in the art will appreciate that alternate arrangements exist for the keyboard 54 of the reduced keyboard disambiguating system. A 3×3 array of data keys 56 is preferred because the arrangement is easy to manipulate with the middle three fingers of a user's hand. All keystrokes are either on a center home row, or one row up or down.

Figure 8A:
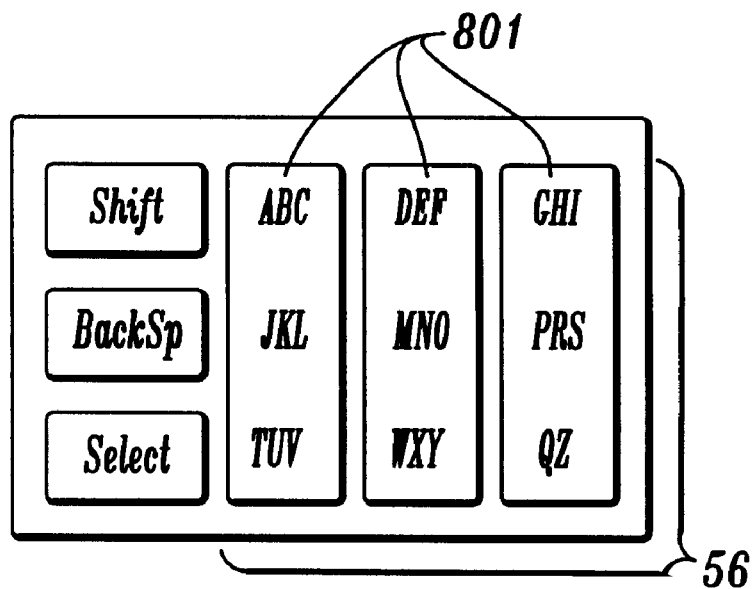
FIG. 8A is a diagram of one embodiment of mechanical keys used with a system of the invention.
Figure 8B:
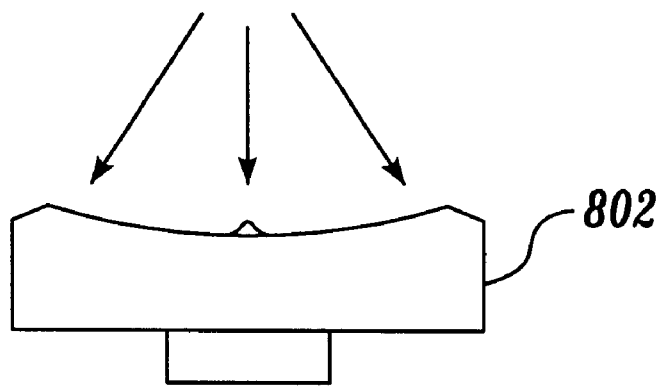
FIG. 8B is a side view of one of the keys of FIG. 8A.

Another arrangement of the 3×3 array of data keys 56 can be constructed using three "rocker" keys 801, an example of which is shown in FIG. 8A. FIG. 8B shows a side view of a rocker key 802 which has three closure positions: rocking up and slightly away from the typist, straight down, and down and slightly toward the typist. Thus, by placing the three middle three fingers of a user's hand across the centers of the three rocker keys as a "home row," each of the data keys may be activated without having to lift the fingers from the keys. The three positions can be activated by extending a finger forward and pushing slightly forward and down, by pushing straight down, or by curling the finger slightly pulling back and pushing down. A dimple in the center of each key provides tactile feedback regarding finger position. This allows the user to type more rapidly on the small set of data keys because the fingers never need to be physically lifted up off of the keys.

Figure 8C:
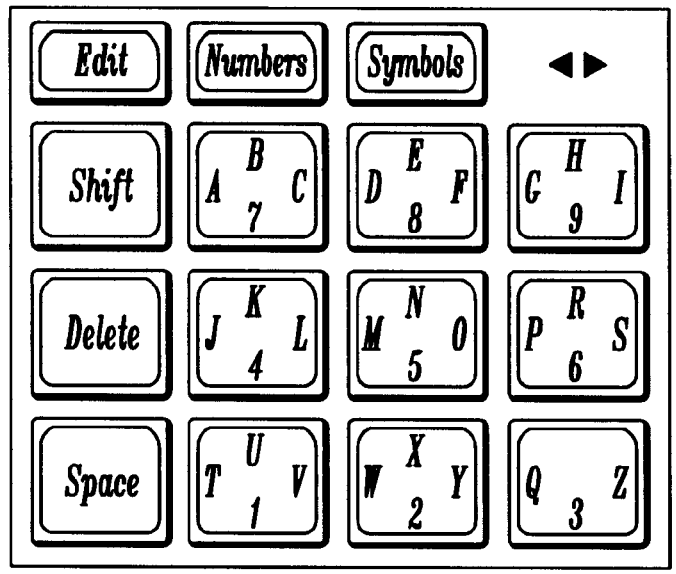
FIG. 8C is a schematic view of an alternate embodiment of a keyboard of the invention.
Figure 8D:
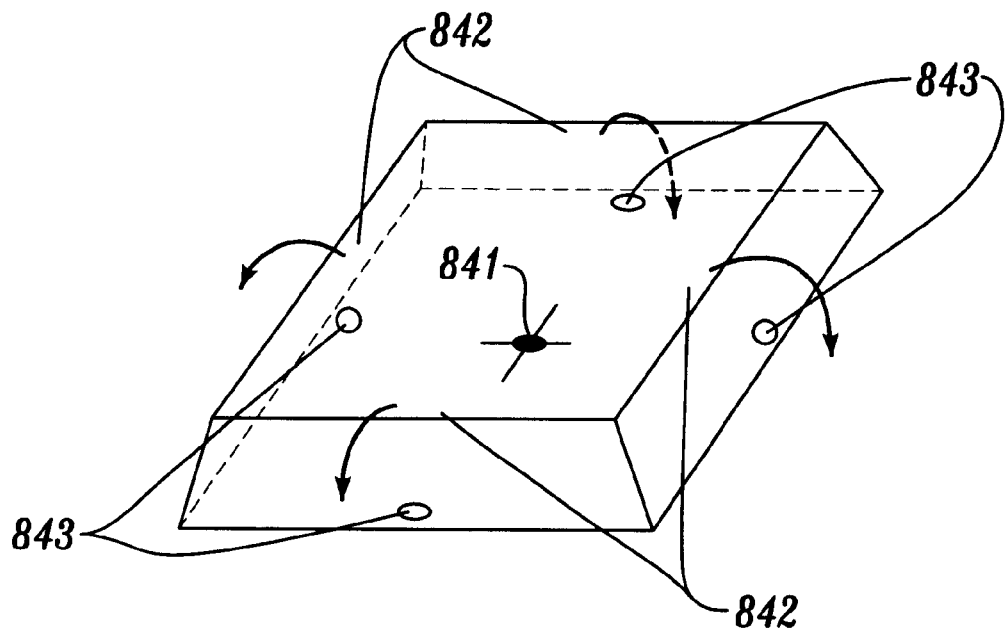
FIG. 8D is a schematic view showing the movements of one of the keys shown in FIG. 8C.

Yet another arrangement of the 3×3 array of data keys 56 in shown in FIG. 8C, in which the data keys 56 are constructed using nine mechanical keys, each of which is able to be depressed in four distinguishable ways. In the example shown in FIG. 8C, each key may be tilted in four different directions (up, down, left and right) when depressed. This allows each keypress to unambiguously specify one of up to four different characters or functions associated with the key, while also simultaneously signaling an activation of an ambiguous keystroke. In FIG. 8C, for example, eight of the nine data keys 56 are each unambiguously associated with three letters and a digit, and the lower right key is unambiguously associated with two letters, a digit, and a punctuation character (a period). As shown in FIG. 8D, each key is constructed so that it will tilt in one of four directions when pressed on one of the four keytop regions 842, resulting in the closure of one of four distinct switch contacts 843. Each key could be constructed to tilt in as many as eight or as few as two different directions, and allow the system to distinguish a corresponding number of unambiguous states.

In another embodiment of the invention, the system may be used on a touch pad device where each key has multiple symbols on each key. Each symbol is located at a different location on the key. A user selects a symbol on the touch keys by touching the key containing the desired letter or symbol and then indicating the symbol by a short dragging motion in the plane of the screen toward the desired letter or symbol. All of the symbols on a key have an associated stroke directions. For example, on a key containing three symbols, the leftmost symbol could be indicated by touching the key and sliding to the left, the rightmost symbol could be indicated by touching the key and sliding right, and the center symbol, possibly the most frequently used symbol, could be indicated by touching and releasing the key with no sideways motion. When the pen stylus or fingertip is lifted from the touchscreen surface, the selected symbol is added to the end of the current unambiguous spelling object. This method may be expanded to include more than three selectable elements on a key. For example, a set of nine different stroke "gestures" may be defined as eight different strokes in the direction of the eight compass points, plus a simple tap as the ninth gesture. This would allow the user to unambiguously select from a single key up to nine different characters or other options such as functions or menus.

While the above discussion relates to the use of the reduced keyboard disambiguating system with Roman characters and English, it will be appreciated that the system is equally operable with foreign languages using different character sets. Foreign language versions would operate in a similar manner, with the foreign character set optionally grouped on the keys of the keyboard to optimize the keyboard and minimize the ambiguity in the particular language, or across multiple languages. In the case of the Japanese language, current Japanese word processors generally use Roman characters as the preferred method to input Japanese kana and kanji. The first step in processing is to type the Roman characters used to spell each phonetic syllable of the desired kana, which appear as each syllable is typed. When kanji are desired, after typing the kana corresponding to the one or more kanji which are used to write the desired word, a "Conversion" key is pressed and one or more possible kanji interpretations of the entered kana are displayed as numbered alternatives on the display. The user then selects the desired interpretation by pressing the corresponding number.

A preferred embodiment of the reduced keyboard disambiguating system for generating Japanese kana and kanji operates as follows. The user types the Roman characters corresponding to the phonetic spelling of the kana corresponding to the desired word. The word vocabulary module contains one entry for each unique phonetic spelling corresponding to one or more words, where the frequency of that entry is set to the sum of the frequencies of all words with that phonetic reading. After each ambiguous keystroke, the word vocabulary module displays the kana for each matching word in decreasing order of frequency. After typing in the ambiguous keystrokes corresponding to the desired word, the user presses the Select key to select the first kana interpretation of the key sequence in the selection list.

The reduced keyboard disambiguating system then exports this kana reading to a kanji interpretation software program that takes a kanji reading as input and returns a list of the kanji that correspond to it. Associated with each kanji interpretation is information regarding its frequency of and recency of use. The frequency of use is with respect to its use in the general language, and remains fixed. The recency of use is with respect to the user of the software package, and is adjusted according to the user's particular history of usage of the software. The reduced keyboard disambiguating system for Japanese then displays the returned kanji on the keytops of the data keys 56.

The system is configured by the user in a set-up menu to determine three aspects of the manner in which the kanji are displayed. The first aspect is the maximum number of separate kanji readings to be displayed on a keytop. When there are more than nine possible kanji readings, the readings are distributed as evenly as possible among the nine keys. When there are more possible kanji readings than nine times the maximum number, the remaining kanji readings are displayed on subsequent screens. A special "Next Screen" key is activated to advance the system to these subsequent screens, and to return to the first screen following the last screen of possible readings. An audible tone indicates when the system returns to the first screen.

When more than one reading is displayed on each data key, the preferred unambiguous spelling method (direct pointing or multiple-stroke) is used to select the desired reading from the key on which it is displayed. The second aspect configured by the user is the number of data keys used to display kanji readings according to recency of use and the number of data keys used to display kanji readings according to frequency of use. For example, three of the nine keys may be selected to display according to recency, and the remaining six keys according to frequency. The keys displaying according to recency show the most recently used kanji readings, in order of decreasing recency of use, on the first three data keys of each screen of displayed readings. The remaining six keys show kanji readings in order of decreasing frequency of use. In addition, at the user's option, the selected kana reading also appears as hiragana only and as katakana only in two fixed locations on the first screen, preferably on the same key with the hiragana reading displayed first. The hiragana reading that is implicitly or explicitly selected in the selection list also appears at the insertion point. If the hiragana reading is desired for output to the text area without converting it to any kanji, the user may select it by touching the desired reading in the selection list.

It is important to note that, since the frequency of use information is not dynamic, for a given input kana reading and number of keys allocated (six in this example), the same kanji readings will always appear on the same keys, allowing the user to become automatic in selecting kanji based on frequency. Since a kanji reading displayed based on frequency may also have been recently used, the same kanji reading may appear in two different screen locations. At the user's option, a selected number of the most recently used kanji readings that are displayed according to frequency are displayed as highlighted readings or in some other distinguishing format.

If the first kana interpretation of the key sequence in the selection list is not the desired kana reading, the user again presses the Select key to select the next kana interpretation in the selection list. The reduced keyboard disambiguating system then exports this next kana reading to the kanji interpretation software program and displays the first screen of the list of returned kanji interpretations. This procedure is repeated with each repeated press of the Select key until the desired kana reading is selected.

In an alternate embodiment, to conserve processing, the selected kana reading may not be sent to the kanji interpretation software program until the "Next Screen" is initially pressed. In this alternate embodiment, if the selected hiragana reading is desired for output to the text area without converting it to kanji, the user may simply begin typing the next desired word without pressing the "Next Screen" key.

Once the desired kana reading is selected, the "Next Screen" key is pressed until the desired kanji appears on one of the data keys. The user then presses the data key (using the direct pointing or multiple-stroke specification method if more than one kanji reading appears on the key) to select the desired kanji. The selected kanji are then immediately output to the text area at insertion point 88, and the data keys are re-displayed showing the Roman characters assigned to each key in the standard layout. The user then begins typing the next desired word, and the above process repeats.

Those skilled in the art will also recognize that additional vocabulary modules can be enabled within the computer, for example vocabulary modules containing legal terms, medical terms, and foreign language terms. Via a system menu, the user can configure the system so that the additional vocabulary words can be caused to appear first or last in the list of possible words, with special coloration or highlighting. Consequently, within the scope of the appended claims, it will be appreciated that the invention can be practiced otherwise than as specifically described herein.

The embodiments of the invention in which an exclusive property or privilege is claimed are defined as follows:

1. A system for disambiguating ambiguous input sequences entered by a user and for the interpretation and display of unambiguous input sequences entered by the user, the system comprising:
  (a) a user input device having a plurality of inputs, each of the plurality of inputs associated with a plurality of characters, an input sequence being generated each time an input is selected by manipulating the user input device, wherein the generated input sequence corresponds to the sequence of inputs that have been selected, and wherein the generated input sequence has a textual interpretation that is unambiguous and a textual interpretation that is ambiguous due to the plurality of characters associated with each input;
  (b) a memory containing a plurality of objects, each of the plurality of objects associated with an input sequence;
  (c) a display to depict system output to the user; and
  (d) a processor coupled to the user input device, memory and display, the processor:
    (i) processing each generated input sequence as an ambiguous selection of the characters associated with the input sequence to identify from the plurality of objects in memory at least one object associated with each generated input sequence;
    (ii) simultaneously processing each generated input sequence as an unambiguous selection of a specific character associated to identify an unambiguous textual interpretation that is associated with the generated input sequence; and
    (iii) generating an output signal causing the display to display at least one of the identified objects associated with the generated input sequence and to simultaneously display the identified unambiguous textual interpretation that is associated with the input sequence.

2. The system of claim 1, wherein the plurality of inputs of the user input device are implemented as a plurality of keys displayed on a touchscreen, each of the plurality of keys including a plurality of characters.

3. The system of claim 2, wherein contacting the touchscreen directly where a character is displayed is simultaneously processed as an unambiguous selection of the character and as an ambiguous selection of any of the plurality of characters associated with the key.

4. The system of claim 3 wherein when the touchscreen is contacted, the character that is associated with the location of contact on the touchscreen is visually indicated by distinct formatting.

5. The system of claim 2 wherein a specific character is unambiguously selected by initially contacting the touchscreen on the key where the character is displayed and then performing a distinguishable movement to indicate the specific character.

6. The system of claim 5 wherein the distinguishable movement specifies an added diacritic mark.

7. The system of claim 5 wherein the distinguishable movement specifies an alternate form of a character.

8. The system of claim 2 wherein a specific character is unambiguously selected by contacting a displayed key a number of times, wherein the number of times the displayed key is contacted corresponds to the position of the desired character on the key.

9. The system of claim 8 wherein the character that is unambiguously selected is visually indicated by distinct formatting.

10. The system of claim 8 wherein the display of the contacted key is modified to show the specific character that has been unambiguously selected.

11. The system of claim 8 wherein the characters on each key are displayed in order of their frequency of use in a particular language.

12. The system of claim 8 wherein a next specific character is unambiguously selected from the contacted key following a time interval that exceeds a predetermined period of time during which no key has been contacted.

13. The system of claim 12 wherein the display of the contacted key is restored to its original appearance following expiration of said time interval.

14. The system of claim 12 wherein the length of the predetermined period of time is automatically adjusted as a function of a running average of time intervals between successive pairs of contacts on the same key, when said time intervals are less than the predetermined period of time and when the unambiguous textual interpretation of the input sequences containing said pairs of contacts is selected by the user for output.

15. The system of claim 1 wherein the plurality of inputs of the user input device are implemented as a plurality of mechanical keys, each of the plurality of keys associated with a plurality of characters.

16. The system of claim 15 wherein the mechanical keys are activated in a plurality of distinct ways to unambiguously select specific characters.

17. The system of claim 15 wherein a specific character is unambiguously selected by activating a given key a number of times and wherein the number of times the given key is activated corresponds to the position of the desired character on the key.

18. The system of claim 17 wherein an additional character is unambiguously selected by activating the given key a number of times and wherein the number of times the given key is activated is greater than the number of characters displayed on the key.

19. The system of claim 17 wherein the characters on each key are displayed in order of their frequency of use in a particular language.

20. The system of claim 17 wherein a next specific character is unambiguously selected from the given key following a time interval that exceeds a predetermined time interval during which no key has been contacted.

21. The system of claim 20 wherein the length of the predetermined time interval is automatically adjusted as a function of a running average of time intervals between successive pairs of activations of the same key, when said time intervals are less than the predetermined time interval and when the unambiguous textual interpretation of the input sequences containing said pairs of activations is selected by the user for output.

22. The system of claim 1 wherein the unambiguous textual interpretation is displayed in a dedicated location on the display.

23. The disambiguating system of claim 1 wherein unknown words that do not correspond to any object in the memory are unambiguously input to the system, objects corresponding to said previously unknown words are automatically added provisionally to the memory so that said unknown words can be generated by selecting the corresponding sequence of inputs.

24. The disambiguating system of claim 23 wherein when an object has been provisionally added to the memory corresponding to a previously unknown word that has been unambiguously input, and wherein all occurrences of said word are deleted from the output, said object is automatically deleted from the memory.

25. The disambiguating system of claim 23 wherein when an object has been provisionally added to the memory corresponding to a previously unknown word that has been unambiguously input, and wherein the input sequence associated with said word is not generated prior to receipt of a signal indicating that the system is to be turned off, said object is automatically deleted from the memory.

26. The disambiguating system of claim 23 wherein the memory includes objects that are associated with input sequences corresponding to common spelling and keystroke errors.

27. A disambiguating system for disambiguating ambiguous input sequences entered by a user, the disambiguating system comprising:
(a) a user input device having a first and second plurality of inputs, each of the first plurality of inputs associated with a plurality of characters, wherein selection of one or more of the first plurality of inputs generates an input sequence, each of the second plurality of inputs being associated with unambiguous inputs, wherein selection of one or more of the second plurality of inputs generates signals that control system operation;
(b) a memory containing a plurality of objects, each of the plurality of objects associated with an input sequence;
(c) a display to depict system output to the user; and
(d) a programmable processor coupled to the user input device, memory and display, said processor being programmed for:
(i) identifying from the plurality of objects in the memory at least one object associated with each generated input sequence;
(ii) causing the display of a list of at least one identified object associated with each generated input sequence as a textual interpretation of the generated input sequence;
(iii) responding to an unambiguous signal generated by selection of one or more of the second plurality of inputs by selecting one object from the displayed list and entering the selected object into a text entry display location on the display; and
(iv) responding to an unambiguous signal generated by selection of one or more of the second plurality of inputs by moving an object from the text entry display location to the displayed list, with the input sequence associated with the object being used to establish the displayed list of at least one object associated with the input sequence.

28. The system of claim 27, wherein the unambiguous signal that causes the processor to move an object from the text entry display location to the displayed list is a signal that deletes the character immediately following the object in the text entry display location.

29. The system of claim 27 wherein each of the plurality of objects in the memory are further associated with a frequency of use, wherein the object associated with each input sequence that has the highest frequency of use is displayed as a first identified object, thereby becoming the default object for the associated input sequence, and wherein if a second identified object that is not the default object is associated with the same generated input sequence and has a frequency of use that exceeds a selected threshold wherein said threshold is a function of the frequency of use of the default object and of the average frequency of use of all objects in memory, the default object is identified as a high-ambiguity object.

30. The system of claim 29 wherein an indicator is given when an input sequence corresponding to a high-ambiguity object is generated and the high-ambiguity object associated with the generated input sequence is selected for entry into a text entry display location.

31. The system of claim 29, wherein when a high-ambiguity object is displayed by the output component, the high-ambiguity object is automatically indicated using distinctive visual formatting.

32. The system of claim 29, wherein the memory contains additional information for at least one high-ambiguity object from which the processor determines from the context of the high-ambiguity object in the text entry display location, one or more contexts in which the high-ambiguity object is automatically replaced with a next most frequent object associated with the same input sequence associated with the high-ambiguity object.

* * * * *

UNITED STATES PATENT AND TRADEMARK OFFICE
CERTIFICATE OF CORRECTION

PATENT NO.    : 6,286,064 B1
DATED         : September 4, 2001
INVENTOR(S)   : M.T. King et al.

It is certified that error appears in the above-identified patent and that said Letters Patent is hereby corrected as shown below:

<u>Title page,</u>
Item [56], References Cited, U.S. PATENT DOCUMENTS, insert in appropriate order the following:

| | | | |
|---|---|---|---|
| -- | 3,647,973 | 3/1972 | James et al. |
| | 3,967,273 | 6/1976 | Knowlton |
| | 4,191,854 | 3/1980 | Coles |
| | 4,360,892 | 11/1982 | Endfield |
| | 4,381,502 | 4/1983 | Prame |
| | 4,426,555 | 1/1984 | Underkoffler |
| | 4,427,848 | 1/1984 | Tsakanikas |
| | 4,442,506 | 4/1984 | Endfield |
| | 4,481,508 | 11/1984 | Kamei et al. |
| | 4,544,276 | 6/1985 | Horodeck |
| | 4,549,279 | 10/1985 | Lapeyre |
| | 4,649,563 | 3/1987 | Riskin |
| | 4,661,916 | 4/1987 | Baker et al. |
| | 4,669,901 | 6/1987 | Feng |
| | 4,674,112 | 6/1987 | Kondraske et al. |
| | 4,677,659 | 6/1987 | Dargan |
| | 4,744,050 | 5/1988 | Hirosawa et al. |
| | 4,754,474 | 6/1988 | Feinson |
| | 4,791,408 | 12/1988 | Heusinkveld |
| | 4,817,129 | 3/1989 | Riskin |
| | 4,823,294 | 4/1989 | Rouhani |
| | 4,846,598 | 7/1989 | Livits |
| | 4,849,732 | 7/1989 | Dolenc |
| | 4,866,759 | 9/1989 | Riskin |
| | 4,872,196 | 10/1989 | Royer et al. |
| | 4,891,777 | 1/1990 | Lapeyre |
| | 5,006,001 | 4/1991 | Vulcan |
| | 5,031,206 | 7/1991 | Riskin |
| | 5,035,205 | 7/1991 | Schiller et al. |
| | 5,063,376 | 11/1991 | Chang |
| | 5,065,661 | 11/1991 | Hacker |
| | 5,067,103 | 11/1991 | Lapeyre |
| | 5,087,910 | 2/1992 | Guyot-Sionnest |
| | 5,131,045 | 7/1992 | Roth |
| | 5,156,475 | 10/1992 | Zilberman |
| | 5,163,084 | 11/1992 | Kim et al. |
| | 5,200,988 | 4/1993 | Riskin |

UNITED STATES PATENT AND TRADEMARK OFFICE
CERTIFICATE OF CORRECTION

PATENT NO. : 6,286,064 B1
DATED : September 4, 2001
INVENTOR(S) : M.T. King et al.

It is certified that error appears in the above-identified patent and that said Letters Patent is hereby corrected as shown below:

5,214,689    5/1993    O'Sullivan
    5,218,538    6/1993    Zhang
    5,229,936    7/1993    Decker et al.
    5,255,310    10/1993    Kim et al.
    5,258,748    11/1993    Jones
    5,281,966    1/1994    Walsh
    5,289,394    2/1994    Lapeyre, deceased
    5,305,205    4/1994    Weber et al.
    5,317,647    5/1994    Pagallo
    5,339,358    8/1994    Danish et al.
    5,388,061    2/1995    Hankes
    5,392,338    2/1995    Danish et al.
    5,535,421    7/1996    Weinreich
    5,644,896    9/1997    Blumberg
    5,786,776    2/1998    Kisaichi et al.    --

Item [56], References Cited, FOREIGN PATENT DOCUMENTS, insert in approprite order the following:

-- FOREIGN PATENT DOCUMENTS
    WO82/00442    2/1982    (WO)
    0213022 A1    3/04/1987    (EP)
    0319193 A3    6/07/1989    (EP)
    WO89/05745    6/1989    (WO)
    WO90/07149    6/1990    (WO)
    0464726 A2    1/1992    (EP)
    0540147 A2    5/1993    (EP)
    0651315 A1    5/1995    (EP)
    0689122 A1    12/1995    (EP)
    2298166 A    8/1996    (GB)
    WO96/27947    9/1996    (WO)
    0732646 A2    9/1996    (EP)
    WO97/04580    2/1997    (WO)
    WO97/05541    2/1997    (WO)    --

UNITED STATES PATENT AND TRADEMARK OFFICE
CERTIFICATE OF CORRECTION

PATENT NO. : 6,286,064 B1
DATED : September 4, 2001
INVENTOR(S) : M.T. King et al.

It is certified that error appears in the above-identified patent and that said Letters Patent is hereby corrected as shown below:

Item [56], References Cited, OTHER PUBLICATIONS, insert in appropriate order the following:

--OTHER PUBLICATIONS
Levine, S.H. et al., "Adaptive Technique for Customized Interface Design With Application to Nonvocal Communication," *RESNA 9th Annual Conference, Minneapolis, Minnesota, 1986.*

Levine, S.H., "An Adaptive Approach to Optimal Keyboard Design for Nonvocal Communication," *IEEE, 1985.*

Swiffin, A.L. et al., "Adaptive and Predictive Techniques in a Communication Prosthesis," *AAC Augmentative and Alternative Communication (1987).*

Swiffin, A.L. et al., "PAL: An Effort Efficient Portable Communication Aid and Keyboard Emulator," *RESNA 8th Annual Conference, Memphis, Tennessee, 1985.*

Smith, Sidney L. et al., "Alphabetic Data Entry Via the Touch-Tone Pad: A Comment," *Human Factors*, 13(2), pp. 189-190, 1971.

Witten, I.H., "Principles of Computer Speech," New York: Academic Press, (1982), pp. 246-253.

Minneman, S.L., "A Simplified Touch-Tone® Telecommunication Aid for Deaf and Hearing Impaired Individuals," *RESNA 8th Annual Conference, Memphis Tennessee, 1985.*

Levine, S.H. et al., "Computer Disambiguation of Muti-Character Key Text Entry: An Adaptive Design Aproach," *IEEE*, 1986.

Foulds, R. et. al., "Lexical Prediction Techniques Applied to Reduce Motor Requirements for Augmentative Communication," *RESNA 10th Annual Conference, San Jose, California, 1987.*

Foulds, R.A. et al., "Statistical Disambiguation of Multi-Character Keys Applied to Reduce Motor Requirements for Augmentative and Alternative Communication," *AAC Augmentative and Alternative Communication (1987).*

Levine, S.H. et al., "Multi-Character Key Text Entry Using Computer Disambiguation," *RESNA 10th Annual Conference, San Jose, California, 1987.*

UNITED STATES PATENT AND TRADEMARK OFFICE
CERTIFICATE OF CORRECTION

PATENT NO.    : 6,286,064 B1
DATED         : September 4, 2001
INVENTOR(S)   : M.T. King et al.

It is certified that error appears in the above-identified patent and that said Letters Patent is hereby corrected as shown below:

Kreifeldt, J.G. et al., "Reduced Keyboard Designs Using Disambiguation," *Proceedings of the Human Factors Society 33rd Annual Meeting - 1989.*

Arnott, J.L. et al., "Probabilistic Character Disambiguation for Reduced Keyboards Using Small Text Samples," *AAC Augmentative and Alternative Communication*, Volume 8 (September 1992).

King, M.T., "JustType™ - Efficient Communication with Eight Keys," Proceedings of the RESNA '95 Annual Conference, Vancouver, BC, Canada, 1995.

Oommen, B.J. et al., "Correction to 'An Adaptive Lerning Solution to the Keyboard Optimization Problem,'" *IEEE Transactions on Systems, Man, and Cybernetics*, 22:5 (October, 1992).

Matias, E. et al., "Half-QWERTY: Typing With One Hand Using Your Two-Handed Skills," *Conference Companion, CHI '94*, (April 24-28, 1994).

Kamphuis, H. et al., "Katdas; A Small Number of Keys Direct Access System," *RESNA 12th Annual Conference, New Orleans, Louisiana, 1989.*

"*Speed Keyboard for Data Processor*," IBM Technical Disclosure Bulletin, Vol. 23, pp. 838-839, July, 1980. © IBM Corp., 1993.

Sugimoto, M. et al., "SHK: Single Hand Key Card for Mobile Devices," *CHI 1996* (April 13-18, 1996). --

Signed and Sealed this

Eighteenth Day of June, 2002

*Attest:*

JAMES E. ROGAN
*Attesting Officer*    *Director of the United States Patent and Trademark Office*